United States Patent
Park et al.

(10) Patent No.: US 12,150,072 B2
(45) Date of Patent: Nov. 19, 2024

(54) MAXIMUM POWER REDUCTION

(71) Applicant: LG ELECTRONICS INC., Seoul (KR)

(72) Inventors: Jongkeun Park, Seoul (KR); Jaehyuk Jang, Seoul (KR); Suhwan Lim, Seoul (KR); Sangwook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 410 days.

(21) Appl. No.: 17/754,442

(22) PCT Filed: Sep. 29, 2020

(86) PCT No.: PCT/KR2020/013305
§ 371 (c)(1),
(2) Date: Apr. 1, 2022

(87) PCT Pub. No.: WO2021/066505
PCT Pub. Date: Apr. 8, 2021

(65) Prior Publication Data
US 2022/0346036 A1   Oct. 27, 2022

(30) Foreign Application Priority Data

Oct. 3, 2019  (KR) .......................... 10-2019-0122712
Nov. 8, 2019  (KR) .......................... 10-2019-0142565
Feb. 14, 2020 (KR) .......................... 10-2020-0018607

(51) Int. Cl.
*H04W 52/36* (2009.01)
*H04W 52/14* (2009.01)
*H04W 76/15* (2018.01)

(52) U.S. Cl.
CPC ....... *H04W 52/367* (2013.01); *H04W 52/146* (2013.01); *H04W 76/15* (2018.02)

(58) Field of Classification Search
CPC .. H04W 52/367; H04W 76/15; H04W 52/146
(Continued)

(56) References Cited

U.S. PATENT DOCUMENTS 10,244,489 B2 *  3/2019  Loehr ................. H04W 52/365
2015/0230254 A1  8/2015  Lim et al.
(Continued)

OTHER PUBLICATIONS

PCT International Application No. PCT/KR2020/013305, International Search Report dated Dec. 30, 2020, 5 pages.
(Continued)

*Primary Examiner* — Nghi H Ly
(74) *Attorney, Agent, or Firm* — LEE, HONG, DEGERMAN, KANG & WAIMEY

(57) ABSTRACT

In order to solve the aforementioned problem, one disclosure in the present specification provides a wireless communication device. The wireless communication device may comprise: at least one transceiver; at least one processor; and at least one memory that stores an instruction and is operatively electrically connected to the at least one processor. An operation performed on the basis of an execution of the instruction by the at least one processor may comprise the steps of: receiving a network signal related to AMPR; determining uplink transmission power by applying a preset A-MPR value; and transmitting an uplink signal on the basis of the determined transmission power.

9 Claims, 39 Drawing Sheets

(58) Field of Classification Search
USPC ........ 370/318, 328, 329, 338, 341, 345, 350
See application file for complete search history.

(56) References Cited

U.S. PATENT DOCUMENTS

| | | | |
|---|---|---|---|
| 2019/0104476 A1* | 4/2019 | Lim | H04W 52/146 |
| 2020/0053668 A1* | 2/2020 | Frank | H04W 52/241 |
| 2020/0288412 A1* | 9/2020 | Ajdakple | H04W 52/365 |

OTHER PUBLICATIONS

3rd Generation Partnership Project, "Technical Specification Group Radio Access Network; NR; User Equipment (UE) radio transmission and reception; Part 3: Range 1 and Range 2 Interworking operation with other radios (Release 16)," 3GPP TS 38.101-3 V16.0.0, Jun. 2019, 274 pages.

Sprint et al., "WF on B41/n41 29 dBm Power Class and EN-DC A-MPR Improvement," R4-1910306, 3GPP TSG-RAN WG4 Meeting #92, Sep. 2019, 9 pages.

LG Electronics, "Antenna isolation and A-MPR for B41/n41 EN-DC," R4-1908725, 3GPP TSG-RAN WG4 Meeting #92, Aug. 2019, 7 pages.

Sprint, "CR for 38.101-3: B41 n41 EN-DC allocation based A-MPR," R4-1909901, 3GPP TSG-RAN WG4 Meeting #92, Aug. 2019, 8 pages.

LG Electronics, "New A-MPR curves for 29dBm HPUE B41/n41 EN-DC," R4-2001239, 3GPP TSG-RAN WG4 #94-e, E-meeting, Mar. 2020, 8 pages.

* cited by examiner

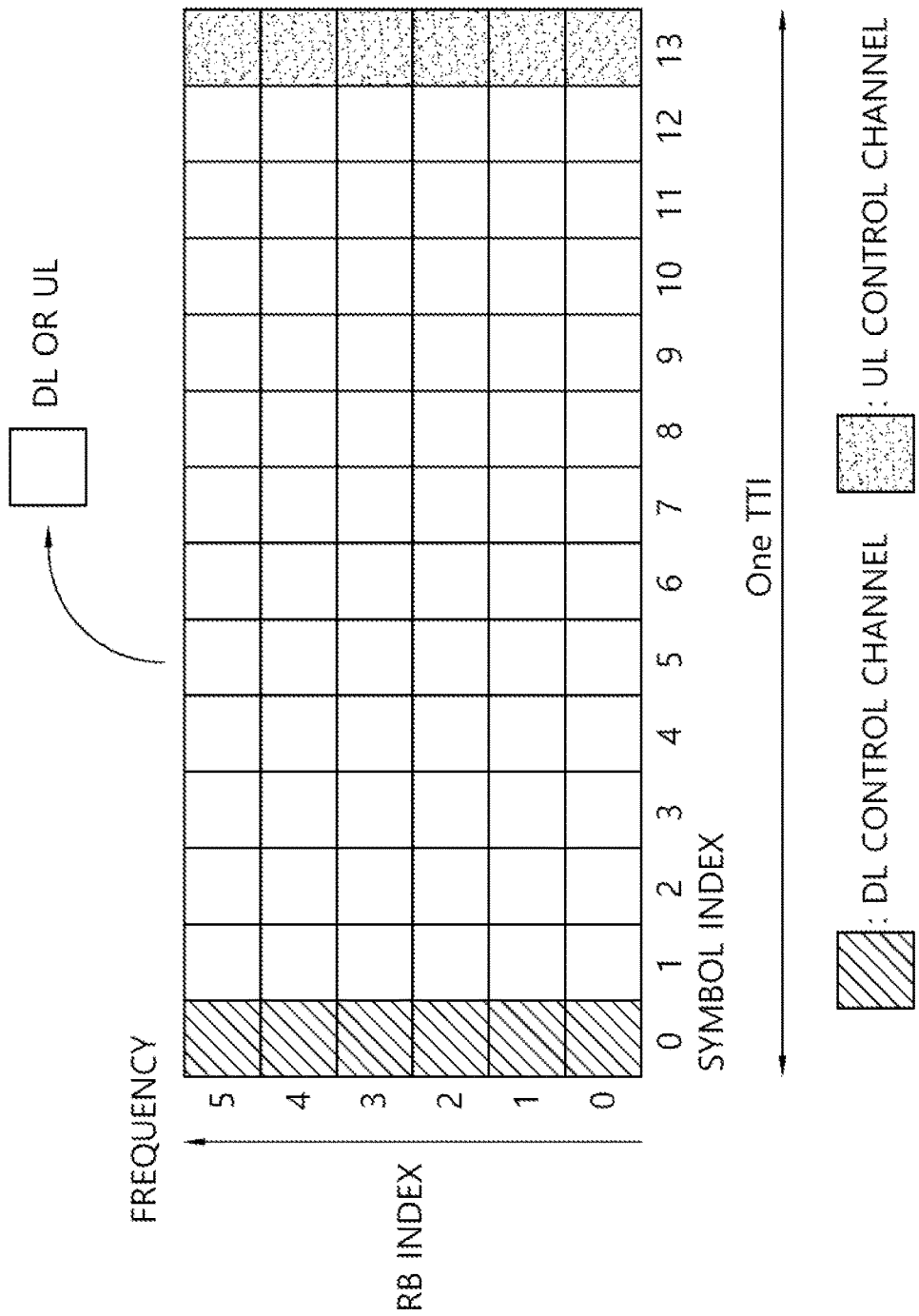

FIG. 7

| LTE 20MHz | | NR 40/50/60/80/100MHz | | Total UL RB BW [MHz] | LGE Test Results (@Ant isolation 10dB) Tx power back-off [dB] | | | LGE Test Results (@Ant isolation 13dB) Tx power back-off [dB] | | |
|---|---|---|---|---|---|---|---|---|---|---|
| SCS | Transmitted RB | SCS | Transmitted RB | | NS_04/ Additional spurious emissions -25dBm/MHz f < 2490.5 | NS_04/ General SEM -13dBm/MHz f<ENBW | Spurious emissions -30dBm/MHz | NS_04/ Additional spurious emissions -25dBm/MHz f < 2490.5 | NS_04/ General SEM -13dBm/MHz f<ENBW | Spurious emissions -30dBm/MHz |
| 15KHz | 1 | 30KHz | 1 | 0.54 | 14 | 8 | 7 | 13 | 7 | 6 |
| 15KHz | 5 | 30KHz | 5 | 2.7 | 13 | 6 | 5 | 12 | 5 | 4 |
| 15KHz | 10 | 30KHz | 10 | 5.4 | 12 | 5 | 4 | 11 | 4 | 3 |
| 15KHz | 15 | 30KHz | 15 | 8.1 | 11 | 4 | 3 | 10 | 3 | 2 |
| 15KHz | 20 | 30KHz | 20 | 10.8 | 10 | 4 | 2 | 9 | 3 | 1 |
| 15KHz | 25 | 30KHz | 25 | 13.5 | 9 | 3 | 2 | 9 | 2 | 1 |
| 15KHz | 30 | 30KHz | 30 | 16.2 | 9 | 3 | 1 | 8 | 2 | 0 |
| 15KHz | 35 | 30KHz | 35 | 18.9 | 8 | 2 | 1 | 8 | 1 | 0 |
| 15KHz | 40 | 30KHz | 40 | 21.6 | 8 | 2 | 1 | 7 | 0 | 0 |
| 15KHz | 45 | 30KHz | 45 | 24.3 | 8 | 2 | 1 | 7 | 0 | 0 |
| 15KHz | 50 | 30KHz | 50 | 27 | 8 | 2 | 1 | 7 | 0 | 0 |

FIG. 11

| LTE 20MHz | | | NR 40/50/60/80/100MHz | | | LGE Test Results (@Ant Isolation 10dB) Tx power back-off [dB] | | | LGE Test Results (@Ant Isolation 13dB) Tx power back-off [dB] | | |
|---|---|---|---|---|---|---|---|---|---|---|---|
| SCS | Transmitted RB | | SCS | Transmitted RB | Total UL RB BW [MHz] | NS_04 Additional spurious emissions -25dBm/MHz f < 2490.5 | NS_04 General SEM -25dBm/MHz | Spurious emissions -30dBm/MHz | NS_04 Additional spurious emissions -25dBm/MHz f < 2490.5 | NS_04 General SEM -25dBm/MHz | Spurious emissions -30dBm/MHz |
| 15KHz | 1 | | 30KHz | 1 | 0.54 | 14 | 12 | 15 | 13 | 11 | 14 |
| 15KHz | 5 | | 30KHz | 5 | 2.7 | 13 | 10 | 14 | 12 | 9 | 13 |
| 15KHz | 10 | | 30KHz | 10 | 5.4 | 12 | 9 | 12 | 11 | 8 | 11 |
| 15KHz | 15 | | 30KHz | 15 | 8.1 | 11 | 8 | 12 | 10 | 7 | 11 |
| 15KHz | 20 | | 30KHz | 20 | 10.8 | 10 | 7 | 11 | 9 | 6 | 10 |
| 15KHz | 25 | | 30KHz | 25 | 13.5 | 9 | 6 | 11 | 9 | 5 | 10 |
| 15KHz | 30 | | 30KHz | 30 | 16.2 | 9 | 6 | 10 | 8 | 5 | 9 |
| 15KHz | 35 | | 30KHz | 35 | 18.9 | 9 | 6 | 10 | 8 | 4 | 9 |
| 15KHz | 40 | | 30KHz | 40 | 21.6 | 8 | 5 | 10 | 7 | 4 | 9 |
| 15KHz | 45 | | 30KHz | 45 | 24.3 | 8 | 5 | 9 | 7 | 3 | 8 |
| 15KHz | 50 | | 30KHz | 50 | 27 | 8 | 5 | 9 | 7 | 3 | 8 |

FIG. 21

| LTE 20MHz | | NR 40/50/60/80/100MHz | | Total UL RB BW [MHz] | NS_04 Additional SE -25 dBm/MHz | | NS_04 General SEM -13 dBm/MHz | |
|---|---|---|---|---|---|---|---|---|
| SCS | Transmitted RB | SCS | Transmitted RB | | Ant. isolation 10 dB | Ant. isolation 13 dB | Ant. isolation 10 dB | Ant. isolation 13 dB |
| 15KHz | 1 | 30KHz | 1 | 0.54 | 15 | 14 | 9 | 8 |
| 15KHz | 6 | 30KHz | 1 | 1.44 | 15 | 14 | 9 | 8 |
| 15KHz | 12 | 30KHz | 1 | 2.52 | 14 | 13 | 8 | 7 |
| 15KHz | 5 | 30KHz | 5 | 2.7 | 14 | 13 | 7 | 6 |
| 15KHz | 10 | 30KHz | 10 | 5.4 | 13 | 12 | 6 | 5 |
| 15KHz | 30 | 30KHz | 1 | 5.76 | 12 | 11 | 6 | 5 |
| 15KHz | 15 | 30KHz | 15 | 8.1 | 11 | 11 | 5 | 4 |
| 15KHz | 20 | 30KHz | 20 | 10.8 | 11 | 10 | 5 | 4 |
| 15KHz | 25 | 30KHz | 25 | 13.5 | 10 | 10 | 4 | 3 |
| 15KHz | 30 | 30KHz | 30 | 16.2 | 10 | 9 | 4 | 3 |
| 15KHz | 35 | 30KHz | 35 | 18.9 | 9 | 9 | 4 | 2 |
| 15KHz | 40 | 30KHz | 40 | 21.6 | 9 | 8 | 3 | 1 |
| 15KHz | 45 | 30KHz | 45 | 24.3 | 9 | 8 | 3 | 1 |
| 15KHz | 50 | 30KHz | 50 | 27 | 9 | 8 | 3 | 1 |

FIG. 22

| LTE 20MHz | | NR 40/50/60/80/100MHz | | Total UL RB BW [MHz] | NS_04 Additional SE -25 dBm/MHz | | Spurious emissions -30 dBm/MHz | |
|---|---|---|---|---|---|---|---|---|
| SCS | Transmitted RB | SCS | Transmitted RB | | Ant. isolation 10 dB | Ant. isolation 13 dB | Ant. isolation 10 dB | Ant. isolation 13 dB |
| 15KHz | 1 | 30KHz | 1 | 0.54 | 15 | 14 | 16 | 15 |
| 15KHz | 6 | 30KHz | 1 | 1.44 | 15 | 14 | 15 | 14 |
| 15KHz | 12 | 30KHz | 1 | 2.52 | 14 | 13 | 15 | 14 |
| 15KHz | 5 | 30KHz | 5 | 2.7 | 14 | 13 | 14 | 13 |
| 15KHz | 10 | 30KHz | 10 | 5.4 | 13 | 12 | 13 | 12 |
| 15KHz | 30 | 30KHz | 1 | 5.76 | 12 | 11 | 13 | 12 |
| 15KHz | 15 | 30KHz | 15 | 8.1 | 12 | 11 | 13 | 12 |
| 15KHz | 20 | 30KHz | 20 | 10.8 | 11 | 10 | 12 | 11 |
| 15KHz | 25 | 30KHz | 25 | 13.5 | 10 | 9 | 12 | 11 |
| 15KHz | 30 | 30KHz | 30 | 16.2 | 10 | 9 | 11 | 10 |
| 15KHz | 35 | 30KHz | 35 | 18.9 | 10 | 9 | 11 | 10 |
| 15KHz | 40 | 30KHz | 40 | 21.6 | 9 | 8 | 11 | 10 |
| 15KHz | 45 | 30KHz | 45 | 24.3 | 9 | 8 | 10 | 9 |
| 15KHz | 50 | 30KHz | 50 | 27 | 9 | 8 | 10 | 9 |

MAXIMUM POWER REDUCTION

CROSS-REFERENCE TO RELATED APPLICATIONS

This application is the National Stage filing under 35 U.S.C. 371 of International Application No. PCT/KR2020/013305, filed on Sep. 29, 2020, which claims the benefit of earlier filing date and right of priority to Korean Application Nos. 10-2019-0122712 filed on Oct. 3, 2019, 10-2019-0142565 filed on Nov. 8, 2019, and 10-2020-0018607 filed on Feb. 14, 2020, the contents of which are all hereby incorporated by reference herein in their entireties.

BACKGROUND OF THE DISCLOSURE

Field of the Disclosure

The present specification relates to mobile communication.

Related Art

With the success in long term evolution (LTE)/LTE-Advanced (LTE-A) for 4th generation mobile communication, interest in the next-generation, i.e., 5th generation (also known as 5G) mobile communication is rising, and extensive research and development are in process.

A new radio access technology (New RAT or NR) is being researched for the 5th generation (also known as 5G) mobile communication.

In 5G, a terminal (or a user equipment (UE)) may perform communication based on LTE band 41+NR band 41 evolved universal terrestrial radio access (E-UTRA)-new radio dual connectivity (EN-DC) mode. Here, the LTE band 41+NR band 41 EN-DC mode may refer to a communication mode using LTE band 41 and NR band 41 (e.g., n41).

The terminal may determine transmission power by applying maximum output power requirements (or requirements). For example, the maximum output power requirement may be a maximum power reduction (MPR) value and/or an additional-MPR (A-MPR) value.

Recently, implementing a 29 dBm high-power terminal supporting LTE band 41+NR band 41 EN-DC operation has been discussed. However, in the related art, only a maximum output power requirement (e.g., MPR and/or A-MPR) for a 26 dBm high-power terminal supporting LTE band 41+NR band 41 EN-DC operation is defined.

Therefore, there is a problem that there is no maximum output power requirement (e.g., MPR and/or A-MPR) applicable to a 29 dBm high-power terminal supporting LTE band 41+NR band 41 EN-DC operation.

SUMMARY

Accordingly, a disclosure of the present specification has been made in an effort to solve the aforementioned problem.

In an aspect, a wireless communication device is provided. The wireless communication device includes: at least one transceiver; at least one processor; and at least one memory storing an instruction and operably electrically connected to the at least one processor. An operation performed based on execution of the instruction by the at least one processor may include: receiving a network signal related to an A-MPR; determining uplink transmission power by applying a pre-configured A-MPR value; and transmitting an uplink signal based on the determined transmission power.

In another aspect, a communication method performed by a base station is provided. The method includes transmitting a network signal related to A-MPR to a wireless communication device; and receiving an uplink signal from the wireless communication device.

In another aspect, a communication method performed by a wireless communication device is provided. The method includes: receiving a network signal related to A-MPR; determining uplink transmission power by applying a pre-configured A-MPR value; and transmitting an uplink signal based on the determined transmission power.

In another aspect, a base station is provided. The base station includes at least one transceiver; at least one processor; and at least one memory storing an instruction and operably electrically connectable to the at least one processor. An operations performed based on execution of the instruction by the at least one processor may include: transmitting a network signal related to the A-MPR to a wireless communication device; and receiving an uplink signal from the wireless communication device.

In another aspect, a device in mobile communication may be provided. The device may include at least one processor; and at least one memory storing an instruction and operably electrically connectable to the at least one processor. An operation performed based on execution of the instruction by the at least one processor may include: identifying a network signal related to an A-MPR; determining uplink transmission power by applying a pre-configured A-MPR value; and generating an uplink signal based on the determined transmission power.

In another aspect, a non-volatile computer-readable storage medium recording instructions is provided. The instructions allows one or more processors to, when executed by the one or more processors, identify a network signal related to an A-MPR; determine uplink transmission power by applying a pre-configured A-MPR value; and generating an uplink signal based on the determined transmission power.

Advantageous Effects

According to the disclosure of the present specification, the existing problems are solved.

BRIEF DESCRIPTION OF THE DRAWINGS

FIG. 5 shows an example of subframe types in NR.

FIG. 7 is a diagram illustrating an example of A-MPR measurement results in intra-band contiguous B41/n41 EN-DC.

FIG. 11 is a diagram illustrating an example of an A-MPR measurement results in intra-band non-contiguous B41/n41 EN-DC.

FIG. 21 is a diagram illustrating an example of A-MPR measurement results in intra-band contiguous B41/n41 EN-DC.

FIG. 22 is a diagram illustrating an example of an A-MPR measurement result in intra-band non-contiguous B41/n41 EN-DC.

DESCRIPTION OF EXEMPLARY EMBODIMENTS

Figure 1:
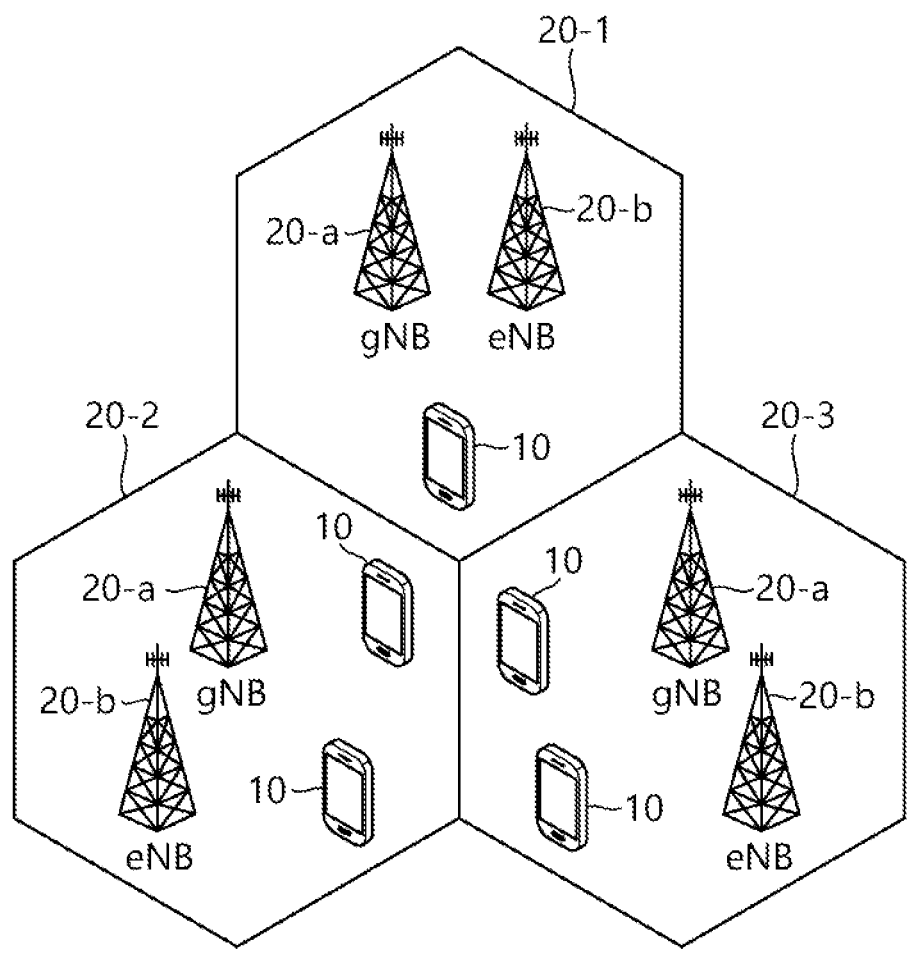
FIG. 1 is a wireless communication system.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner. The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may refer to "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may refer to "and/or". For example, "A/B" may refer to "A and/or B". Accordingly, "A/B" may refer to "only A", "only B", or "both A and B". For example, "A, B, C" may refer to "A, B, or C".

As used herein, "at least one of A and B" may refer to "only A", "only B", or "both A and B". In addition, the expression "at least one of A or B" or "at least one of A and/or B" may be understood as "At least one of A and B".

In addition, in this specification, "at least one of A, B and C" may refer to "only A", "only B", "only C", or "any combination of A, B and C". In addition, "at least one of A, B or C" or "at least one of A, B and/or C" may refer to "at least one of A, B and C".

In addition, the parentheses used herein may refer to "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, user equipment (UE) is illustrated by way of example, but the illustrated UE may be referred to as a terminal, mobile equipment (ME), and the like. In addition, the UE may be a portable device such as a laptop computer, a mobile phone, a PDA, a smart phone, a multimedia device, or the like, or may be a non-portable device such as a PC or a vehicle-mounted device.

Hereinafter, the UE is used as an example of a device capable of wireless communication (e.g., a wireless communication device, a wireless device, or a wireless device). The operation performed by the UE may be performed by any device capable of wireless communication. A device capable of wireless communication may also be referred to as a wireless communication device, a wireless device, or a wireless apparatus.

A base station, a term used below, generally refers to a fixed station that communicates with a wireless device, and may be called other terms such as an evolved-NodeB (eNodeB), an evolved-NodeB (eNB), a BTS (Base Transceiver System), an access point (Access Point), gNB (Next generation NodeB).

I. Techniques and Procedures Applicable to the Disclosure of the Present Specification FIG. 1 is a wireless communication system.

As can be seen with reference to FIG. 1, a wireless communication system includes at least one base station (BS). The BS is divided into a gNodeB (or gNB) 20a and an eNodeB (or an eNB) 20b. The gNB 20a supports 5G mobile communication. The eNB 20b supports 4G mobile communication, that is, long term evolution (LTE).

Each base station 20a and 20b provides a communication service for a specific geographic area (generally referred to as a cell) (20-1, 20-2, and 20-3). A cell may be again divided into a plurality of regions (referred to as sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
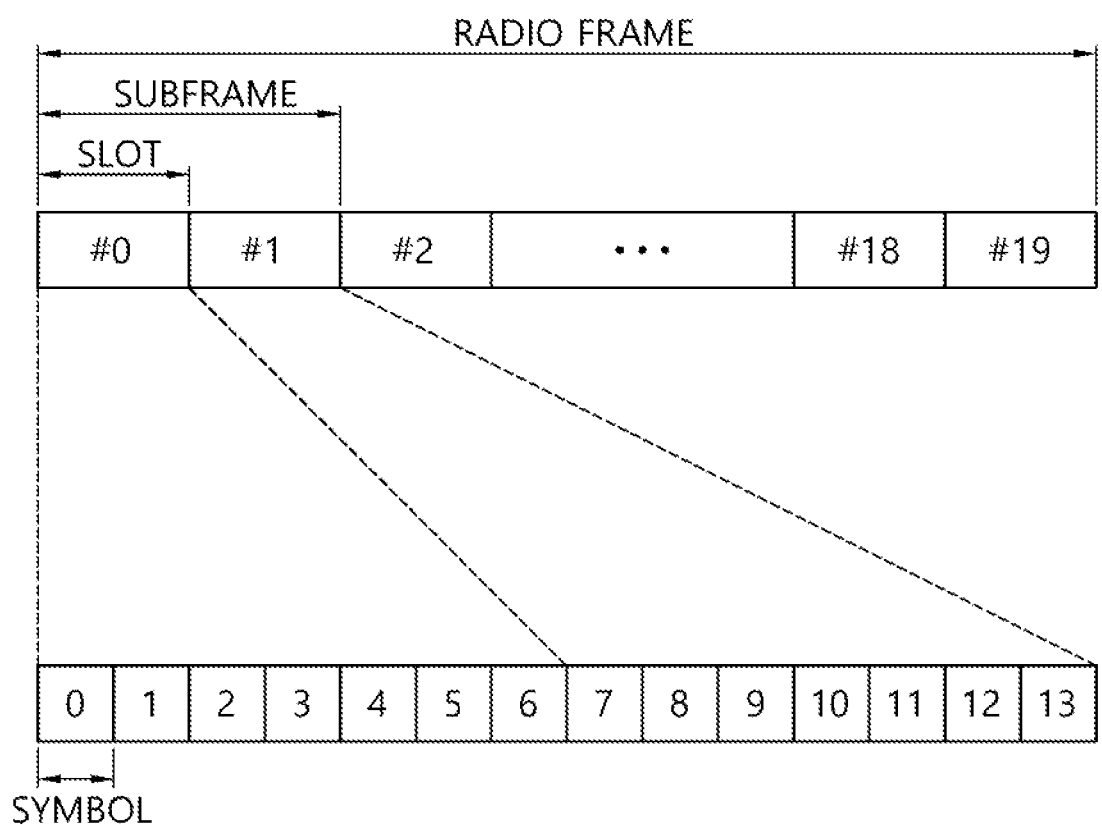
FIG. 2 shows a structure of a radio frame according to FDD in 3GPP LTE.

FIG. 2 shows a downlink radio frame structure according to FDD of 3rd generation partnership project (3GPP) long term evolution (LTE).

Referring to FIG. 2, a radio frame includes 10 subframes, and one subframe includes two slots. The slots in the radio frame are numbered from 0 to 19. A time taken for one subframe to be transmitted is referred to as a transmission time interval (TTI). The TTI may be referred to as a scheduling unit for data transmission. For example, a length of one radio frame may be 10 ms, a length of one subframe may be 1 ms, and a length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of orthogonal frequency division multiplexing (OFDM) symbols. How many OFDM symbols are included in one slot may vary according to a cyclic prefix (CP).

One slot includes NRB resource blocks (RBs) in the frequency domain. For example, in the LTE system, the number of resource blocks (RBs), i.e., NRB, may be one from 6 to 110.

The resource block (RB) is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

<Next-Generation Mobile Communication Network>

Thanks to the success of long term evolution (LTE)/LTE-advanced (LTE-A) for 4G mobile communication, interest in the next generation, i.e., 5-generation (so called 5G) mobile communication has been increased and researches have been continuously conducted.

The 5G mobile telecommunications defined by the International Telecommunication Union (ITU) refers to providing a data transmission rate of up to 20 Gbps and a feel transmission rate of at least 100 Mbps or more at any location. The official name is 'IMT-2020' and its goal is to be commercialized worldwide in 2300.

ITU proposes three usage scenarios, for example, enhanced Mobile Broad Band (eMBB) and massive machine type communication (mMTC) and ultra reliable and low latency communications (URLLC).

URLLC relates to usage scenarios that require high reliability and low latency. For example, services such as autonomous navigation, factory automation, augmented reality require high reliability and low latency (e.g., a delay time of 1 ms or less). Currently, the delay time of 4G (LTE) is statistically 21 to 43 ms (best 10%) and 33 to 75 ms (median). This is insufficient to support a service requiring a delay time of 1 ms or less. Next, an eMBB usage scenario relates to a usage scenario requiring a mobile ultra-wideband.

That is, the 5G mobile communication system aims at higher capacity than the current 4G LTE, may increase the density of mobile broadband users, and may support device to device (D2D), high stability and machine type communication (MTC). 5G research and development also aims at a lower latency time and lower battery consumption than a 4G mobile communication system to better implement the Internet of things. A new radio access technology (New RAT or NR) may be proposed for such 5G mobile communication.

The NR frequency band may be defined as two types of frequency ranges (FR1, FR2). The numerical value of the frequency range may be changed, and for example, the frequency ranges of the two types (FR1, FR2) may be as shown in Table 1 below. For convenience of explanation, among the frequency ranges used in the NR system, FR1 may refer to "sub 6 GHz range" and FR2 may refer to "above 6 GHz range" and may be called millimeter wave (mmWave).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a band of 4100 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or higher included in FR1 may include an unlicensed band. The unlicensed band can be used for various purposes, for example, for communication for a vehicle (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

<Operating Band in NR>

Operating bands in NR are as follows.

The operating bands of Table 3 below are operating bands refarmed from the operating band of LTE/LTE-A. This is called the FR1 band.

TABLE 3

| NR band operating | UL operating band $F_{UL\_low}$-$F_{UL\_high}$ | DL operating band $F_{DL\_low}$-$F_{DL\_high}$ | Duplex Mode |
| --- | --- | --- | --- |
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD1 |
| n51 | 1427 MHz-1432 MHz | 1427 MHz-1432 MHz | TDD |
| n66 | 1710 MHz-1780 MHz | 2110 MHz-2200 MHz | FDD |

TABLE 3-continued

| NR band operating | UL operating band $F_{UL\_low}$-$F_{UL\_high}$ | DL operating band $F_{DL\_low}$-$F_{DL\_high}$ | Duplex Mode |
|---|---|---|---|
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

The table below shows the NR operating bands defined on a high frequency phase. This is called the FR2 band.

TABLE 4

| NR band operating | UL operating band $F_{UL\_low}$-$F_{UL\_high}$ | DL operating band $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |
| n260 | 37000 MHz-40000 MHz | 37000 MHz-40000 MHz | FDD |
| n261 | 27500 MHz-28350 MHz | 27500 MHz-28350 MHz | FDD |

Figure 3A:
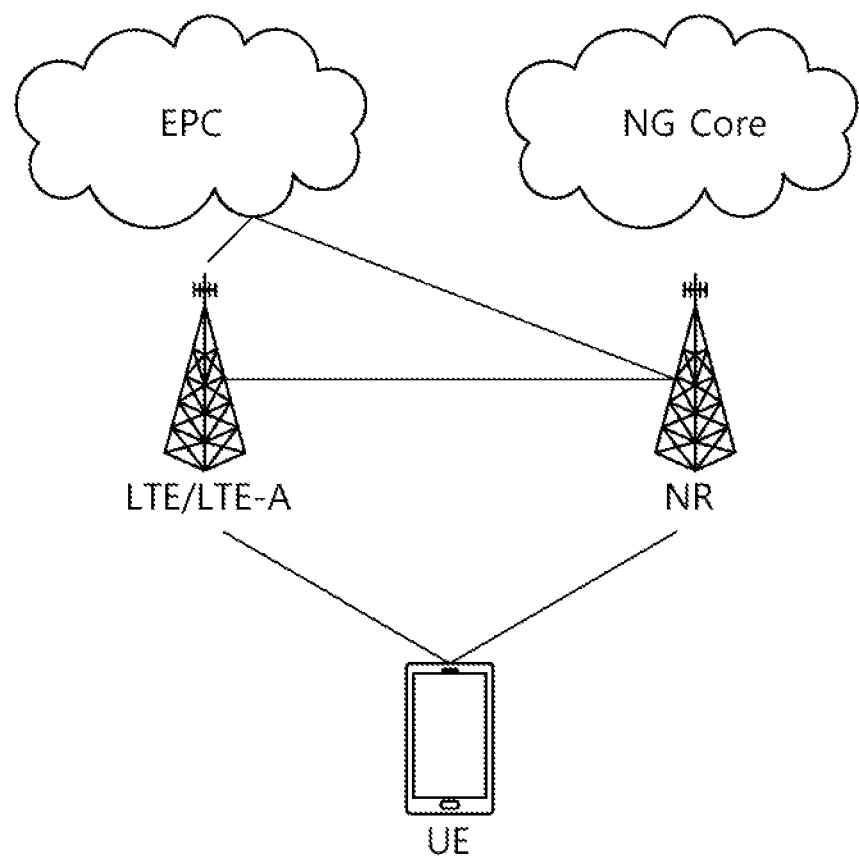
FIGS. 3a to 3c are diagrams illustrating an exemplary architecture for a service of next-generation mobile communication.
Figure 3B:
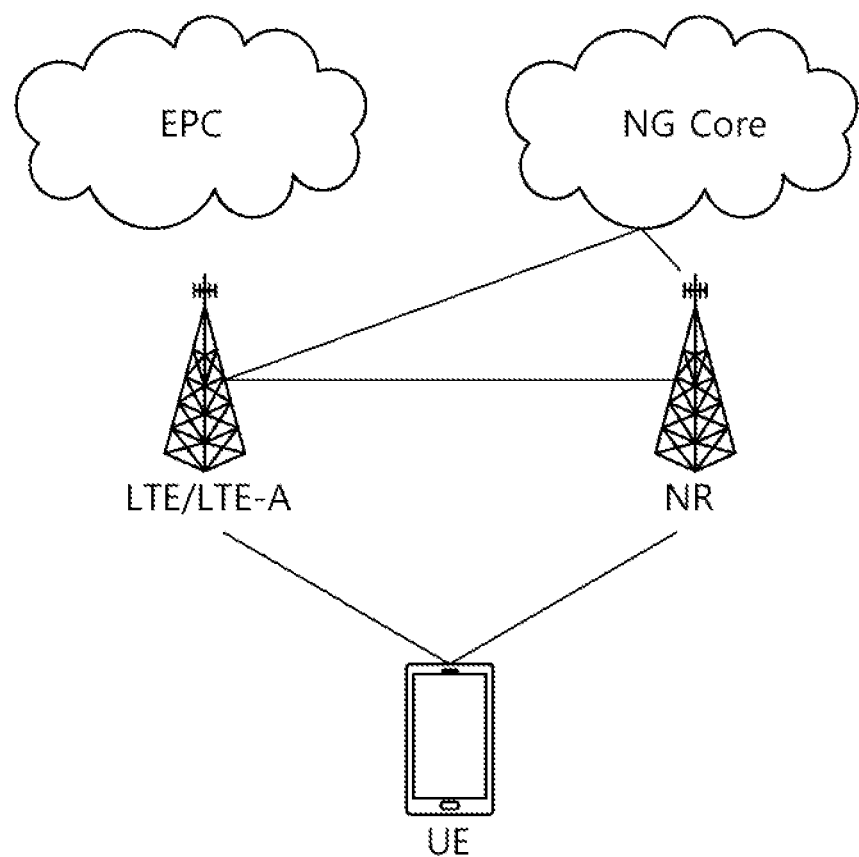
Figure 3C:
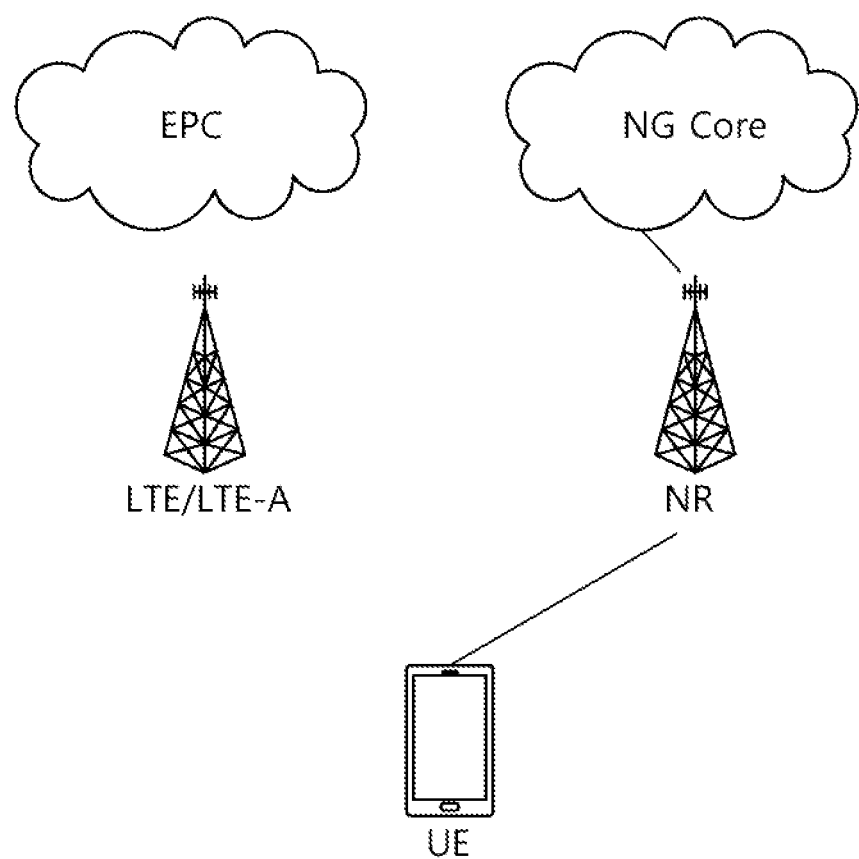

FIGS. 3a to 3c are exemplary diagrams illustrating exemplary architectures for services of the next generation mobile communication.

Referring to FIG. 3a, the UE is connected to LTE/LTE-A based cells and NR based cells in a dual connectivity (DC) manner.

The NR-based cell is connected to a core network for existing 4G mobile communication, that is, an evolved packet core (EPC).

Referring to FIG. 3b, unlike FIG. 3a, the LTE/LTE-A based cell is connected to a core network for the 5G mobile communication, that is, a next generation (NG) core network.

The service scheme based on the architecture as illustrated in FIGS. 3a and 3b is called non-standalone (NSA).

Referring to FIG. 3c, the UE is connected only to NR-based cells. The service method based on such an architecture is called standalone (SA).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

Figure 4:
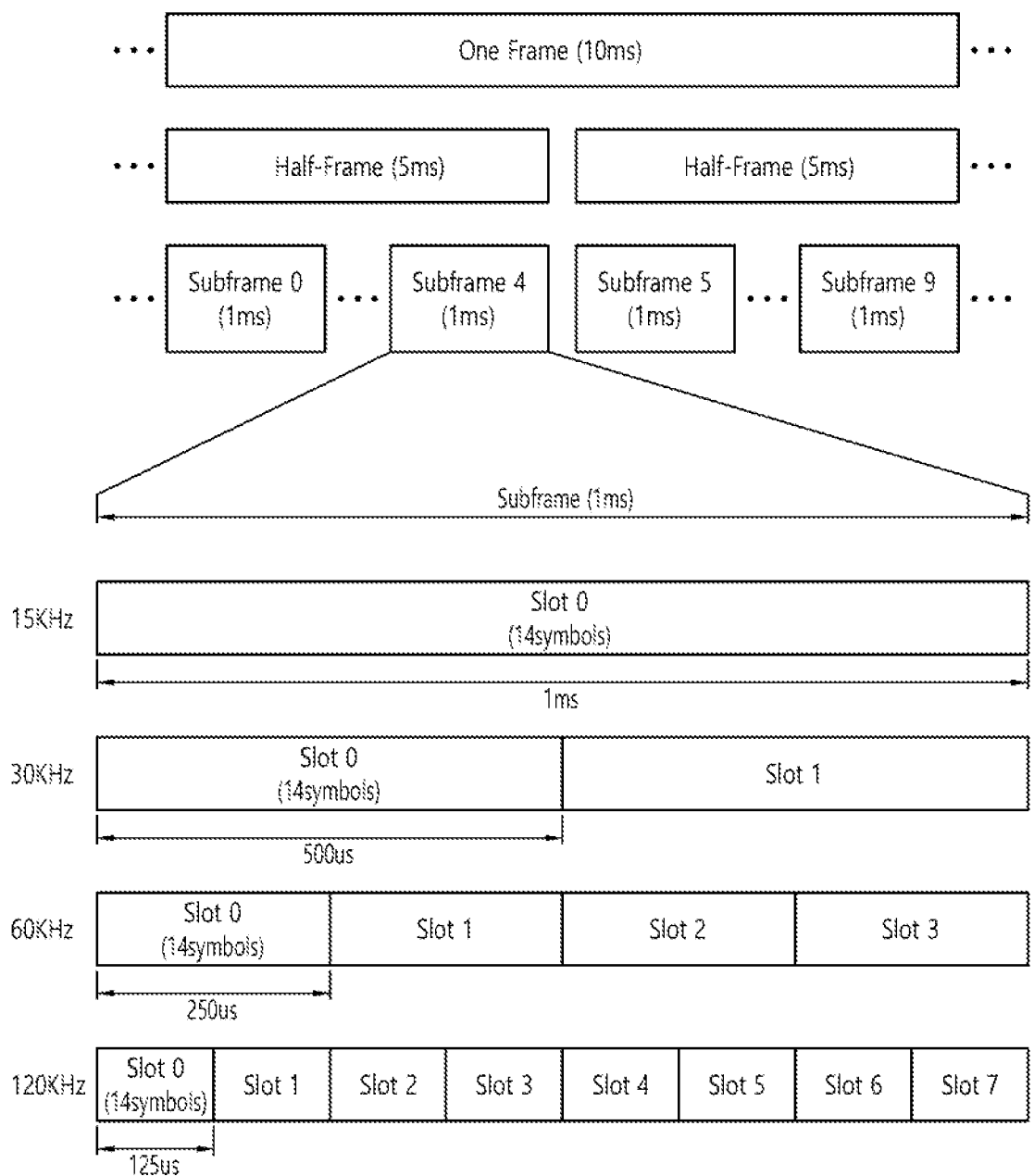
FIG. 4 illustrates a structure of a radio frame used in NR.

FIG. 4 illustrates a structure of a radio frame used in NR.

In NR, uplink and downlink transmission are composed of frames. The radio frame may have a length of 10 ms and may be defined as two 5-ms half-frames (HFs). Each half-frame may be defined as five 1-ms subframes (SFs). A subframe may be divided into one or more slots, and the number of slots in a subframe may depend on SCS (Sub-carrier Spacing). Each slot may include 12 or 14 OFDM(A) symbols according to a cyclic prefix (CP). In some implementations, if a CP is used, then each slot contains 14 symbols. If an extended CP is used, then each slot contains 12 symbols. The symbol may include, for example, an OFDM symbol (or a CP-OFDM symbol) and an SC-FDMA symbol (or a DFT-s-OFDM symbol.

FIG. 3 shows an example of subframe type in NR.

A transmission time interval (TTI) shown in FIG. 3 may be called a subframe or slot for NR (or new RAT). The subframe (or slot) in FIG. 3 may be used in a TDD system of NR (or new RAT) to minimize data transmission delay. As shown in FIG. 3, a subframe (or slot) includes 14 symbols as does the current subframe. A front symbol of the subframe (or slot) can be used for a downlink control channel, and a rear symbol of the subframe (or slot) can be used for a uplink control channel. Other channels can be used for downlink data transmission or uplink data transmission. According to such structure of a subframe (or slot), downlink transmission and uplink transmission may be performed sequentially in one subframe (or slot). Therefore, a downlink data may be received in the subframe (or slot), and a uplink acknowledge response (ACK/NACK) may be transmitted in the subframe (or slot).

A subframe (or slot) in this structure may be called a self-constrained subframe.

Specifically, first N symbols in a slot may be used to transmit a DL control channel (hereinafter, DL control region), and last M symbols in a slot may be used to transmit a UL control channel (hereinafter, UL control region). N and M are each an integer greater than or equal to 0. A resource region (hereinafter, referred to as a data region) between the DL control region and the UL control region can be used for DL data transmission or for UL data transmission. For example, a PDCCH may be transmitted in the DL control region and the PDSCH may be transmitted in the DL data region. A PUCCH may be transmitted in the UL control region, and a PUSCH may be transmitted in the UL data region.

If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

<Support of Various Numerology>

In a next system, a plurality of numerologies may be provided to a terminal according to the development of wireless communication technology. For example, when SCS is 15 kHz, it supports a wide area in traditional cellular bands, and when SCS is 30 kHz/60 kHz, it supports a dense-urban, lower latency and wider carrier bandwidth, and when SCS is 60 kHz or higher, it supports a bandwidth greater than 24.25 GHz to overcome phase noise.

The numerology may be defined by a cycle prefix (CP) length and a subcarrier spacing (SCS). One cell may provide a plurality of numerologies to the terminal. When an index of numerology is expressed as µ, an interval of each sub-carrier and a corresponding CP length may be as shown in the table below.

TABLE 5

| μ | Δf = $2^μ · 15$ [kHz] | CP |
| --- | --- | --- |
| 0 | 15 | general |
| 1 | 30 | general |
| 2 | 60 | general, extended |
| 3 | 120 | general |
| 4 | 240 | general |

In the case of general CP, when an index of numerology is expressed as μ, the number ($N^{slot}_{symb}$) of OFDM symbols per slot, the number of slots ($N^{frame,μ}_{slot}$) per frame, and the number ($N^{subframe,μ}_{slot}$) of slots per subframe are shown in the table below.

TABLE 6

| μ | $N^{slot}_{symb}$ | $N^{frame,μ}_{slot}$ | $N^{subframe,μ}_{slot}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of extended CP, when the index of numerology is expressed as μ, the number ($N^{slot}_{symb}$) of OFDM symbols per slot, the number ($N^{frame,μ}_{slot}$) of slots per frame, and) the number ($N^{subframe,μ}_{slot}$) of slots per subframe are shown in the table below.

TABLE 7

| μ | $N^{slot}_{symb}$ | $N^{frame,μ}_{slot}$ | $N^{subframe,μ}_{slot}$ |
| --- | --- | --- | --- |
| 2 | 12 | 40 | 4 |

<Bandwidth Part: BWP>

A wideband frequency maximally reaching 400 MHz may be used in NR. A new concept of BWP was introduced in NR to enable various UEs to efficiently distribute and use a frequency band.

When UEs transmit the information about their abilities to a base station while performing initial access, the base station may configure a BWP to be used by the UEs to the UEs and may transmit the information about the configured BWP to the UE. Accordingly, downlink and uplink data transmission and reception between the UEs and the base station are performed only through the BWP configured in the UEs. That is, configuring the BWP in the UEs by the base station is to instruct the UEs not to use frequency bands other than the BWP when performing wireless communication with the base station later.

The base station may configure the entire band of the carrier frequency reaching 400 MHz as the BWP for the UEs or may configure only some bands as the BWP for the UEs. Further, the base station may configure several BWPs for one UE. When several BWPs are configured for one UE, the frequency bands of the BWPs may overlap each other or not.

<Maximum Power Reduction (MPR) and Allowed Additional MPR (A-MPR)>

Figure 6A:
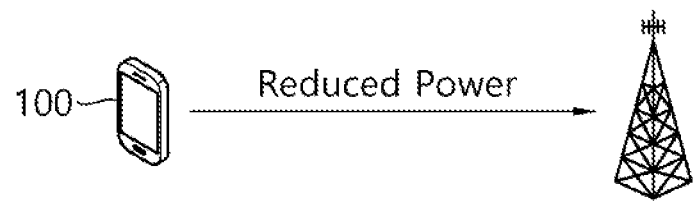
FIGS. 6a and 6b show an example of a method of limiting transmission power of a terminal.
Figure 6B:
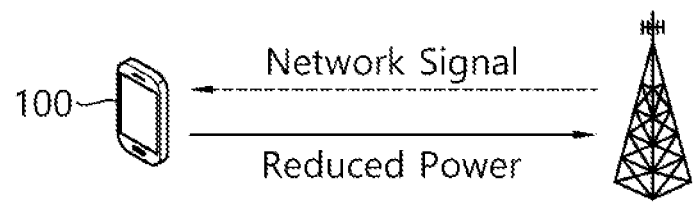

FIGS. 6a and 6b show an example of a method of limiting transmission power of a terminal.

Referring to FIG. 6a, the terminal 100 may perform transmission with limited transmission power. For example, the terminal 100 may perform uplink transmission for the base station through reduced transmission power.

When a peak-to-average power ratio (PAPR) value of a signal transmitted from the terminal 100 increases, in order to limit the transmission power, the terminal 100 applies a maximum output power reduction (MPR) value to the transmission power, thereby reducing linearity of a power amplifier PA inside the transceiver of the terminal 100.

Referring to FIG. 6b, a base station (BS) may request the terminal 100 to apply A-MPR by transmitting a network signal (NS) to the terminal 100. In order not to affect adjacent bands, etc., an operation related to A-MPR may be performed. Unlike the MPR described above, the operation related to the A-MPR is an operation in which the base station transmits NS to the terminal 100 operating in a specific operating band so that the terminal additionally performs power reduction. That is, when the terminal to which MPR is applied receives the NS, the terminal may determine transmission power by additionally applying A-MPR.

<MPR for Dual Connectivity (DC)>

MPR for a UE described below may be applied to a UE configured with E-UTRA new radio dual connectivity (EN-DC). When EN-DC is configured, the LTE network may operate as a master cell, and the NR network may operate as a secondary cell. For example, when the UE in which EN-DC is set receives a network signal (NS) (e.g., NS_01) to apply MPR in MCG (Master Cell Group) and SCG (Secondary Cell Group), the MPR described below may be applied to the UE.

1) Intra-Band Contiguous EN-DC

The MPR applied in the intra-band contiguous EN-DC situation will be described first.

When intra-band contiguous EN-DC is configured for the UE, the UE may determine a total allowed maximum output power reduction as described below.

For a UE supporting dynamic power sharing, the following may be applied:

For MCG, $MPR_c$ may be applied. $MPR_c$ is an MPR value for MCG, and a conventionally defined MPR value may be used.

For SCG, $MPR'_c$ may be applied. $MPR'_c$ may be an MPR value applied for SCG. $MPR'_c$ may be defined as follows. $MPR'_c = MPR_{NR} = MAX(MPR_{single,NR}, MPR_{ENDC})$. $MPR_{single,NR}$ may be MPR for NR, and $MPR_{END}$ may be MPR for EN-DC.

For a total configured transmission power, $MPR_{tot}$ may be applied. $MPR_{tot}$ may refer to an MPR value applied to the total configured transmission power. $MPR_{tot}$ may be defined as follows. $MPR_{tot} = P_{PowerClass,EN-DC} - \min(P_{PowerClass,EN-DC}, 10*\log_{10}(10^{((P_{PowerClass,E-UTRA} - MPR_{E-UTRA})/10)} + 10^{((P_{PowerClass,NR} - MPR_{NR})/10)}))$.

$P_{PowerClass,EN-DC}$ may be transmission power applied in the case of EN-DC according to power class of the UE. $P_{PowerClass,E-UTRA}$ may be transmission power applied in the case of E-UTRA according to power class of the UE.

Here, $MPR_{E-UTRA}$ may be defined as $MPR_{E-UTRA} = MAX(MPR_{single,E-UTRA}, MPR_{ENDC})$.

For reference, $MPR_{single,E-UTRA}$ may refer to MPR defined for E-UTRA transmission. $MPR_{single,NR}$ may refer to an MPR defined for NR transmission.

For a UE that does not support dynamic power sharing, the following may be applied:

For MCG, MPRc may be applied. MPRc may be defined as follows. $MPR_c = MAX(MPR_{single,E-UTRA}, MPR_{ENDC})$ For SCG, MPR'c may be applied. MPR'c may be defined as follows. $MPR'_c = MAX(MPR_{single,NR}, MPR_{ENDC})$ For reference, $MPR_{single,\ E-UTRA}$ may refer to MPR defined for E-UTRA transmission. $MPR_{single,NR}$ may refer to an MPR defined for NR transmission.

1-1) MPR for power class 3 and power class 2

MPR applicable to power class 3 UE and power class 2 UE will be described. Here, the power class 3 UE and the power class 2 UE may be UEs supporting a dual power amplifier (PA) architecture, and these UEs may transmit information (e.g., dualPA-Architecture) that supports the dual PA architecture to the base station. The ENDC power class of these UEs may be the same as the E-UTRA power class and the NR power class. Allowed maximum output power reduction applied to transmission for MCG and SCG may be defined as follows:

$MPR_{ENDC} = M_A$

Here, $M_A$ may be defined as follows.

$M_A = [15]$; $0 \le B < 0.5$
$[10]$; $0.5 \le B < 1.0$
$[8]$; $1.0 \le B < 2.0$
$[6]$; $2.0 \le B$

In the definition for MA, the value B may be defined as follows:

For a UE supporting dynamic power sharing, it may be defined as $B = (L_{CRB\_alloc,E-UTRA} * 12 * SCS_{E-UTRA} + L_{CRB\_alloc,NR} * 12 * SCS_{NR})/1,000,000$. Here, $SCS_{E-UTRA}$ may refer to subcarrier spacing used for E-UTRA signal transmission, and $SCS_{NR}$ may refer to subcarrier spacing used for NR signal transmission. $L_{CRB\_alloc,E-UTRA}$ may refer to a transmission bandwidth indicating a length of a contiguous resource block allocation allocated for E-UTRA expressed in transmission bandwidth resource block (RB) units. $L_{CRB\_alloc,NR}$ may refer to a transmission bandwidth indicating a length of a contiguous resource block allocation allocated for an NR expressed in transmission bandwidth resource block (RB) units.

For UEs that do not support dynamic power sharing, in the case of E-UTRA, B may be defined as follows. $B = (L_{CRB\_alloc,\ E-UTRA} * 12 * SCS_{E-UTRA} + 12 * SCS_{NR})/1,000,000$. Here, when calculating B, $SCS_{E-UTRA}$ may be assumed to be 15 kHz.

In the case of NR, B may be defined as follows. $B = (12 * SCS_{E-UTRA} + L_{CRB\_alloc,NR} * 12 * SCS_{NR})/1,000,000$. Here, when calculating B, $SCS_{E-UTRA}$ may be assumed to be 15 kHz.

Also, for B<2, the $M_A$ value may decrease by 1 dB.

2) Intra-Band Non-Contiguous EN-DC

MPR applied in the intra-band non-contiguous EN-DC situation will be described first.

When intra-band non-contiguous EN-DC is configured for the UE, the UE may determine a total allowed maximum output power reduction as described below.

For a UE supporting dynamic power sharing, the following may be applied:

For MCG, $MPR_c$ may be applied. $MPR_c$ is an MPR value for MCG, and a conventionally defined MPR value may be used.

For SCG, $MPR'_c$ may be applied. $MPR'_c$ may be an MPR value applied for SCG. $MPR'_c$ may be defined as follows. $MPR'_c = MPR_{NR} = MAX(MPR_{single,NR}, MPR_{ENDC})$. $MPR_{single,NR}$ may be MPR for NR, and $MPR_{ENDC}$ may be MPR for EN-DC.

For a total configured transmission power, $MPR_{tot}$ may be applied. $MPR_{tot}$ may refer to an MPR value applied to the total configured transmission power. $MPR_{tot}$ may be defined as follows. $MPR_{tot} = P_{PowerClass,EN-DC} - \min(P_{PowerClass,EN-DC}, 10*\log_{10}(10^{((P_{PowerClass,E-UTRA} - MPR_{E-UTRA})/10)} + 10^{((P_{PowerClass,NR} - MPR_{NR})/10)}))$.

Here, $MPR_{E-UTRA}$ may be defined as $MPR_{E-UTRA} = MAX(MPR_{single,E-UTRA}, MPR_{ENDC})$.

For reference, $MPR_{single,\ E-UTRA}$ may refer to MPR defined for E-UTRA transmission. $MPR_{single,NR}$ may refer to an MPR defined for NR transmission.

For a UE that does not support dynamic power sharing, the following may be applied:

For MCG, MPRc may be applied. MPRc may be defined as follows. $MPR_c = MAX(MPR_{single,E-UTRA}, MPR_{ENDC})$ For SCG, MPR'c may be applied. MPR'c may be defined as follows. $MPR'_c = MAX(MPR_{single,NR}, MPR_{ENDC})$ For reference, $MPR_{single,\ E-UTRA}$ may refer to MPR defined for E-UTRA transmission. $MPR_{single,NR}$ may refer to an MPR defined for NR transmission.

2-1) MPR for Power Class 3 and Power Class 2

MPR applicable to power class 3 UE and power class 2 UE will be described. Here, the power class 3 UE and the power class 2 UE may be UEs supporting a dual power amplifier (PA) architecture, and these UEs may transmit information (e.g., dualPA-Architecture) that supports the dual PA architecture to the base station. The ENDC power class of these UEs may be the same as the E-UTRA power class and the NR power class. Allowed maximum output power reduction applied to transmission for MCG and SCG may be defined as follows:

$MPR_{ENDC} = M_A$

Here, $M_A$ may be defined as follows:

$M_A = [18]$; $0 \le B < 1.0$
$[17]$; $1.0 \le B < 2.0$
$[16]$; $2.0 \le B < 5.0$
$[15]$; $5.0 \le B$

In the definition for MA, the value B may be defined as follows:

For a UE supporting dynamic power sharing, it may be defined as $B = (LCRB\_alloc,E-UTRA*12*SCSE-UTRA + LCRB\_alloc,NR*12*SCSNR)/1,000,000$. Here, SCSE-UTRA may refer to subcarrier spacing used for E-UTRA signal transmission, and SCSNR may refer to subcarrier spacing used for NR signal transmission. LCRB\_alloc,E-UTRA may refer to a transmission bandwidth indicating the length of a contiguous resource block allocation allocated for E-UTRA expressed in transmission bandwidth resource block (RB) units. LCRB\_alloc,NR may refer to a transmission bandwidth indicating the length of a contiguous resource block allocation allocated to an NR expressed in transmission bandwidth resource block (RB) units.

For UEs that do not support dynamic power sharing, in the case of E-UTRA, B may be defined as follows. $B = (L_{CRB\_alloc,\ E-UTRA} * 12 * SCS_{E-UTRA} + 12 * SCS_{NR})/1,000,000$. Here, when calculating B, $SCS_{E-UTRA}$ may be assumed to be 15 kHz.

In the case of NR, B may be defined as follows. $B = (12 * SCS_{E-UTRA} + L_{CRB\_alloc,NR} * 12 * SCS_{NR})/1,000,000$. Here, when calculating B, $SCS_{E-UTRA}$ may be assumed to be 15 kHz.

Also, for B<2, the $M_A$ value may decrease by 1 dB.

<A-MPR for Dual Connectivity (DC)>

1) Intra-Band Contiguous EN-DC

A-MPR for a UE described below may be applied to a UE configured with E-UTRA new radio dual connectivity (EN-DC). For example, when the UE configured with EN-DC receives a network signal (NS) (e.g., NS_04) to apply A-MPR in master cell group (MCG) and secondary cell group (SCG), A-MPR described below may be applied to the UE.

In the case of EN-DC band combination in which an additional requirement exists, EN-DC is configured, and an A-MPR value allowed for the UE in which a combination of network signaling values indicated in a E-UTRA cell group and an NR cell group is set are as follows.

Unless otherwise specified, A-MPR described below may refer to a total power reduction allowed to include MPR in an intra-band contiguous EN-DC configuration.

For example, there may be a UE configured with intra-band contiguous EN-DC based on LTE band 41 and NR band n41. When this UE receives a network signaling value NS_01 or NS_04 in E-UTRA and receives a network signaling value NS_04 in NR, A-MPR described below may be applied. For reference, when a combination of network signaling values is set in two cell groups (CG) for the UE configured with EN-DC, an additional emission requirement may also be indicated. In addition, A-MPR described below may be applied to a UE supporting dual transmission in an intra-band contiguous EN-DC combination based on LTE band 41 and NR band n41.

1-1) A-MPR for NS_04

B41/n41 intra-band contiguous EN-DC is configured to the UE, and when the UE receives an NS_04 information element (IE) from the base station, the UE may determine a total allowed maximum output power reduction as described below. A-MPR for EN-DC defined below is not additionally used for MPR but may be used instead of MPR. Therefore, when the UE receives NS_04, the EN-DC MPR value may be 0.

For a UE supporting dynamic power sharing, the following may be applied:

For MCG, A-MPR$_c$ may be applied. A-MPR$_c$ is an A-MPR value for MCG, and a conventionally defined A-MPR value may be used.

For SCG, A-MPR'$_c$ may be applied. A-MPR'$_c$ may be an A-MPR value applied for SCG. A-MPR'c may be defined as follows. A-MPR'$_c$=A-MPR$_{NR}$=MAX(A-MPR$_{single,NR}$, A-MPR$_{IM3}$). MPR$_{single,NR}$ may refer to MPR for NR, and A-MPR$_{IM3}$ may refer to A-MPR related to IM3 (3$^{rd}$ intermodulation). Specifically, A-MPR$_{IM3}$ may refer to A-MPR applied when reversed IMD3 occurs.

For the total configured transmission power, A-MPR$_{tot}$ may be applied. A-MPRtot may refer to an A-MPR value applied to the total set transmission power. A-MPR$_{tot}$ may be defined as follows. A-MPR$_{tot}$=P$_{PowerClass,EN-DC}$−min(P$_{PowerClass,EN-DC}$, 10*log$_{10}$(10^((P$_{PowerClass,E-UTRA}$−A-MPR$_{E-UTRA}$)/10)+ 10^((P$_{PowerClass,NR}$−A-MPR$_{NR}$)/10)).

Here, A-MPR$_{E-UTRA}$ may be defined as A-MPR$_{E-UTRA}$=MAX(A-MPR$_{single,E-UTRA}$+ MPR$_{single,E-UTRA}$, A-MPR$_{IM3}$).

For reference, A-MPR$_{single,E-UTRA}$ may refer to A-MPR defined for E-UTRA transmission. A-MPRsingle,NR may refer to an A-MPR value defined for NR transmission. MPR$_{single,E-UTRA}$ may refer to an MPR defined for E-UTRA transmission.

For a UE that does not support dynamic power sharing, the following may be applied:

For MCG, A-MPR$_c$ may be applied. A-MPR$_c$ may be defined as A-MPR$_c$=MAX(A-MPR$_{single, E-UTRA}$+ MPR$_{single,E-UTRA}$, A-MPR$_{IM3}$).

For SCG, A-MPR'$_c$ may be applied. A-MPR'$_c$ may be an A-MPR value applied for SCG. A-MPR'$_c$ may be defined as A-MPR'$_c$=MAX(A-MPR$_{single,NR}$, A-MPR$_{IM3}$).

For reference, A-MPR$_{single,E-UTRA}$ may refer to A-MPR defined for E-UTRA transmission. A-MPR$_{single,NR}$ may refer to an A-MPR value defined for NR transmission. MPR$_{single, E-UTRA}$ may refer to MPR defined for E-UTRA transmission.

The UE may determine channel establishment case and A-MPR$_{IM3}$ as follows:

In the case of F$_{IM3,low\_block,low}$<2490.5 MHz,
A-MPR$_{IM3}$ defined in channel configuration case B and 1-1-ii) below may be used.

When it is not F$_{IM3,low\_block,low}$<2490.5 MHz,
A-MPR$_{IM3}$ defined in channel configuration case A and 1-1-i) below may be used.

Here, F$_{IM3,low\_block,low}$ may be defined as F$_{IM3,low\_block,low}$=(2*F$_{low\_channel,low\_edge}$)− F$_{high\_channel,high\_edge}$. F$_{low\_channel,low\_edge}$ may refer to the lowermost frequency of lower transmission bandwidth configuration. F$_{low\_channel,low\_edge}$ may refer to the the uppermost frequency of upper transmission bandwidth configuration.

1-1-i) A-MPR$_{IM3}$ for NS_04 that Meets −13 dBm/1 MHz

Hereinafter, for a UE supporting 26 dBm UE power, A-MPR$_{IM3}$ for NS_04 that meets −13 dBm/1 MHz will be described. A-MPR described below may be related to 26 dBm UE power for power class 2 Cell Group. The same A-MPR can be used for 23 dBm UE power communicating with the power class 3 Cell Group. When channel configuration case A or channel configuration case C is configured in the UE, allowed maximum output power reduction for IM3 may be applied to transmission for MCG and SCG in a non-contiguous resource allocation situation. Here, an example in which the allowed maximum output voltage reduction for IM3 is applied may be defined as follows:

A-MPRIM3=M$_A$. Here, A-MPR$_{IM3}$ may refer to an A-MPR value for IM3. M$_A$ may be defined as follows.

M$_A$=15; 0≤B<0.5
10; 0.5≤B<1.0
8; 1.0≤B<2.0
6; 2.0≤B

In the definition for M$_A$, the value B may be defined as follows:

For a UE supporting dynamic power sharing,
it may be defined as B=(L$_{CRB\_alloc,E-UTRA}$*12* SCS$_{E-UTRA}$+L$_{CRB\_alloc,NR}$*12*SCS$_{NR}$)/1,000,000. Here, SCS$_{E-UTRA}$ may refer to subcarrier spacing used for E-UTRA signal transmission, and SCS$_{NR}$ may refer to subcarrier spacing used for NR signal transmission. L$_{CRB\_alloc,E-UTRA}$ may refer to a transmission bandwidth indicating a length of a contiguous resource block allocation allocated for E-UTRA expressed in transmission bandwidth resource block (RB) units. L$_{CRB\_alloc,NR}$ may refer to a transmission bandwidth indicating a length of a contiguous resource block allocation allocated for an NR expressed in transmission bandwidth resource block (RB) units.

For UEs that do not support dynamic power sharing,
in the case of E-UTRA, B may be defined as follows.
B=(L$_{CRB\_alloc, E-UTRA}$*12*SCS$_{E-UTRA}$+12*SCS$_{NR}$)/1,000, 000. Here, when calculating B, SCS$_{E-UTRA}$ may be assumed to be 15 kHz.

Also, for B<2, the M$_A$ value may decrease by 1 dB.

1-1-11) A-MPR for NS_04 that Meets −25 dBm/1 MHz

Hereinafter, for a UE supporting 26 dBm UE power, A-MPR for NS_04 that meets −13 dBm/1 MHz will be described. A-MPR described below may be related to 26 dBm UE power for power class 2 Cell Group. The same A-MPR can be used for 23 dBm UE power communicating with the power class 3 Cell Group. When channel configuration case B or channel configuration case D is configured in the UE, allowed maximum output power reduction for IM3 may be applied to transmission for MCG and SCG in a non-contiguous resource allocation situation. Here, an example in which the allowed maximum output voltage reduction for IM3 is applied may be defined as follows:

A-MPR$_{IM3}$=M$_A$. Here, A-MPR$_{IM3}$ may refer to the A-MPR value for IM3. M$_A$ may be defined as follows.

M$_A$=15; 0≤B<1.0
14; 1.0≤B<2.0
13; 2.0≤B<5.0
12; 5.0≤B

In the definition for MA, the value B may be defined as follows:

For a UE supporting dynamic power sharing, it may be defined as B=(L$_{CRB\_alloc,E-UTRA}$*12*SCS$_{E-UTRA}$+L$_{CRB\_alloc,NR}$*12*SCS$_{NR}$)/1,000,000. Here, SCS$_{E-UTRA}$ may refer to subcarrier spacing used for E-UTRA signal transmission, and SCS$_{NR}$ may refer to subcarrier spacing used for NR signal transmission. L$_{CRB\_alloc,E-UTRA}$ may refer to a transmission bandwidth indicating a length of a contiguous resource block allocation allocated for E-UTRA expressed in transmission bandwidth resource block (RB) units. L$_{CRB\_alloc,NR}$ may refer to a transmission bandwidth indicating a length of a contiguous resource block allocation allocated for an NR expressed in transmission bandwidth resource block (RB) units.

For UEs that do not support dynamic power sharing,
in the case of E-UTRA, B may be defined as follows. B=(L$_{CRB\_alloc, E-UTRA}$*12*SCS$_{E-UTRA}$+12*SCS$_{NR}$)/1,000,000. Here, when calculating B, SCS$_{E-UTRA}$ may be assumed to be 15 kHz.

In the case of NR, B may be defined as follows. B=(12*SCS$_{E-UTRA}$+L$_{CRB\_alloc,NR}$*12*SCS$_{NR}$)/1,000,000. Here, when calculating B, SCS$_{E-UTRA}$ may be assumed to be 15 kHz.

Also, for B<2, the M$_A$ value may decrease by 1 dB.

2) Intra-Band Non-Contiguous EN-DC

A-MPR for a UE described below may be applied to a UE configured with E-UTRA new radio dual connectivity (EN-DC). For example, when the UE configured with EN-DC receives a network signal (NS) (e.g., NS_04) to apply A-MPR in master cell group (MCG) and secondary cell group (SCG), A-MPR described below may be applied to the UE.

In the case of intra-band EN-DC band combination in which an additional requirement exists, EN-DC is configured, and an A-MPR value allowed for the UE in which a combination of network signaling values indicated in a E-UTRA cell group and an NR cell group is set are as follows. Unless otherwise specified, A-MPR described below may refer to a total power reduction allowed to include MPR in an intra-band non-contiguous EN-DC configuration.

For example, there may be a UE configured with intra-band contiguous EN-DC based on LTE band 41 and NR band n41. When this UE receives a network signaling value NS_01 or NS_04 in E-UTRA and receives a network signaling value NS_04 in NR, A-MPR described below may be applied. For reference, when a combination of network signaling values is set in two cell groups (CG) for the UE configured with EN-DC, an additional emission requirement may also be indicated. For reference, if a combination of network signaling values is configured in two cell groups (CG) for a UE configured with EN-DC, requirements related to A-MPR may be applied. In addition, A-MPR described below may be applied to a UE supporting dual transmission in an intra-band contiguous EN-DC combination based on LTE band 41 and NR band n41

2-1) A-MPR for NS_04

B41/n41 intra-band contiguous EN-DC is configured to the UE, and when the UE receives an NS_04 information element (IE) from the base station, the UE may determine a total allowed maximum output power reduction as described below. A-MPR for EN-DC defined below is not additionally used for MPR but may be used instead of MPR. Therefore, when the UE receives NS_04, the EN-DC MPR value may be 0.

For a UE supporting dynamic power sharing, the following may be applied:

For MCG, A-MPR$_c$ may be applied. A-MPR$_c$ is an A-MPR value for MCG, and a conventionally defined A-MPR value may be used.

For SCG, A-MPR'$_c$ may be applied. A-MPR'$_c$ may be an A-MPR value applied for SCG. A-MPR'$_c$ may be defined as follows. A-MPR'$_c$=A-MPR$_{NR}$=MAX(A-MPR$_{single,NR}$, A-MPR$_{EN-DC}$)

For the total configured transmission power, A-MPR$_{tot}$ may be applied. A-MPR$_{tot}$ may refer to an A-MPR value applied to the total set transmission power. A-MPR$_{tot}$ may be defined as follows. A-MPR$_{tot}$=P$_{PowerClass,EN-DC}$−min(P$_{PowerClass,EN-DC}$,10 log$_{10}$(10^((P$_{PowerClass,E-UTRA}$−A-MPR$_{E-UTRA}$)/10)+10^((P$_{PowerClass,NR}$−A-MPR$_{NR}$)/10)).

Here, A-MPR$_{E-UTRA}$ may be defined as A-MPR$_{E-UTRA}$=MAX(A-MPR$_{single,E-UTRA}$+MPR$_{single,E-UTRA}$, A-MPR$_{IM3}$).

Here, A-MPR$_{EN-DC}$ may be defined as follows. −MPR$_{EN-DC}$=MAX(A-MPR$_{IM3}$, A-MPR$_{ACLRoverlap}$)

For reference, A-MPR$_{single,E-UTRA}$ may refer to A-MPR defined for E-UTRA transmission. A-MPR$_{single,NR}$ may refer to an A-MPR value defined for NR transmission. MPR$_{single,E-UTRA}$ may refer to an MPR defined for E-UTRA transmission.

For a UE that does not support dynamic power sharing, the following may be applied:

For MCG, A-MPR$_c$ may be applied. A-MPR$_c$ may be defined as A-MPR$_c$=MAX(A-MPR$_{single, E-UTRA}$+MPR$_{single,E-UTRA}$, A-MPR$_{IM3}$, A-MPR$_{ACLRoverlap}$).

For SCG, A-MPR'$_c$ may be applied. A-MPR'$_c$ may be an A-MPR value applied for SCG. A-MPR'$_c$ may be defined as A-MPR'$_c$=MAX(A-MPR$_{single,NR}$, A-MPR$_{IM3}$, A-MPR$_{ACLR}$ overlap).

For reference, A-MPR$_{single,E-UTRA}$ may refer to A-MPR defined for E-UTRA transmission. A-MPR$_{single,NR}$ may refer to an A-MPR value defined for NR transmission. MPR$_{single, E-UTRA}$ may refer to MPR defined for E-UTRA transmission.

The UE may determine a channel configuration case and A-MPR$_{IM3}$ as follows:

In the case of AND(F$_{IM3,low\_block,high}$<F$_{filter,low}$, MAX (SEM$_{-13,high}$, F$_{IM3,high\_block,low}$)>F$_{filter,high}$) (if both conditions included in AND are satisfied), channel configuration case C and A-MPR$_{IM3}$ as defined above in 1-1-i) may be used.

If AND(F$_{IM3,low\_block,high}$<F$_{filter,low}$, MAX(SEM$_{-13,high}$, F$_{IM3,high\_block,low}$)>F$_{filter,high}$) is not, the channel configuration case D and A-MPR$_{IM3}$ as defined above in 1-1-i) may be used.

Here, F$_{IM3,low\_block,low}$ may be defined as F$_{IM3,low\_block,low}$=(2*F$_{low\_channel,low\_edge}$)−F$_{high\_channel,low\_edge}$. F$_{IM3,high\_block,low}$ may be defined as F$_{IM3,high\_block,low}$=(2*F$_{high\_channel,low\_edge}$)−F$_{low\_channel,high\_edge}$. F$_{low\_channel,low\_edge}$ may refer to the lowermost frequency of lower transmission bandwidth configuration. $F_{low\_channel,high\_edge}$ may refer to the uppermost frequency of lower transmission bandwidth configuration.

$F_{high\_channel,low\_edge}$ may refer to the lowermost frequency of upper transmission bandwidth configuration. $F_{high\_channel,high\_edge}$ may refer to the uppermost frequency of upper transmission bandwidth configuration.

$F_{filter,low}$ may be 2480 MHz. $F_{filter,high}$ may be 2745 MHz. $SEM_{-13,high}$ may refer to a threshold frequency at which an upper spectral emission mask for an upper channel drops from −13 dBm/1 MHz to −25 dBm/1 MHz.

The UE may determine the A-MPR$_{ACLoverlap}$ value as follows. When $W_{gap}$ is less than $BW_{channel,E-UTRA}+BW_{channel,NR}$, the A-MPR$_{ACLoverlap}$ value may be 4 dB. When $W_{gap}$ is greater than or equal to $BW_{channel,E-UTRA}+BW_{channel,NR}$, the A-MPR$_{ACLRoverlap}$ value may be 0 dB. Here, the $W_{gap}$ value may be defined as follows. $W_{gap}=F_{high\_channel,low\_edge}-F_{low\_channel,high\_edge}$.

II. Disclosures of Present Specification

The disclosure of the present specification proposes maximum output power requirements (or a requirements) applied to a 29 dBm high-power terminal in LTE band 41 and NR band 41 EN-DC mode. A 29 dB high-power terminal may refer to a terminal capable of transmitting a signal based on a transmission power of 29 dB or more. For example, the maximum output power requirements may be new additional maximum output power requirements. As an example, the maximum output power requirement may be a maximum output power reduction (MPR) value and/or an additional maximum output power reduction (A-MPR) value.

For reference, as an example of a wireless communication device capable of performing wireless communication hereinafter, terms such as "terminal" and "UE" may be used. For reference, the A-MPR value described in the disclosure of this specification may be an example of the maximum output power requirements. The same value as the A-MPR value described in the disclosure of this specification may be used as the MPR value.

1. First Example of the Disclosure of the Present Specification

A first example of the disclosure of the present specification proposes maximum output power requirements (or requirements) applied to a 29 dBm high-power terminal in LTE band 41+NR band 41 EN-DC mode. Here, the LTE band 41+NR band 41 EN-DC mode may refer to a communication mode in which the UE operates based on EN-DC using LTE band 41 and NR band 41 (e.g., n41). For example, the maximum output power requirements may be new additional maximum output power requirements. As an example, the maximum output power requirement may be a maximum output power reduction (MPR) value and/or an additional maximum output power reduction (A-MPR) value.

In the related art, only the A-MPR performance requirements for the 26 dBm high-power terminal supporting the LTE band 41+NR band 41 EN-DC operation are defined. The UE may transmit a signal using two different power amplifiers instead of one power amplifier in LTE band 41+NR band 41 EN-DC. When a terminal transmits signals using two different power amplifiers, reverse 3rd intermodulation distortion (1 MB) (IMD3) may occur in a spectrum emission mask and spurious emissions region due to the signals transmitted in the two different power amplifiers.

In the related art, additional maximum output power requirements (e.g., A-MPR) are defined in consideration of reverse IMD3 occurring in a band adjacent to the terminal due to the signals transmitted in two Tx chains of a 26 dBm high-power terminal. For example, by introducing NS_04 signaling instead of MPR considering reverse IMD3, additional maximum output power requirements (e.g., A-MPR) that meet the −13 dBm/MHz SEM limit and −25 dBm/MHz in an intra-band contiguous and/or non-contiguous EN-DC situation based on LTE band 41 (or E-UTRA band 41).

Recently, there have been attempts to define the maximum output power requirements for maximum output power requirements supporting a 29 dBm high-power terminal. For example, attempts have been made to allow the 29 dBm high-power terminal to have wider coverage by relaxing the maximum output power requirements (e.g., A-MPR value and/or MPR value) applied to the conventional 26 dBm high-power terminal in anticipation of improving the performance of RF components mounted on the terminal.

However, RF components having improved performance are more expensive than the existing RF components, and when the maximum output power requirements (e.g., A-MPR value and/or MPR value) applied to the conventional 26 dBm high-power terminal are relaxed, a terminal antenna design needs to be improved. Because of this problem, terminal companies (e.g., terminal manufacturers) started to discuss how the maximum output power requirements (e.g., A-MPR value and/or MPR value) supporting the 29 dBm high-output terminal is to be applied differently from the maximum output power requirements for the existing terminal according to a resource block (RB) size of LTE and NR, instead of hardware point of view.

Operators (e.g., communication network operators) suggested applying 20 dB antenna isolation. In a third example of the disclosure of the present specification, based on a 13 dB antenna isolation value relaxed more than the 20 dB antenna isolation proposed by the operators and a 10 dB antenna isolation value generally assumed in radio access network working group 4 (RAN4), measurements were made on the maximum output power requirements (e.g., A-MPR values and/or MPR values) that support 29 dBm high-power terminals.

Although many test cases should be considered, in the first example of the disclosure of the present specification, both carrier frequencies (e.g., each of carrier frequency of a carrier transmitted through an NR band and a carrier frequency of a carrier transmitted through an LTE band) are positioned on ends of both bands in consideration of a worst case, and the maximum output power requirements (e.g., A-MPR value and/or MPR value) were measured, while increasing the size, starting from 1 RB. Specifically, in intra-band contiguous and/or non-contiguous EN-DC situations, the maximum output power requirements (e.g. A-MPR values and/or MPR values) that meet −13 dBm/MHz, −25 dBm/MHz, −30 dBm/MHz SEM limits were measured.

Also, in the first example of the disclosure of the present specification, for intra-band non-contiguous EN-DC, A-MPR that meets the −13 dBm/1 MHz SEM limit was not measured. Instead, in the first example of the disclosure of the present specification, A-MPR that satisfies the −25 dBm/MHz SEM limit in the worst case (e.g., a situation in which the carrier frequency is lower than 2490.5 MHz) in which the influence of reverse IM3 is greatest was measured. For intra-band non-contiguous EN-DC, A-MPR that satisfies the 25 dBm/MHz and −30 dBm/MHz SEM limits was measured in the same manner as that of the intra-band contiguous EN-DC.

Detailed measurement results and A-MPR values limited in the first example of the disclosure of the present specification will be described in detail below.

Assuming a high value of antenna isolation, it is necessary to provide a potential improved A-MPR measurement result for 29 dBm high-power UE in LTE band 41+NR band 41 EN-DC mode. The current implementable antenna isolation value is 10 dB, and due to the form factors of mobile phones, it is very challenging to improve the antenna isolation. For this reason, there was no agreement on an antenna isolation value to be used for measuring a new A-MPR in the related art. A first example of the disclosure of the present specification provides a result of measuring a new A-MPR based on an antenna isolation of 10 dB and an antenna isolation of 13 dB for potential improvement. In the following, for potential improvement, new A-MPR values are provided as a result of A-MPR measurement for a 29 dBm high-power UE operating in LTE band 41+NR band 41 EN-DC mode. In addition, A-MPR curves for intra-band contiguous and/or non-contiguous cases based on the A-MPR measurement result are provided.

1-1. Assumptions for Measuring Maximum Output Power Requirements (e.g., A-MPR/MPR Performance Requirements)

Hereinafter, assumptions for measuring the maximum output power requirements (e.g., A-MPR/MPR performance requirements) for a 29 dBm high-power UE (HPUE) operating in a B41/n41 EN-DC mode will be described. The assumptions described below are used to measure and determine the maximum output power requirements (e.g., A-MPR/MPR performance requirements) for a 29 dBm high power UE (HPUE) operating in the B41/n41 EN-DC mode in the first example of the disclosure of the present specification.

The assumptions for measuring the maximum output power requirements (e.g., A-MPR/MPR performance requirements) for a 29 dBm high power UE (HPUE) operating in the B41/n41 EN-DC mode are as follows:

10 dB antenna isolation and 13 dB antenna isolation.
Post PA loss of 4 dB. For example, it is assumed that loss of a signal passing through the power amplifier is 4 dB.
Power class 2 Tx chains (LTE and NR). For example, it is assumed that the power class 2 Tx chain is used for both the LTE Tx chain and the NR Tx chain.
Equal power on LTE and NR. For example, it is assumed that a 29 dBm high-power UE (HPUE) operating in the B41/n41 EN-DC mode transmits signals with the same power in LTE band and NR band.
Various allocation combinations with range of aggregate BWs, with focus on "worst case" combinations (assumed to be near-equal allocation BWs). For example, focusing on "worst case" combinations (i.e. combinations according to nearly-equally allocated BWs), measurement was performed based on the assumption of various resource allocation combinations with a range of aggregate bandwidths (BWs).
It was assumed to determine back-off required to meet −13, −25, and −30 dBm/MHz SEM, and adjacent channel leakage power ratio (ACLR) limits.
Fetching data from multiple sources and defining new A-MPR (and/or MPR) curves accommodating different implementations were assumed as a goal for performing measurement. Since the new A-MPR curve may be associated with modified MPR bits, it was assumed to be optional In addition to the above assumptions, in a first example of the disclosure of the present specification, additional assumptions were considered when measuring the A-MPR value and/or MPR values. Assumptions additionally considered in the first example of the disclosure of the present specification are as follows:

UL (Uplink: uplink) non-contiguous resource allocation. For example, it was assumed that the UL resource allocation is non-contiguous.
LTE Single Carrier-Frequency Division Multiple access (SC-FDMA)/QPSK and NR Direct Fourier Transform spread OFDM (DFT-s-OFDM)/Quadrature Phase Shift Keying (QPSK). For example, it was assumed that the UE uses SC-FDMA and QPSK for LTE and uses CP-OFDM and QPSK for NR.
15 KHz SCS on LTE and 30 kHz SCS on NR. For example, it was assumed that the UE uses 15 KHz SCS for LTE and 30 kHz SCS for NR.
26 dBm on each Tx chain. For example, it is assumed that the UE uses power of 26 dBm for each Tx chain of LTE and NR.
LTE 20 MHz and NR 60 MHz. For example, it was assumed that the UE uses 20 MHz Channel Bandwidth (CBW) for LTE and 60 MHz CBW for NR.

Hereinafter, A-MPR values and/or A-MPR curves measured based on the above assumptions are proposed. The A-MPR values and/or A-MPR curves proposed below are examples of maximum output power requirements (e.g., A-MPR/MPR performance requirements), and the A-MPR values and/or A-MPR curves described below may equally be applied to the MPR value and/or the MPR curve.

1-2. Example of A-MPR Measurement Result for 29 dBm High Power UE

Hereinafter, an example of a result of measuring A-MPR based on the above assumptions will be described. Specifically, in the case of intra-band contiguous EN-DC and in the case of intra-band non-contiguous EN-DC, results of A-MPR measurement for 29 dBm high power UE operating in the LTE band 41+NR band 41 EN-DC mode is described.

1) Example of A-MPR Measurement Result in Intra-Band Contiguous B41/n41 EN-DC

The following drawings are created to explain a specific example of the present specification. Since the names of specific devices described in the drawings or the names of specific signals/messages/fields are presented by way of example, the technical features of the present specification are not limited to the specific names used in the following drawings.

FIG. 7 is a diagram illustrating an example of A-MPR measurement results in intra-band contiguous B41/n41 EN-DC.

In FIG. 7, an A-MPR measurement result for a 29 dBm high-power UE in an intra-band contiguous B41/n41 EN-DC is shown. In the first example of the disclosure of the present specification, in the process of measuring A-MPR, measurement was performed in consideration of the worst case in which resource blocks (RBs) transmitted in the LTE band and RBs transmitted in the NR band are located at the edge of the LTE bandwidth and the NR bandwidth, respectively.

For reference, SCS in FIG. 7 may refer to subcarrier spacing. Transmitted RBs may refer to the number of RBs transmitted in the LTE band or the NR band. Total UL RB BW may refer to the sum of bandwidths (BW) of RBs transmitted in the LTE band and the NR band. "LGE Test Results" may refer to a measured Tx power back-off value (e.g., A-MPR value) according to each condition (Antenna Isolation of 10 dB or Antenna Isolation of 13 dB). NS_04 Additional spurious emissions may refer to a condition (e.g., −25 dBm/MHz) of an additional spurious emissions value when the UE receives the NS_04 signaling from the base station. NS_04 general SEM may refer to an additional general SEM value condition (e.g., −13 dBm/MHz) when the UE receives NS_04 signaling from the base station. The spurious emissions may refer to the condition of the spurious emissions value (−30 dBm/MHz).

An example of an A-MPR value measured when a 10 dB antenna isolation is applied when 1 RB is allocated to the edge of the bandwidth of the LTE operating band and 1 RB is allocated to the edge of the bandwidth of the NR operating band will be described with reference to the measurement result of FIG. 7. In this case, an A-MPR value of 14 dB is required to meet NS_04 additional spurious emissions of −25 dBm/MHz (f<2490.5 MHz: for carrier frequencies below 2490.5 MHz). An A-MPR value of 8 dB is required to meet NS_04 SEM of −13 dBm/MHz. An A-MPR value of 7 dB is required to meet the general spurious emission of −30 dBm/MHz.

Also, referring to FIG. 7, it can be seen that when the size of an RB transmitted through an LTE carrier and an NR carrier increases, the A-MPR value that meets the SEM restriction decreases.

Figure 8:
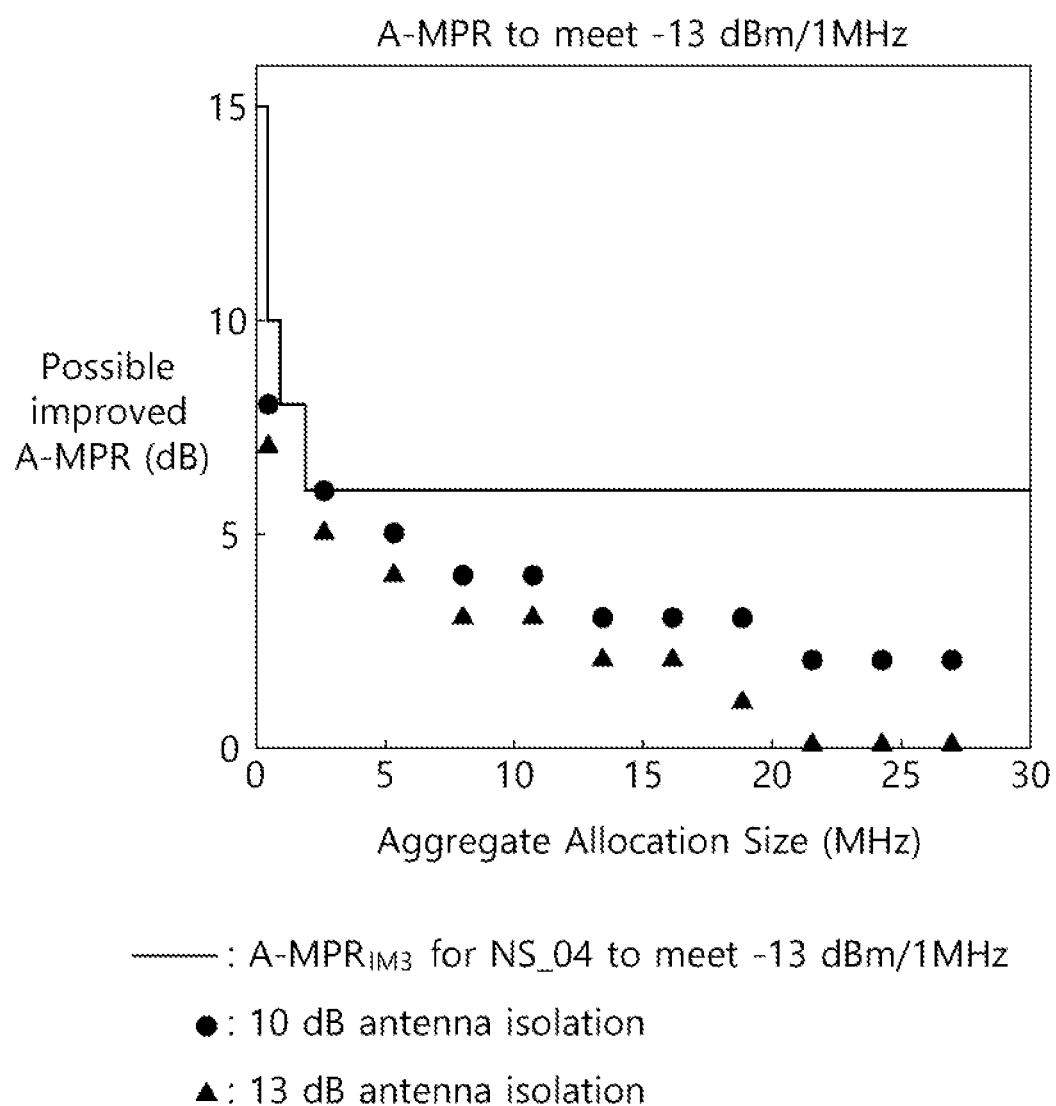
FIG. 8 shows an example of a measurement result of the A-MPR value that meets a general SEM of −13 dBm/MHz in a first example of the disclosure of the present specification.
Figure 9:
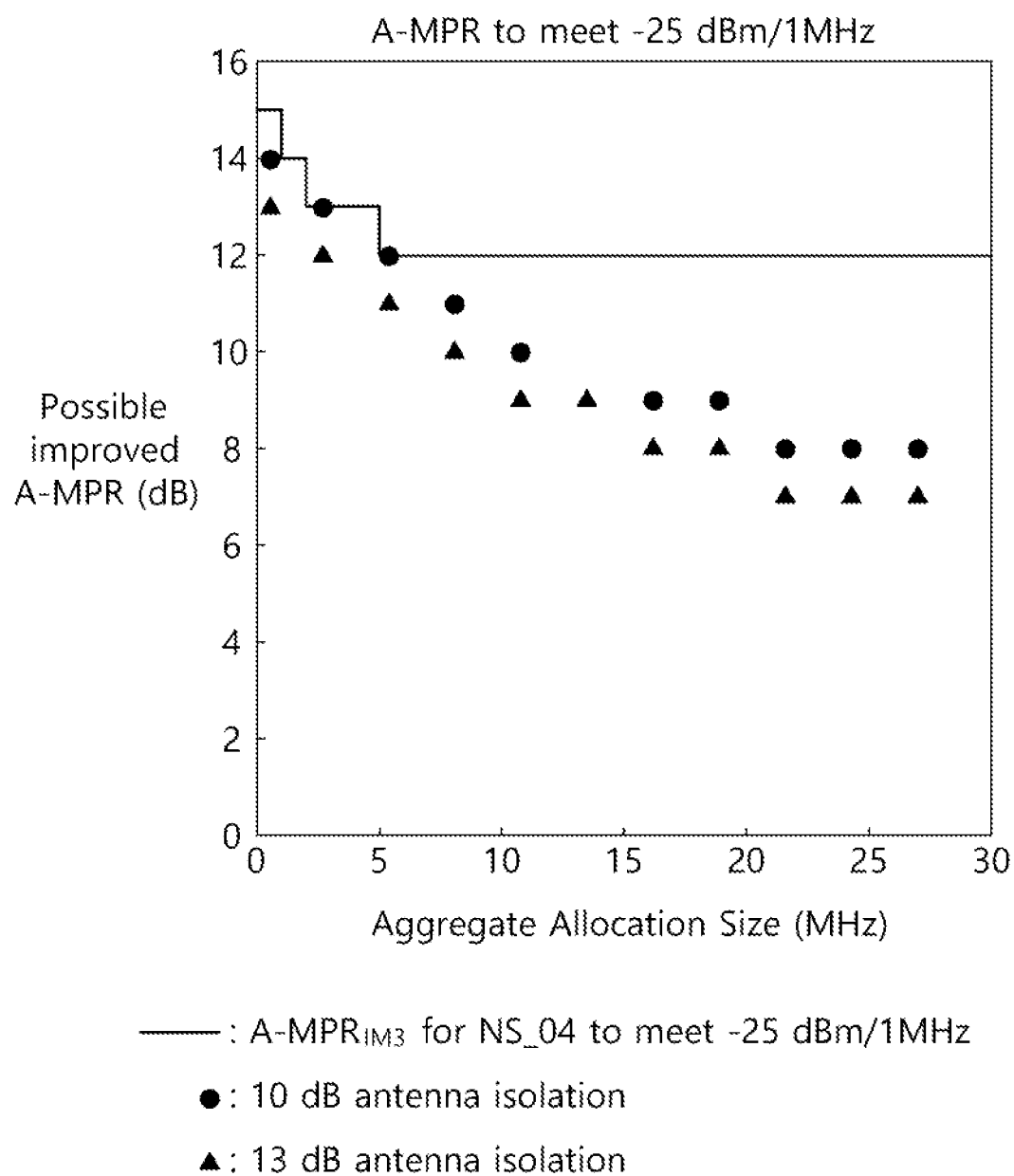
FIG. 9 shows an example of a measurement result of an A-MPR value that meets additional spurious emission of −25 dBm/MHz in the first example of the disclosure of the present specification.
Figure 10:
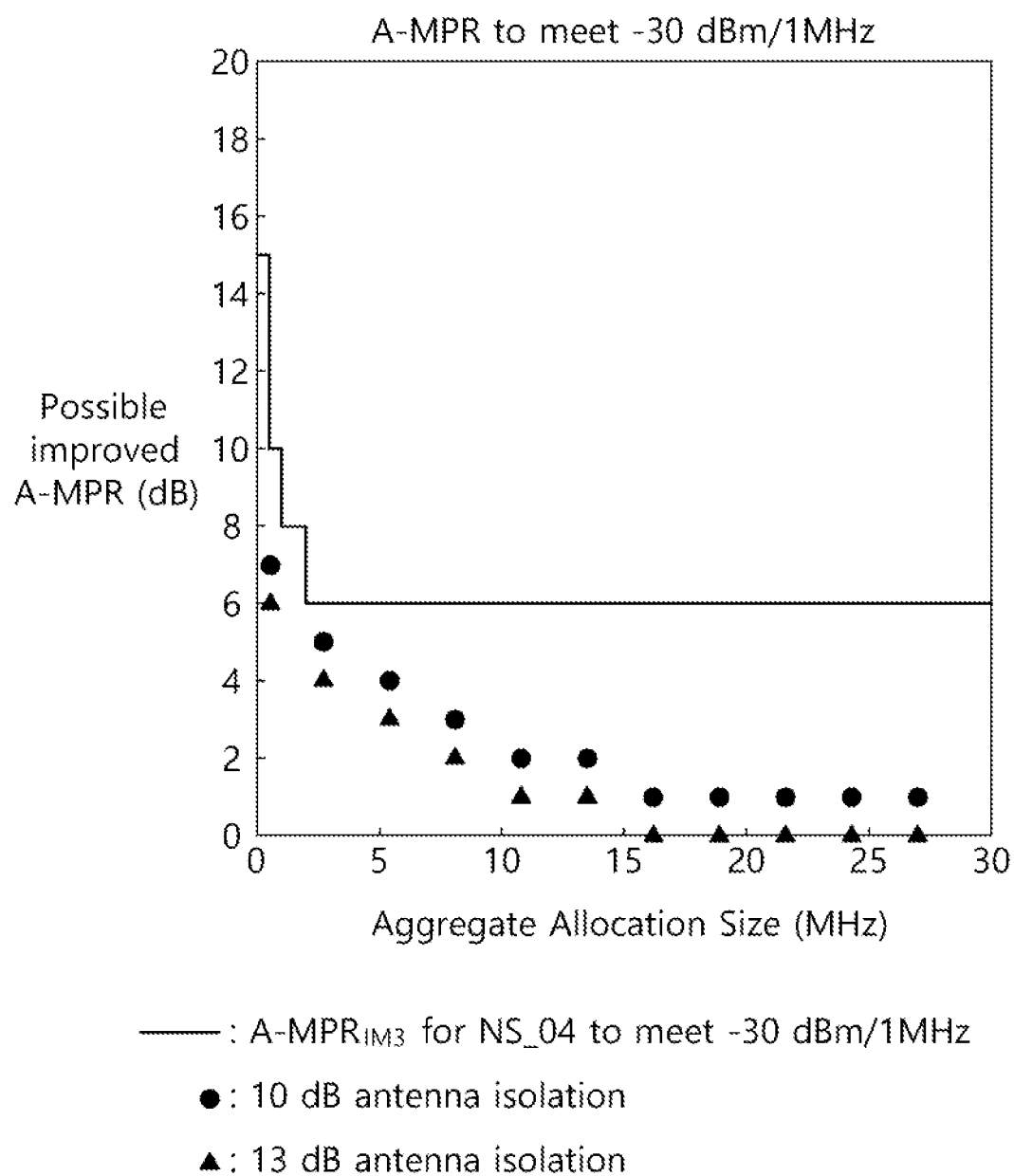
FIG. 10 shows an example of a measurement result of an A-MPR value that meets spurious emission of −30 dBm/MHz in the first example of the disclosure of the present specification.

In order to find (to generate) a new A-MPR curve (A-MPR curve proposed in the first example of the present disclosure) for the intra-band contiguous EN-DC situation, the A-MPR measurement result of FIG. 7 is shown in FIGS. 8 to 10.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 8 shows an example of the measurement result of the A-MPR value to meet the general SEM of −13 dBm/MHz in the first example of the disclosure of the present specification.

FIG. 8 shows a measurement result of the A-MPR value shown in FIG. 7. For example, the A-MPR measurement result based on the 10 dB antenna isolation value that meets the general SEM of −13 dBm/MHz is shown in FIG. 8 as circle-shaped dots. The A-MPR measurement result based on the 13 dB antenna isolation value, that meets the general SEM of 13 dBm/MHz, is shown in FIG. 8 as a triangle shape point. The curve shown in FIG. 8 may be referred to as "AMPR$_{IM3}$ for NS_04 to meet −13 dBm/1 MHz" may be a curve formed by connecting the A-MPR value that meets the general SEM of −13 dBm/MHz which has been discussed I the related art for a 26 dBm PC2 (power class 2) UE.

Referring to the measurement result of the A-MPR values shown in FIG. 8, it can be seen that there is a difference of 1 dB between the A-MPR measurement result for 10 dB antenna isolation and the A-MPR measurement result for 13 dB antenna isolation. Since the worst case should be considered in defining the A-MPR value, the measurement result of A-MPR based on 10 dB antenna isolation may be used to define a new A-MPR curve according to the first example of the disclosure of this specification.

For reference, if an implementation margin is not considered in FIG. 8, there is one measurement point that does not satisfy the SEM of −13 dBm/MHz. For example, the corresponding measurement point may be a point in which the aggregation allocation size (e.g., the same as the total UL RB BW value of FIG. 7) is 2.7 MHz. This is because, at this point, the A-MPR value based on 10 dB antenna isolation and the conventional A-MPR value overlap. Therefore, in the first example of the disclosure of the present specification, it may be necessary to relax a region in which the measurement result of A-MPR that does not satisfy the SEM of −13 dBm/MHz exists. It can be seen that, in areas other than the region in which the A-MPR measurement result that does not meet the SEM limit of −13 dBm/MHz exists, there is a room for potential A-MPR improvement of the 29 dBm high-power UE operating in the LTE band 41+NR band 41 operating in EN-DC mode.

In other words, referring to FIG. 8, Observation 1 and Observation 2 below may be confirmed.

Observation 1: Referring to the measurement results of the A-MPR values shown in FIG. 8, it can be seen that there is a difference of 1 dB between the A-MPR measurement result for 10 dB antenna isolation and the A-MPR measurement result for 13 dB antenna isolation.

Observation 2: When the implementation margin is considered in FIG. 8, there is one measurement point that does not satisfy the SEM of −13 dBm/MHz. Therefore, in portions other than the region in which the A-MPR measurement result that does not satisfy the SEM of −13 dBm/MHz exists, the AMPR measurement results according to the 10 dB antenna isolation indicates that there is a room for potential A-MPR improvement for 29 dBm high power UE operating in the LTE band 41+NR band 41 EN-DC mode.

The following drawings are created to explain a specific example of the present specification. Since the names of specific devices described in the drawings or the names of specific signals/messages/fields are presented by way of example, the technical features of the present specification are not limited to the specific names used in the following drawings.

FIG. 9 shows an example of a measurement result of the A-MPR value that meets the additional spurious emission of −25 dBm/MHz in the first example of the disclosure of the present specification. FIG. 10 shows an example of the measurement result of the A-MPR value that meets the spurious emission of −30 dBm/MHz in the first example of the disclosure of the present specification.

FIGS. 9 and 10 show measurement results of the A-MPR value shown in FIG. 7.

For example, the A-MPR measurement result based on the 10 dB antenna isolation value, to meet the additional spurious emission of −25 dBm/MHz, is shown in FIG. 9 as a circle-shaped dot. The A-MPR measurement result based on the 13 dB antenna isolation value to meet the additional spurious emission of −25 dBm/MHz is shown in FIG. 9 as a triangle shape point. The curve shown in FIG. 9 may be referred to as "AMPR$_{IM3}$ for NS_04 to meet −25 dBm/1 MHz", which is a curve that connects A-MPR values to meet the previously discussed additional spurious emission of −25 dBm/MHz.

As another example, the A-MPR measurement result based on the 10 dB antenna isolation value to meet the spurious emission of −30 dBm/MHz is shown in FIG. 10 as circle-shaped dots. The A-MPR measurement result based on the 13 dB antenna isolation value to meet the spurious emission of −30 dBm/MHz is shown in FIG. 10 as a triangle shape point. The curve shown in FIG. 10 may be referred to as "AMPR$_{IM3}$ for NS_04 to meet −30 Bm/1 MHz", which is a curve formed by connecting the A-MPR values that meets the spurious emission of −30 dBm/MHz which has been previously discussed.

Referring to FIGS. 9 and 10, similarly to the case of FIG. 8, it can be seen that there is a difference of 1 dB between the A-MPR measurement result for 10 dB antenna isolation and the A-MPR measurement result for 13 dB antenna isolation.

Referring to the A-MPR measurement result to meet the −25 dBm/1 MHz SEM limit of FIG. 9, when an implementation margin is considered, it can be seen that there is no room for potential improvement for the A-MPR value in the aggregate allocation size in the range of 2.7 MHz to 5.4 MHz (e.g., a total allocated size of resources allocated for transmission of an uplink signal or a total bandwidth of resources allocated for transmission of an uplink signal). For reference, hereinafter, "aggregate allocation size" may refer to "aggregated bandwidth". For example, "aggregate allocation size" may refer to a total allocated bandwidth. Therefore, in order to meet the −25 dBm/1 MHz SEM limit, the A-MPR curve newly proposed in the first example of the present disclosure needs to be relaxed more than the conventional A-MPR in the aggregate allocation size in the range of 2.7 MHz to 5.4 MHz. In the aggregate allocation size in the range exceeding 5.4 MHz, in order to meet the −25 dBm/1 MHz SEM limit, the A-MPR curve newly proposed in the first example of the present disclosure may be improved over the conventional A-MPR curve.

Referring to the A-MPR measurement result to meet the −25 dBm/1 MHz SEM limit of FIG. 10, the A-MPR curve newly proposed in the first example of the present disclosure is to be improved than the conventional intra-band contiguous MPR curve.

In other words, referring to FIGS. 9 and 10, Observation 3 and Observation 4 below may be checked.

Observation 3: Referring to the A-MPR measurement result to meet the −25 dBm/1 MHz SEM limit of FIG. 9, it can be seen that there is no room for potential improvement on the MPR value in the aggregate allocation size in the range of 2.7 MHz to 5.4 MHz, when the implementation margin is considered.

Observation 4: Referring to the A-MPR measurement result to meet the −25 dBm/1 MHz SEM limit of FIG. 10, the A-MPR curve newly proposed in the first example of the present disclosure may be further improved than the conventional intra-band contiguous MPR curve.

2) Example of A-MPR Measurement Result in Intra-Band Non-Contiguous B41/n41 EN-DC The following drawings were created to explain a specific example of the present specification. Since the names of specific devices described in the drawings or the names of specific signals/messages/fields are presented by way of example, the technical features of the present specification are not limited to the specific names used in the following drawings.

FIG. 11 is a diagram illustrating an example of A-MPR measurement results in intra-band non-contiguous B41/n41 EN-DC.

FIG. 11 shows an A-MPR measurement result for a 29 dBm high-power UE in an intra-band non-contiguous B41/n41 EN-DC. For reference, the same assumptions and the same measurement procedure used in the A-MPR measurement in the intra-band contiguous B41/n41 EN-DC described with reference to FIG. 7 above are used to measure A-MPR the intra-band non-contiguous B41/n41 EN-DC situation.

For reference, SCS in FIG. 11 may refer to subcarrier spacing. Transmitted RBs may refer to the number of RBs transmitted in the LTE band or the NR band. Total UL RB BW may refer to the sum of bandwidths (BW) of RBs transmitted in the LTE band and the NR band. "LGE Test Results" may refer to a measured Tx power back-off value (e.g., A-MPR value) according to each condition (Antenna Isolation of 10 dB or Antenna Isolation of 13 dB). NS_04 Additional spurious emissions may refer to a condition (e.g., −25 dBm/MHz) of an additional spurious emissions value when the UE receives the NS_04 signaling from the base station. NS_04 general SEM may refer to an additional general SEM value condition (e.g., −25 dBm/MHz) when the UE receives NS_04 signaling from the base station. The spurious emissions may refer to the condition of the spurious emissions value (−30 dBm/MHz).

When the carrier frequency is less than 2490.5 MHz, a case in which A-MPR is used to meet the SEM limit of −25 dBm/1 MHz may be the worst case in the intra-band non-contiguous EN-DC case. Therefore, unlike the intra-band contiguous EN-DC situation (see FIG. 7), in the first example of the present disclosure, the A-MPR measurement results to meet the SEM limit of −25 dBm/1 MHz (f<2490.5) is provided for the intra-band non-contiguous EN-DC situation, instead of A-MPR measurement to meet the −13 dBm/1 MHz SEM limit.

An example of an A-MPR value measured when 10 dB antenna isolation is applied in a case in which 1 RB is allocated to the edge of the bandwidth of the LTE operating band and 1 RB is allocated to the edge of the bandwidth of the NR operating band will be described with reference to the measurement result of FIG. 7. In this case, an A-MPR value of 14 dB is required to meet NS_04 additional spurious emissions of −25 dBm/MHz (f<2490.5 MHz: for carrier frequencies below 2490.5 MHz). A-MPR value of 12 dB is required to meet NS_04 SEM of −25 dBm/MHz. A-MPR value of 15 dB is required to meet general spurious emission of −30 dBm/MHz.

Figure 12:
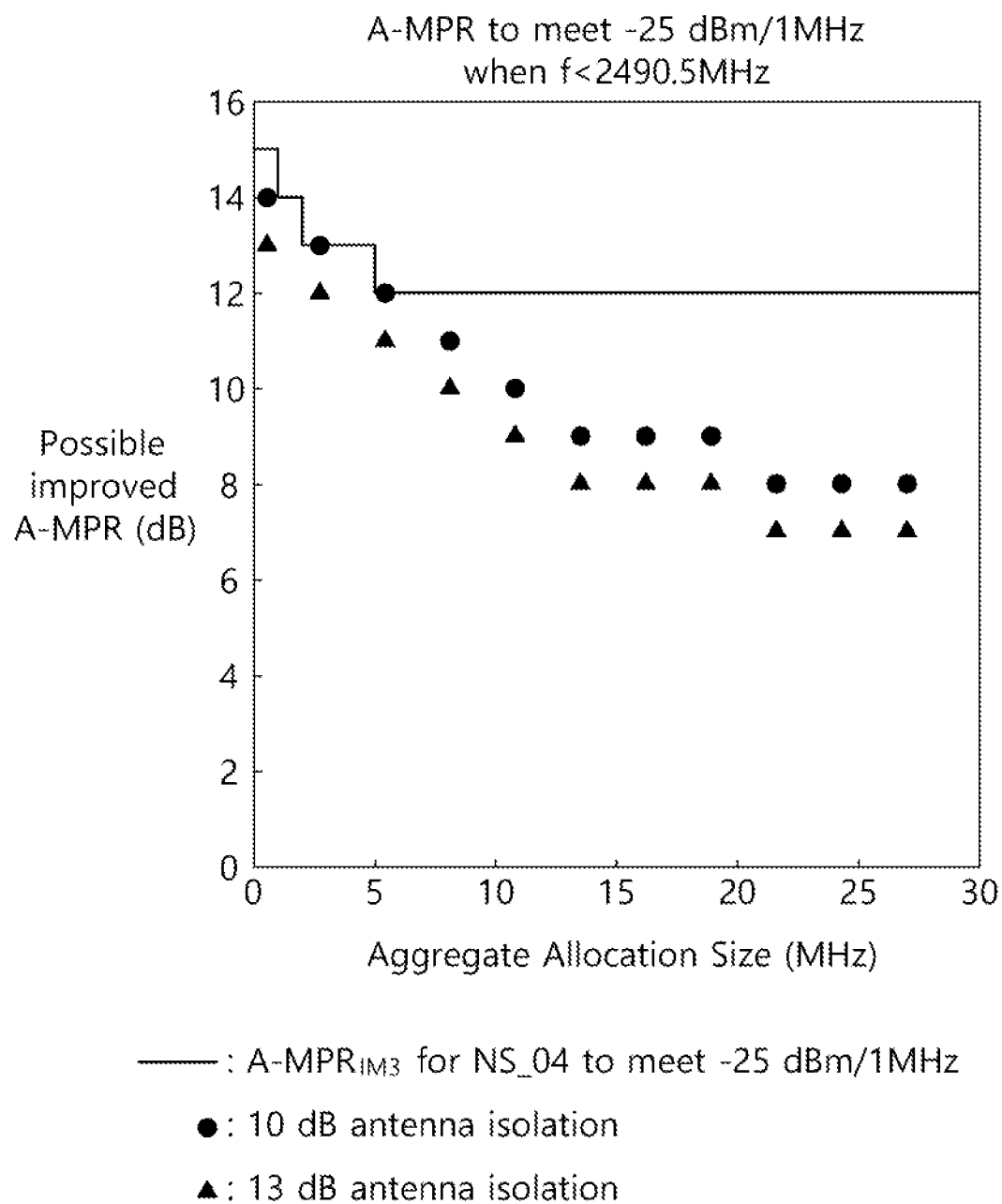
FIG. 12 shows an example of a measurement result of an A-MPR value that meets additional spurious emission of −25 dBm/MHz in the first example of the disclosure of the present specification.
Figure 13:
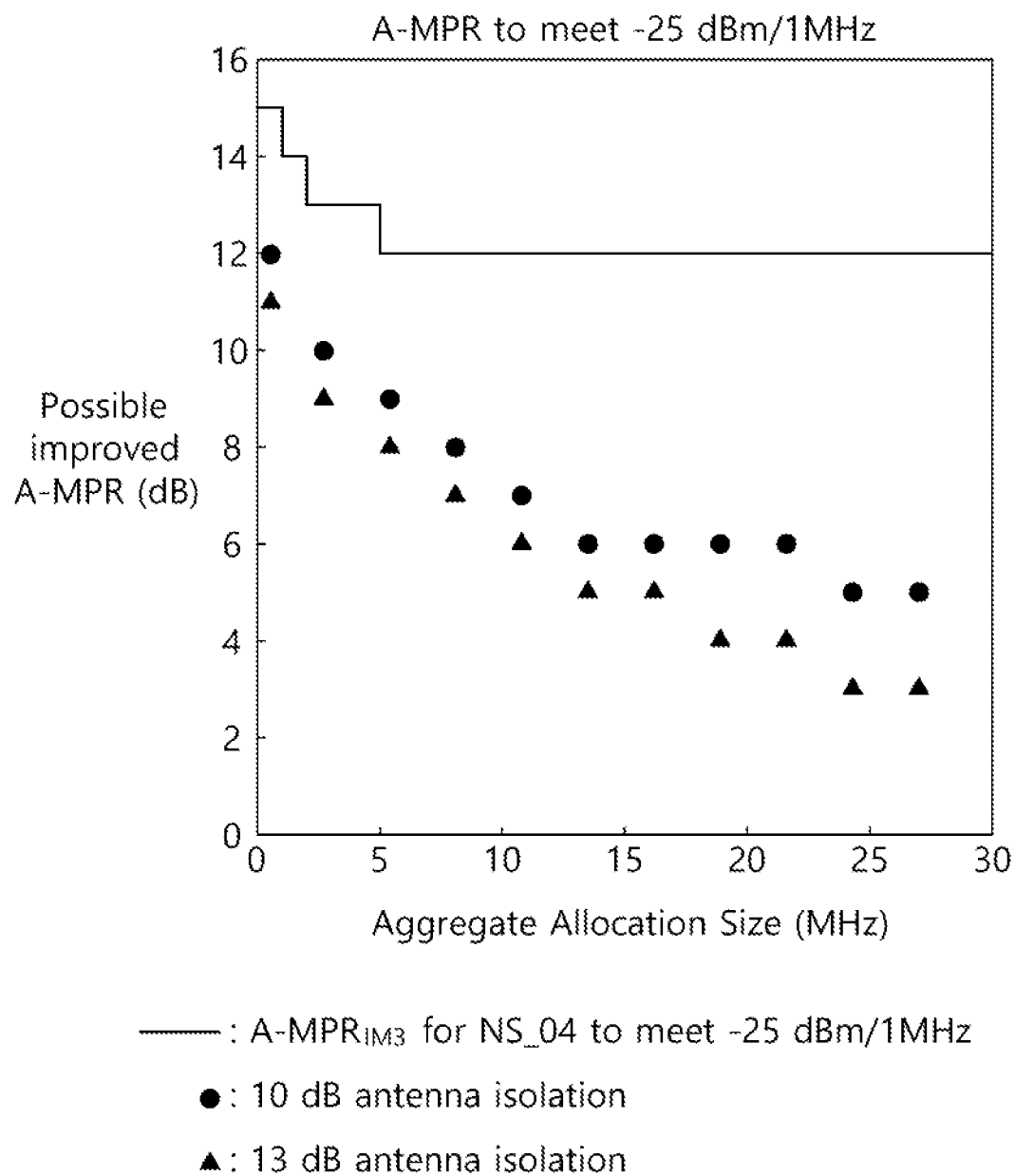
FIG. 13 shows an example of a measurement result of an A-MPR value that meets a general SEM of −25 dBm/MHz in the first example of the disclosure of the present specification.
Figure 14:
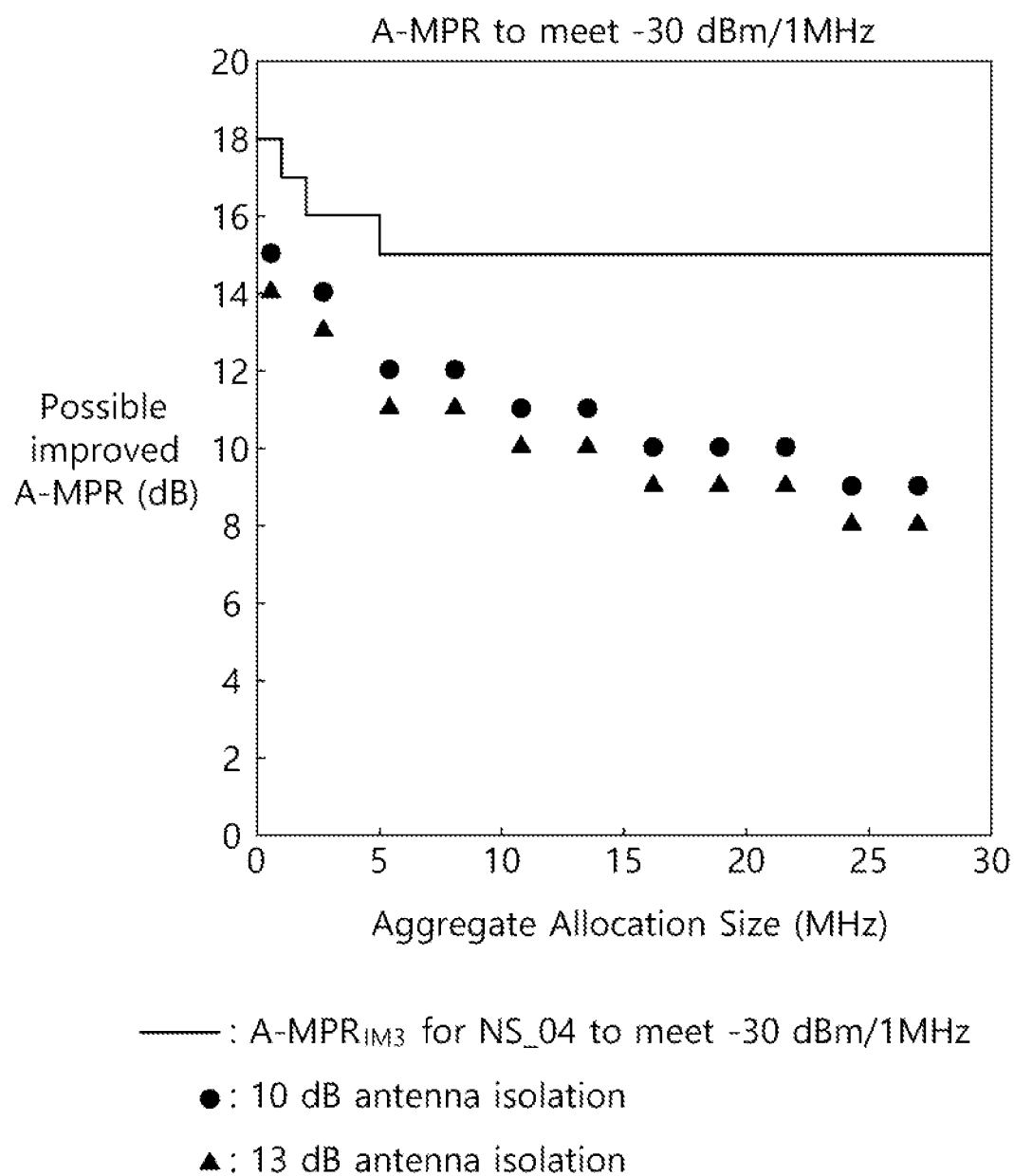
FIG. 14 shows an example of a measurement result of an A-MPR value that meets spurious emission of −30 dBm/MHz in the first example of the disclosure of the present specification.

In order to find (to generate) a new A-MPR curve (A-MPR curve proposed in the first example of the present disclosure) for an intra-band non-contiguous EN-DC situation, the A-MP R measurement results of FIG. 11 are shown in FIGS. 12 to 14.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 12 shows an example of a measurement result of the A-MPR value that meets the additional spurious emission of −25 dBm/MHz in the first example of the disclosure of the present specification.

FIG. 12 shows a measurement result of the A-MPR value shown in FIG. 11. For example, the A-MPR measurement result based on the 10 dB antenna isolation value, that meets the additional spurious emission of −25 dBm/MHz, is shown in FIG. 12 as a dot of a circle shape. The A-MPR measurement result based on the 13 dB antenna isolation value to meet the additional spurious emission of −25 dBm/MHz is shown in FIG. 12 as a triangle shape point. The curve shown in FIG. 12 may be referred to as "$AMPR_{IM3}$ for NS_04 to meet −25 dBm/1 MHz", which is a curve formed by connecting A-MPR values to meet the previously discussed additional spurious emission of −25 dBm/MHz.

Similar to the intra-band contiguous case of the example of FIG. 8, in the intra-band non-contiguous case, referring to the measurement results of the A-MPR values shown in A-6, it can be seen that there is a difference of 1 dB between the A-MAR measurement result for 10 dB antenna isolation and the A-MAR measurement result for 13 dB antenna isolation. Since the worst case should be considered in defining the A-MPR value, the measurement result of A-MPR based on 10 dB antenna isolation may be used to define a new A-MPR curve according to the first example of the disclosure of this specification.

For reference, when the implementation margin is considered in FIG. 12, there are two measurement points that do not meet the SEM limit of −25 dBm/1 MHz. For example, these two measurement points may be 2.7 MHz and 5.4 MHz. This is because, at this point, the A-MPR value based on 10 dB antenna isolation and the conventional A-MPR value overlap. Therefore, in the first example of the disclosure of the present specification, it may be necessary to relax two regions in which the measurement result of A-MPR that does not meet the SEM of −25 dBm/MHz exists. It can be seen that, in portions other than the region in which the A-MPR measurement result that does not meet the SEM limit of −25 dBm/MHz exists, there is a room for potential A-MPR improvement of the 29 dBm high-power UE operating in the LTE band 41+NR band 41 operating in EN-DC mode.

In other words, referring to FIG. 12, the following Observation 5 may be confirmed.

Observation 5: In a case in which carrier frequency is 2490.5 MHz or less, in the measurement result of the A-MPR value to meet the additional spurious emission of −25 dBm/MHz, when the implementation margin is considered, there are two measurement points that do not meet the SEM limit of −25 dBm/1 MHz. In portions other than the region in which the A-MPR measurement result that does not meet the SEM limit of −25 dBm/MHz exists, the A-MPR measurement results according to 10 dB antenna isolation indicates that there is a room for potential A-MPR improvement for 29 dBm high power UE operating in the LTE band 41+NR band 41 EN-DC mode.

The following drawings are created to explain a specific example of the present specification. Since the names of specific devices described in the drawings or the names of specific signals/messages/fields are presented by way of example, the technical features of the present specification are not limited to the specific names used in the following drawings.

FIG. 13 shows an example of a the measurement result of the A-MPR value to meet the general SEM of −25 dBm/MHz in the first example of the disclosure of the present specification. FIG. 14 shows an example of the measurement result of the A-MPR value that meets the spurious emission of −30 dBm/MHz in the first example of the disclosure of the present specification.

FIGS. 13 and 14 show measurement results of the A-MPR value shown in FIG. 11.

For example, the A-MPR measurement result based on the 10 dB antenna isolation value, to meet the general SEM of −25 dBm/MHz, is shown in FIG. 13 as a circle-shaped dot. The A-MPR measurement result based on the 13 dB antenna isolation value to meet the general SEM of −25 dBm/MHz is shown in FIG. 13 as a triangle shape point. The curve shown in FIG. 13 may be referred to as "AMPR$_{IM3}$ for NS_04 to meet −25 dBm/1 MHz", which is a curve that connects A-MPR values to meet the previously discussed general SEM of −25 dBm/MHz.

As another example, the A-MPR measurement result based on the 10 dB antenna isolation value to meet the spurious emission of −30 dBm/MHz is shown in FIG. 14 as circle-shaped dots. The A-MPR measurement result based on the 13 dB antenna isolation value to meet the spurious emission of −30 dBm/MHz is shown in FIG. 14 as a triangle shape point. The curve shown in FIG. 14 may be referred to as "AMPR$_{IM3}$ for NS_04 to meet −30 Bm/1 MHz", which is a curve formed by connecting the A-MPR values that meet the spurious emission of −30 dBm/MHz which has been previously discussed.

Referring to FIGS. 13 and 14, even if the implementation margin is considered, there is enough room for potential A-MPR improvement for the SEM limit of −25 dBm/MHz and the SEM limit of −30 dBm/MHz.

In other words, referring to FIGS. 13 and 14, the following Observation 6 may be confirmed.

Observation 6: Referring to FIGS. 13 and 14, even when implementation margins are considered, there is enough room for potential A-MPR improvement for the SEM limit of −25 dBm/MHz and the SEM limit of −30 dBm/MHz.

1-3. Examples of A-MPR Curves Proposed in the First Example of the Disclosure of the Present Specification Hereinafter, an A-MPR curve for a 29 dBm high-power UE (HPUE) operating in the B41/n41 EN-DC mode is proposed.

Hereinafter, a new A-MPR curve for a 29 dBm high-power UE (HPUE) operating in the B41/n41 EN-DC mode is proposed. A new A-MPR curve based on the measurement result of "1.2. Example of A-MPR measurement results for 29 dBm high power UE" described above is proposed.

For reference, the new A-MPR curves proposed in the first example of the disclosure of the present specification are indicated as "proposed A-MPR curves" in FIGS. 15 to 20 below. The curves indicated as "A-MPR$_{IM3}$ for NS_04" in FIGS. 15 to 20 represent a conventional A-MPR curve or a conventional MPR curve for a conventional 26 dBm high-power UE (HPUE) operating in the B41/n41 EN-DC mode. The curves indicated by "LGE" in FIGS. 15 to 20 show the measurement results of the A-MPR actually measured based on the antenna isolation value of 10 dB corresponding to the worst case. In FIGS. 15 to 20, when comparing the conventional A-MPR curve with the new A-MPR curve proposed in the first example of the present disclosure, a region marked with "region of potential improvement" indicates that there is a potential improvement. When comparing the conventional A-MPR curve with the new A-MPR curve proposed in the first example of the present disclosure, the region marked with "region of potential relaxation" in FIGS. 15 to 20 indicates that potential relaxation exists.

After analyzing all the curves shown in FIGS. 15 to 20, for the case of intra-band contiguous and intra-band non-contiguous, new A-MPR values and new A-MPR curves for 29 dBm high-power UE (HPUE) operating in the B41/n41 EN-DC mode are defined.

1) Examples of Proposed A-MPR Values in Case of Intra-Band Contiguous

Figure 15:
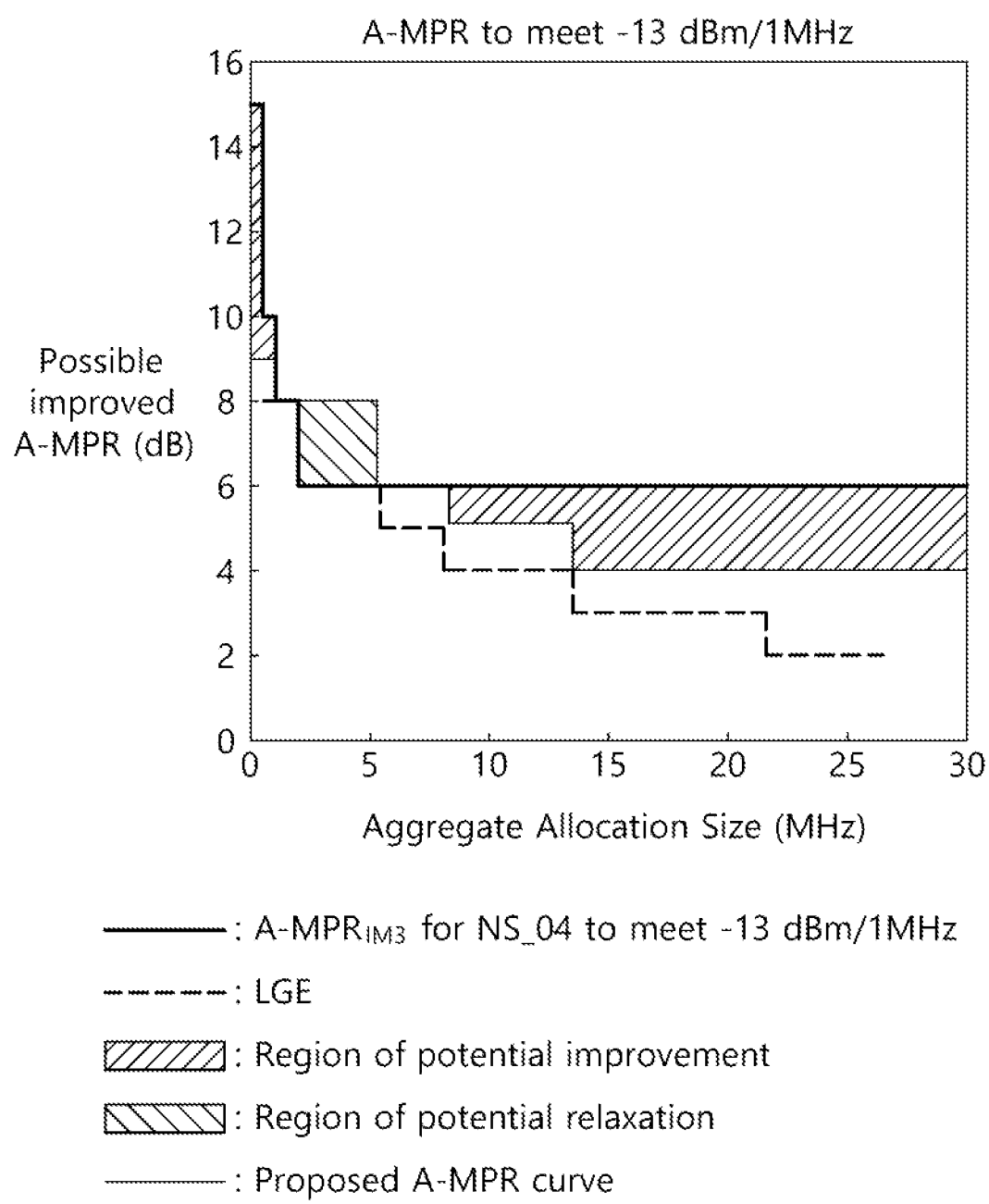
FIG. 15 shows an example of an A-MPR curve to meet −13 dBm/MHz SEM in the case of intra-band contiguous.
Figure 16:
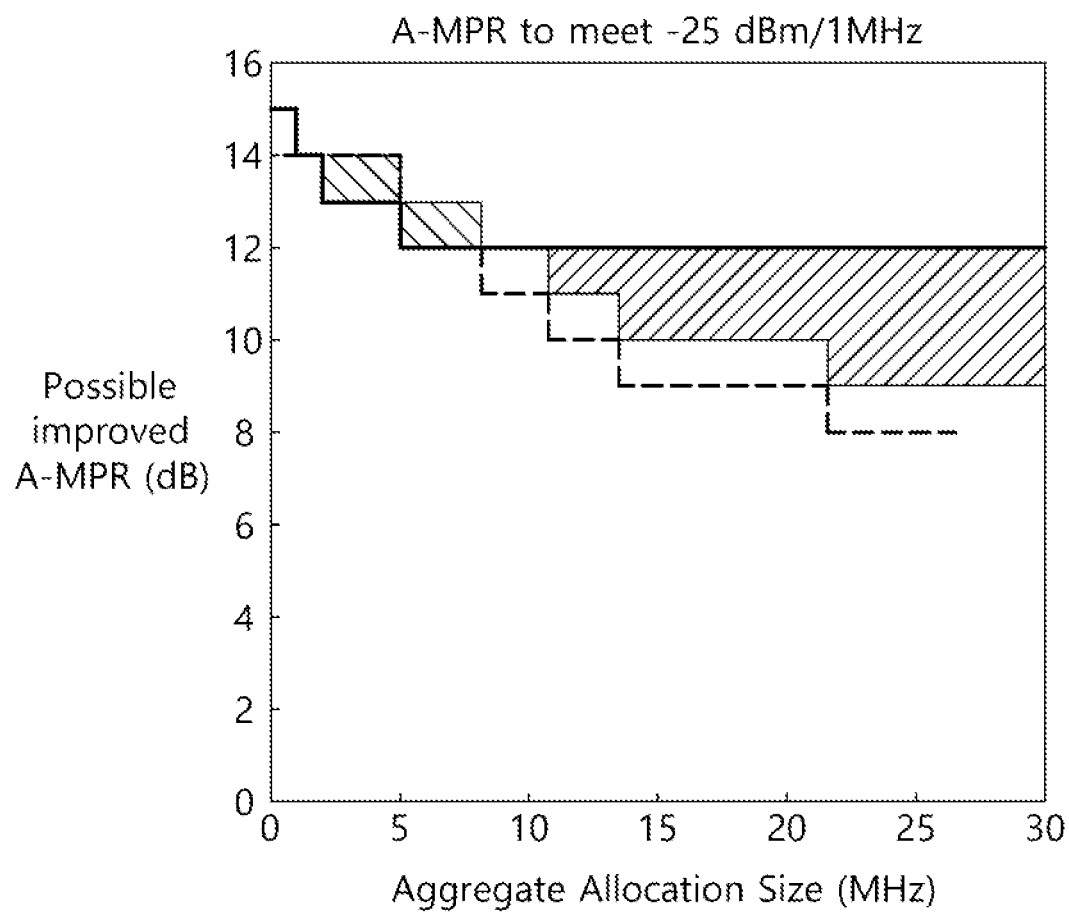
FIG. 16 shows an example of an A-MPR curve to meet −25 dBm/MHz SE in the case of intra-band contiguous.
Figure 17:
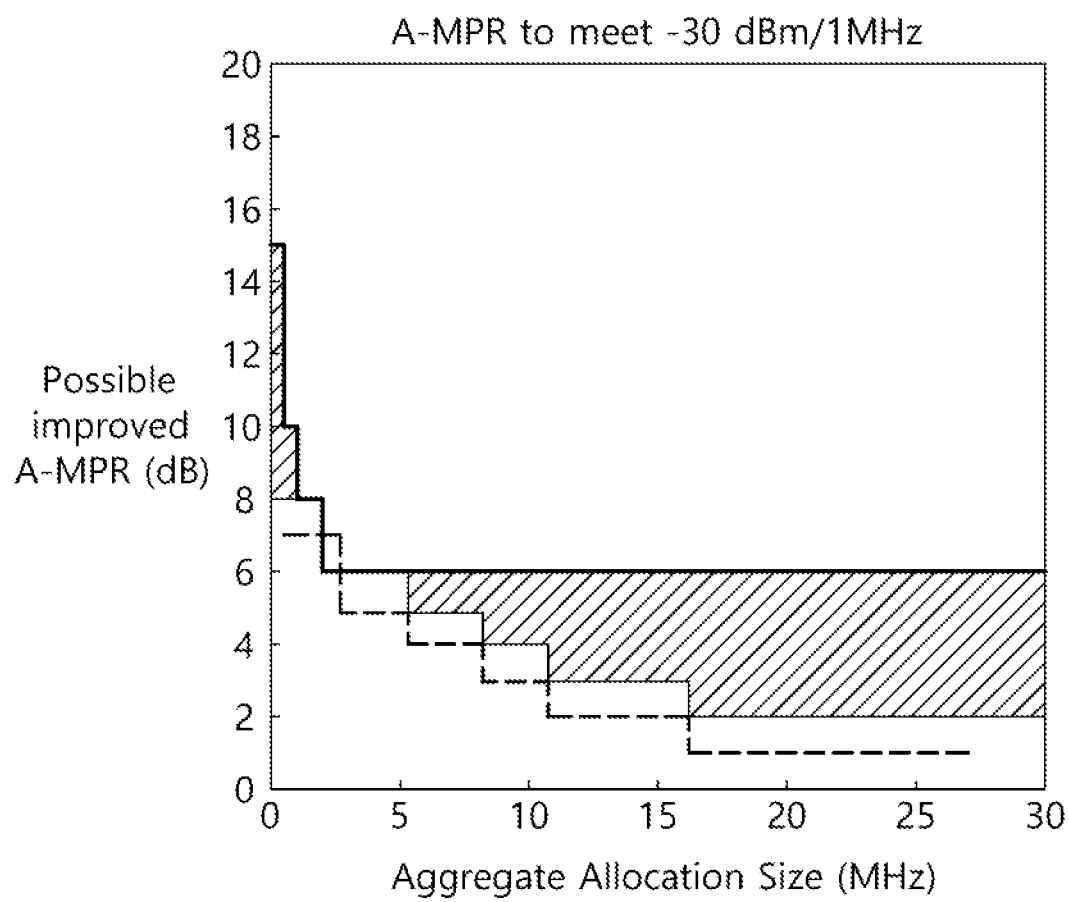
FIG. 17 shows an example of an A-MPR curve to meet −30 dBm/MHz SE in the case of intra-band contiguous.

For the intra-band contiguous case, new A-MPR curves satisfying −13 dBm/1 MHz, −25 dBm/1 MHz, and −30 dBm/1 MHz are shown in FIGS. 15 to 17, respectively.

The following drawings are created to explain a specific example of the present specification. Since the names of specific devices described in the drawings or the names of specific signals/messages/fields are presented by way of example, the technical features of the present specification are not limited to the specific names used in the following drawings.

FIG. 15 shows an example of an A-MPR curve to meet −13 dBm/MHz SEM in the case of intra-band contiguous. FIG. 16 shows an example of an A-MPR curve to meet −25 dBm/MHz SE in the case of intra-band contiguous. FIG. 17 shows an example of an A-MPR curve to meet −30 dBm/MHz SE in the case of intra-band contiguous.

FIGS. 15 to 17 illustrate A-MPR curves based on a new A=MPR value proposed in the first example of the disclosure of the present specification for a 29 dBm high-power UE (HPUE) operating in the B41/n41 EN-DC mode in the case of intra-band contiguous.

In FIGS. 15 to 17, curves denoted as "LGE" represent curves based on A-MPR values measured in the first example of the disclosure described in FIGS. 7 to 10. In FIGS. 15 to 17, "A-MPR for NS_04 to meet −13 dBm/1 MHz", "A-MPR for NS_04 to meet −25 dBm/1 MHz" and "A-MPR for NS_04 to meet −30 dBm/1 MHz" each show the A-MPR curves of the related art.

In FIGS. 15 to 17, "Proposed A-MPR curve" indicates curves based on A-MPR values finally proposed in the first example of the present disclosure. "Proposed A-MPR curve" of FIG. 15 shows an example of an A-MPR curve to meet −13 dBm/MHz SEM. "Proposed A-MPR curve" of FIG. 16 shows an example of an A-MPR curve to meet −25 dBm/MHz SE in the case of intra-band contiguous. "Proposed A-MPR curve" of FIG. 17 shows an example of an A-MPR curve to meet −30 dBm/MHz SE in the case of intra-band contiguous.

In FIGS. 15 to 17, a region marked with "region of potential improvement" indicates a region in which there is potential improvement when comparing the conventional A-MPR curve with the new A-MPR curve proposed in the first example of the present specification. In FIGS. 15 to 17, a region marked with "region of potential relaxation" indicates a region in which potential relaxation exists, when comparing the conventional A-MPR curve with the new A-MPR curve proposed in the first example of the present specification.

From the proposed curves of FIGS. 15 to 17, in the case of non-contiguous resource allocation, a new A-MPR (A-MPR for IM3) applied to signal transmission to the master cell group (MCG) and the secondary cell group (SCG) are defined as follows:

Hereinafter, the A-MPR value in the case of intra-band contiguous proposed in the first example of the disclosure of the present specification will be described in detail.

1-i) Examples of A-MPR Values to Meet −13 dBm/MHz SEM

In the following, the A-MPR value at which the SEM in the case of intra-band contiguous meets −25 dBm/MHz (A-MPR value for 29 dBm high-power UE (HPUE) operating in the B41/n41 EN-DC mode) in the NS_04 situation will be described.

This A-MPR value may be defined as A-MPR$_{IM3}$. A-MPR$_{IM3}$ may refer to an A-MPR related to IM3. The A-MPR$_{IM3}$ value may be $M_A$. In a first example of the disclosure of this specification, $M_A$ may be defined as follows:

$M_A=$
9±α; 0≤Aggregate Allocation Size (MHz)<1.0
8±α; 1.0≤Aggregate Allocation Size (MHz)<5.4
6±α; 5.4≤Aggregate Allocation Size (MHz)<8.1
5±α; 8.1≤Aggregate Allocation Size (MHz)<13.5
4±α; 13.5≤Aggregate Allocation Size (MHz)

For reference, α in $M_A$ may be 0 dB, 1 dB, 2 dB, 3 dB, or the like.

For example, when α is 0 dB, a 29 dBm high-power UE (HPUE) operating in the B41/n41 EN-DC mode receives NS_04 signaling from a base station, and an aggregate allocation size of 0 or more and less than 1.0 MHz may be allocated to this high-power UE. In this case, the UE may transmit a signal by applying an A-MPR value of 9 dB to the transmission power in order to meet the SEM of −13 dBm/MHz.

1-ii) Example of A-MPR Values to Meet −25 dBm/MHz SE

In the following, an A-MPR value in which SE in the case of intra-band contiguous in NS_04 situation meets −25 dBm/MHz (A-MPR value for 29 dBm high-power UE (HPUE) operating in the B41/n41 EN-DC mode) will be described.

This A-MPR value may be defined as A-MPR$_{IM3}$. A-MPR$_{IM3}$ may refer to an A-MPR related to IM3. The A-MPR$_{IM3}$ value may be $M_A$. In a first example of the disclosure of this specification, $M_A$ may be defined as follows:

$M_A=$
15±α; 0≤Aggregate Allocation Size (MHz)<1.0
14±α; 1.0≤Aggregate Allocation Size (MHz)<5.0
13±α; 5.0≤Aggregate Allocation Size (MHz)<8.1
12±α; 8.1≤Aggregate Allocation Size (MHz)<10.8
11±α; 10.8≤Aggregate Allocation Size (MHz)<13.5
10±α; 13.5≤Aggregate Allocation Size (MHz)<21.6
9±α; 21.6≤Aggregate Allocation Size (MHz)

For reference, α in MA may be 0 dB, 1 dB, 2 dB, 3 dB, or the like.

For example, when α is 0 dB, a 29 dBm high-power UE (HPUE) operating in the B41/n41 EN-DC mode receives NS_04 signaling from a base station, and an aggregate allocation size of 0 or more and less than 1.0 MHz may be allocated to this high-power UE. In this case, the UE may transmit a signal by applying an A-MPR value of 15 dB to the transmission power in order to meet the SE of −25 dBm/MHz.

1-iii) Example of A-MPR Values to Meet −30 dBm/MHz SE

In the following, an A-MPR value in which SE in the case of intra-band contiguous in NS_04 situation meets −30 dBm/MHz (A-MPR value for 29 dBm high-power UE (HPUE) operating in the B41/n41 EN-DC mode) will be described.

This A-MPR value may be defined as A-MPR$_{IM3}$. A-MPR$_{IM3}$ may refer to an A-MPR related to IM3. The A-MPR$_{IM3}$ value may be $M_A$. In a first example of the disclosure of this specification, $M_A$ may be defined as follows:

$M_A=$
8±α; 0≤Aggregate Allocation Size (MHz)<2.0
6±α; 2.0≤Aggregate Allocation Size (MHz)<5.4
5±α; 5.4≤Aggregate Allocation Size (MHz)<8.1
4±α; 8.1≤Aggregate Allocation Size (MHz)<10.8
3±α; 10.8≤Aggregate Allocation Size (MHz)<16.2
2±α; 16.2≤Aggregate Allocation Size (MHz)

For reference, α in MA may be 0 dB, 1 dB, 2 dB, 3 dB, or the like.

For example, when α is 0 dB, a 29 dBm high-power UE (HPUE) operating in the B41/n41 EN-DC mode receives NS_04 signaling from a base station, and an aggregate allocation size of 0 or more and less than 1.0 MHz may be allocated to this high-power UE. In this case, the UE may transmit a signal by applying an A-MPR value of 8 dB to the transmission power in order to meet the SE of −30 dBm/MHz.

2) Example of A-MPR Values Proposed in the Case of Intra-Band Non-Contiguous

Figure 18:
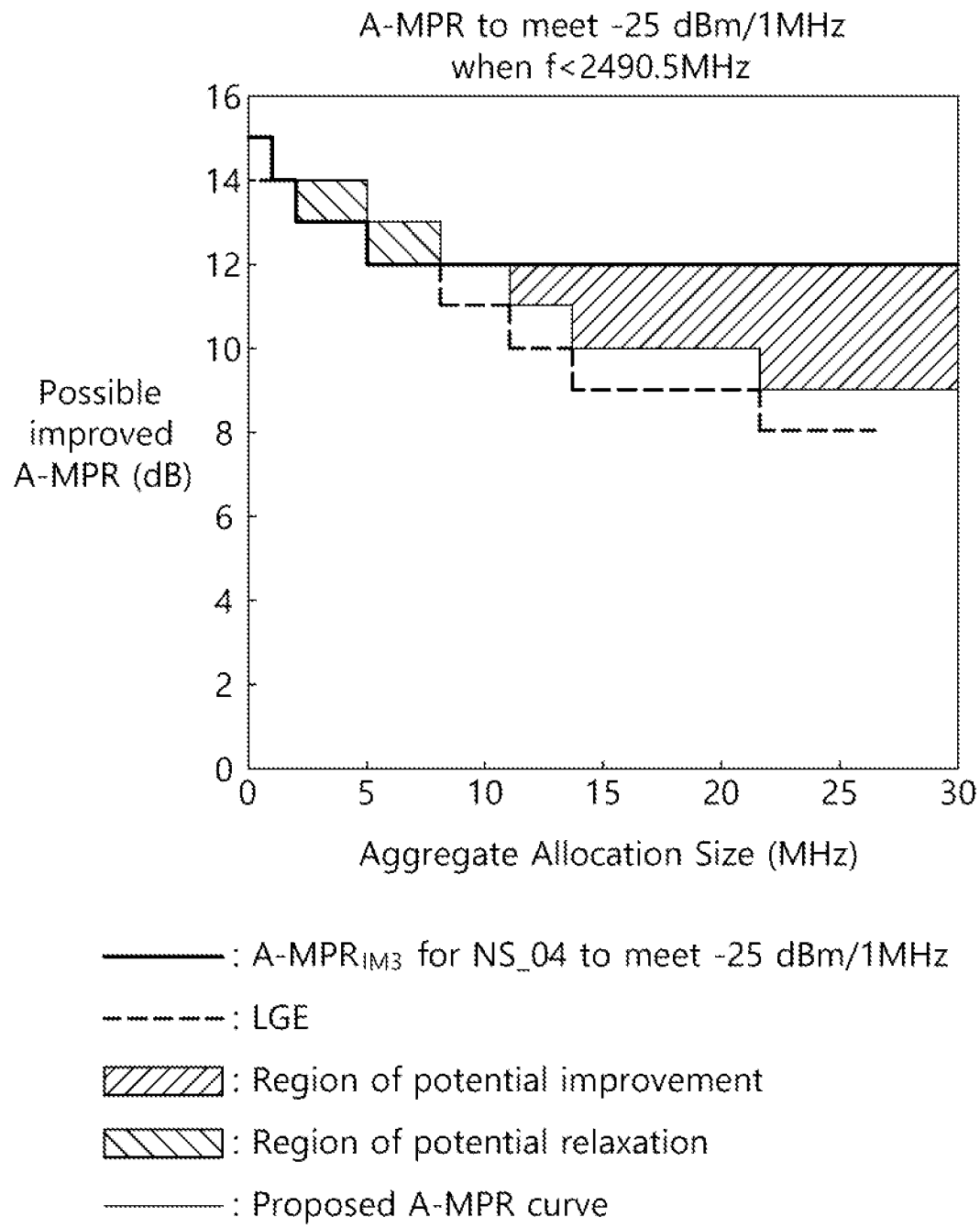
FIG. 18 shows an example of an A-MPR curve to meet −25 dBm/MHz SE when a carrier frequency is less than 2490.5 MHz in the case of intra-band non-contiguous.
Figure 19:
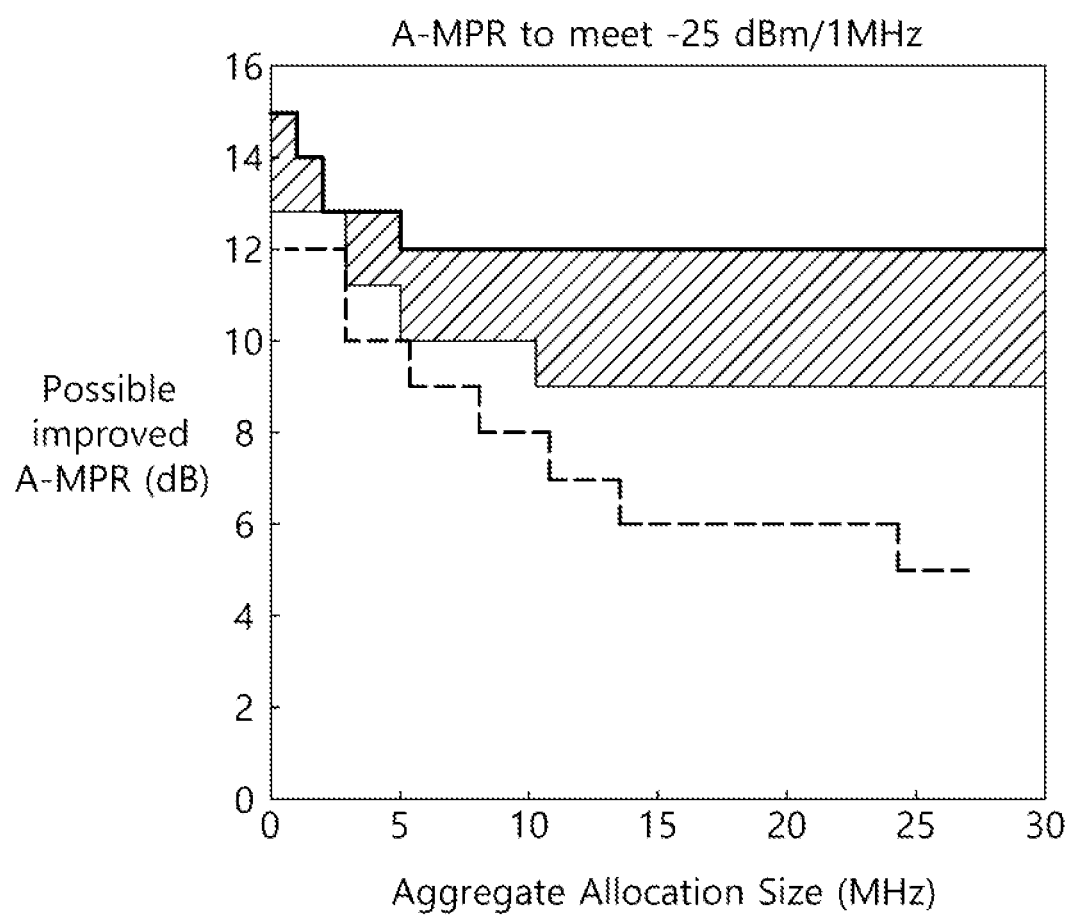
FIG. 19 shows an example of an A-MPR curve to meet −25 dBm/MHz SE in the case of intra-band non-contiguous.
Figure 20:
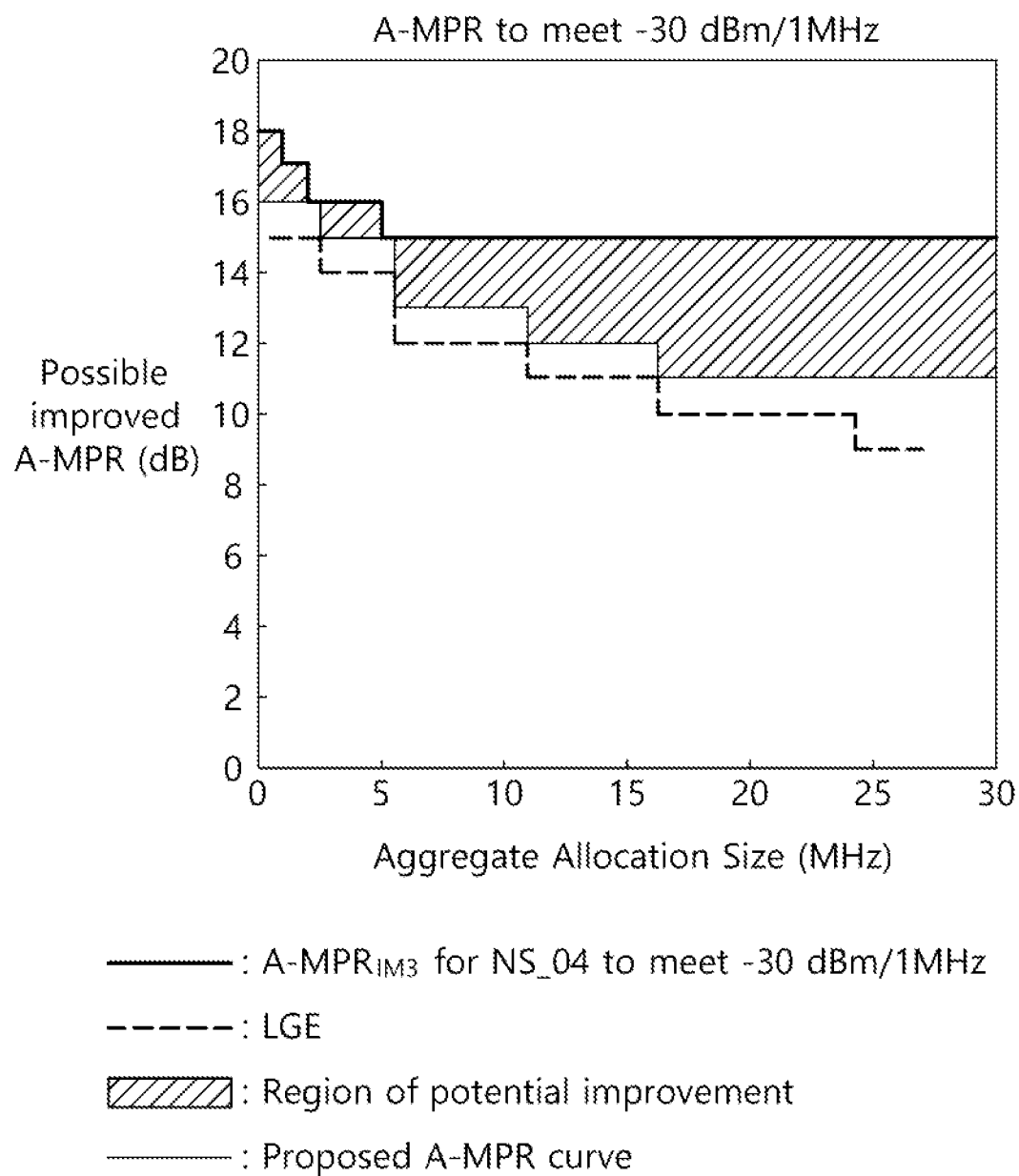
FIG. 20 shows an example of an A-MPR curve to meet −30 dBm/MHz SE in the case of intra-band non-contiguous.

For the case of intra-band contiguous, new A-MPR curves that meet −25 dBm/1 MHz (for carrier frequency less than 2490.5 MHz), −25 dBm/1 MHz, and general −30 dBm/1 MHz are shown in FIGS. 18 to 20, respectively.

The following drawings are created to explain a specific example of the present specification. Since the names of specific devices described in the drawings or the names of specific signals/messages/fields are presented by way of example, the technical features of the present specification are not limited to the specific names used in the following drawings.

FIG. 18 shows an example of an A-MPR curve to meet −25 dBm/MHz SE when a carrier frequency is less than 2490.5 MHz in the case of intra-band non-contiguous. FIG. 19 shows an example of an A-MPR curve to meet −25 dBm/MHz SE in the case of intra-band non-contiguous. FIG. 20 shows an example of an A-MPR curve to meet −30 dBm/MHz SE in the case of intra-band non-contiguous.

FIGS. 18 to 20 illustrate A-MPR curves based on the new A-MPR value proposed in the first example of the disclosure of the present specification for a 29 dBm high-power UE (HPUE) operating in the B41/n41 EN-DC mode.

In FIGS. 18 to 20, curves denoted as "LGE" represent curves based on the A-MPR values measured in the first example of the disclosure described in FIGS. 11 to 14. In FIGS. 18 to 20, "A-MPR for NS_04 to meet −25 dBm/1 MHz", "A-MPR for NS_04 to meet −25 dBm/1 MHz", and "A-MPR for NS_04 to meet −30 dBm/1 MHz" each show the A-MPR curves of the related art.

In FIGS. 18 to 20, "Proposed A-MPR curve" indicates curves based on the A-MPR values finally proposed in the first example of the present disclosure. "Proposed A-MPR curve" of FIG. 18 shows an example of an A-MPR curve to meet −25 dBm/MHz SE when the carrier frequency is less than 2490.5 MHz. "Proposed A-MPR curve" of FIG. 19 shows an example of an A-MPR curve to meet −25 dBm/MHz SE in the case of intra-band contiguous. "Proposed A-MPR curve" of FIG. 20 shows an example of an A-MPR curve to meet −30 dBm/MHz SE in the case of intra-band contiguous.

In FIGS. 18 to 20, when comparing the conventional A-MPR curve with the new A-MPR curve proposed in the first example of the present disclosure, a region marked with "region of potential improvement" indicates that there is a potential improvement. When comparing the conventional A-MPR curve with the new A-MPR curve proposed in the first example of the present disclosure, the region marked with "region of potential relaxation" in FIGS. 18 to 20 indicates that potential relaxation exists.

From the proposed curves of FIGS. 18 to 20, in the case of non-contiguous resource allocation, new A-MPR values (A-MPR for IM3) applied to signal transmission to the master cell group (MCG) and the secondary cell group (SCG) are defined as follows.

From the proposed curves of FIGS. 18 to 20, in the case of non-contiguous resource allocation, new A-MPR values (A-MPR for IM3) applied to signal transmission to the master cell group (MCG) and the secondary cell group (SCG) are defined as follows.

Hereinafter, the A-MPR value in the case of intra-band non-contiguous proposed in the first example of the disclosure of the present specification will be described in detail.

2-i) Example of A-MPR Values to Meet −25 dBm/MHz SE

In the following, in the case of Intra-band non-contiguous in the NS_04 situation, an A-MPR value at which SE meets −25 dBm/MHZ (A-MPR value for 29 dBm high-output UE (HPUE) operating in the B41/n41 EN-DC mode when the carrier frequency is less than 2490.5 MHz will be described.

This A-MPR value may be defined as A-MPR$_{IM3}$. A-MPR$_{IM3}$ may refer to an A-MPR related to IM3. The A-MPR$_{IM3}$ value may be $M_A$. In a first example of the disclosure of this specification, $M_A$ may be defined as follows:

$M_A=$

15±α; 0≤Aggregate Allocation Size (MHz)<1.0
14±α; 1.0≤Aggregate Allocation Size (MHz)<5.0
13±α; 5.0≤Aggregate Allocation Size (MHz)<8.1
12±α; 8.1≤Aggregate Allocation Size (MHz)<10.8
11±α; 10.8≤Aggregate Allocation Size (MHz)<13.5
10±α; 13.5≤Aggregate Allocation Size (MHz)<21.6
9±α; 21.6≤Aggregate Allocation Size (MHz)

For reference, α in MA may be 0 dB, 1 dB, 2 dB, 3 dB, or the like.

For example, when α is 0 dB, a 29 dBm high-power UE (HPUE) operating in the B41/n41 EN-DC mode receives NS_04 signaling from a base station, and an aggregate allocation size of 0 or more and less than 1.0 MHz may be allocated to this high-power UE. In this case, when the carrier frequency is less than 2490.5 MHz, the UE may transmit a signal by applying an A-MPR value of 15 dB to the transmission power in order to meet the SE of −25 dBm/MHz.

2-ii) Example of A-MPR Values to Meet −25 dBm/MHz SE

In the following, an A-MPR value in which SE in the case of intra-band non-contiguous in NS_04 situation meets −25 dBm/MHz (A-MPR value for 29 dBm high-power UE (HPUE) operating in the B41/n41 EN-DC mode) will be described.

This A-MPR value may be defined as A-MPR$_{IM3}$. A-MPR$_{IM3}$ may refer to an A-MPR related to IM3. The A-MPR$_{IM3}$ value may be $M_A$. In a first example of the disclosure of this specification, $M_A$ may be defined as follows:

$M_A=$

13±α; 0≤Aggregate Allocation Size (MHz)<2.7
11±α; 2.7≤Aggregate Allocation Size (MHz)<5.0
10±α; 5.0≤Aggregate Allocation Size (MHz)<10.8
9±α; 10.8≤Aggregate Allocation Size (MHz)

For reference, α in MA may be 0 dB, 1 dB, 2 dB, 3 dB, and the like.

For example, when α is 0 dB, a 29 dBm high-power UE (HPUE) operating in the B41/n41 EN-DC mode receives NS_04 signaling from a base station, and an aggregate allocation size of 0 or more and less than 2.7 MHz may be allocated to this high-power UE. In this case, the UE may transmit a signal by applying an A-MPR value of 13 dB to the transmission power in order to meet the SE of −25 dBm/MHz.

2-iii) Example of A-MPR Values to Meet −30 dBm/MHz SE

In the following, an A-MPR value in which SE in the case of intra-band non-contiguous in NS_04 situation meets −30 dBm/MHz (A-MPR value for 29 dBm high-power UE (HPUE) operating in the B41/n41 EN-DC mode) will be described.

This A-MPR value may be defined as A-MPR$_{IM3}$. A-MPR$_{IM3}$ may refer to an A-MPR related to IM3. The A-MPR$_{IM3}$ value may be $M_A$. In a first example of the disclosure of this specification, $M_A$ may be defined as follows:

$M_A=$

16±α; 0≤Aggregate Allocation Size (MHz)<2.7
15±α; 2.7≤Aggregate Allocation Size (MHz)<5.4
13±α; 5.4≤Aggregate Allocation Size (MHz)<10.8
12±α; 10.8≤Aggregate Allocation Size (MHz)<16.2
11±α; 16.2≤Aggregate Allocation Size (MHz)

For reference, α in MA may be 0 dB, 1 dB, 2 dB, 3 dB, or the like.

For example, when α is 0 dB, a 29 dBm high-power UE (HPUE) operating in the B41/n41 EN-DC mode receives NS_04 signaling from a base station, and an aggregate allocation size of 0 or more and less than 2.7 MHz may be allocated to this high-power UE. In this case, the UE may transmit a signal by applying an A-MPR value of 16 dB to the transmission power in order to meet the SE of −30 dBm/MHz.

A brief summary of what has been described in the first example of the disclosure of the present specification is as follows. The following summary is only an example, and the following summary is not intended to limit the scope of the first example of the disclosure herein.

Observation 1: Referring to the measurement results of the A-MPR values shown in FIG. 8, it can be seen that there is a difference of 1 dB between the A-MPR measurement result for 10 dB antenna isolation and the A-MPR measurement result for 13 dB antenna isolation.

Observation 2: When the implementation margin is considered in FIG. 8, there is one measurement point that does not satisfy the SEM of −13 dBm/MHz. Therefore, in portions other than the region in which the A-MPR measurement result that does not satisfy the SEM of −13 dBm/MHz exists, the AMPR measurement results according to the 10 dB antenna isolation indicates that there is a room for potential A-MPR improvement for 29 dBm high power UE operating in the LTE band 41+NR band 41 EN-DC mode.

Observation 3: Referring to the A-MPR measurement result to meet the −25 dBm/1 MHz SEM limit of FIG. 9, it can be seen that there is no room for potential improvement on the MPR value in the aggregate allocation size in the range of 2.7 MHz to 5.4 MHz, when the implementation margin is considered.

Observation 4: Referring to the A-MPR measurement result to meet the −25 dBm/1 MHz SEM limit of FIG. 10, the A-MPR curve newly proposed in the first example of the present disclosure may be further improved than the conventional intra-band contiguous MPR curve.

Observation 5: In a case in which carrier frequency is 2490.5 MHz or less, in the measurement result of the A-MPR value to meet the additional spurious emission of −25 dBm/MHz, when the implementation margin is considered, there are two measurement points that do not meet the SEM limit of −25 dBm/1 MHz. In portions other than the region in which the A-MPR measurement result that does not meet the SEM limit of −25 dBm/MHz exists, the A-MPR measurement results according to 10 dB antenna isolation indicates that there is a room for potential A-MPR improvement for 29 dBm high power UE operating in the LTE band 41+NR band 41 EN-DC mode.

Observation 6: Referring to FIGS. 13 and 14, even when implementation margins are considered, there is enough room for potential A-MPR improvement for the SEM limit of −25 dBm/MHz and the SEM limit of −30 dBm/MHz.

Proposal: A first example of the disclosure of the present specification proposes a new A-MPR value and a new A-MPR curve for a 29 dBm high-output UE (HPUE) operating in the B41/n41 EN-DC mode for the case of intra-band contiguous and the case of intra-band non-contiguous.

2. Second Example of the Disclosure of the Present Specification

A second example of the disclosure of the present specification proposes maximum output power requirements (or requirements) applied to a 29 dBm high-power terminal in LTE band 41+NR band 41 EN-DC mode. Here, the LTE band 41+NR band 41 EN-DC mode may refer to a communication mode in which the UE operates based on EN-DC using LTE band 41 and NR band 41 (e.g., n41). For example, the maximum output power requirements may be new additional maximum output power requirements. As an example, the maximum output power requirement may be an MPR value and/or an A-MPR value.

In the related art, only the A-MPR performance requirements for the 26 dBm high-power terminal supporting the LTE band 41+NR band 41 EN-DC operation are defined. The UE may transmit a signal using two different power amplifiers instead of one power amplifier in LTE band 41+NR band 41 EN-DC. When a terminal transmits signals using two different power amplifiers, reverse 3rd intermodulation distortion (1 MB) (IMD3) may occur in a spectrum emission mask and spurious emissions region due to the signals transmitted in the two different power amplifiers.

Due to the reverse IMD3 generated in this way, the 29 dBm high-power terminal performing the LTE band 41+NR band 41 EN-DC operation may not meet 1) −13 dBm/MHz spectrum emission mask (SEM) and 2) −25 dBm SE spectrum emission (SE) limit.

In order to solve this problem, NS_04 signaling is introduced, through which the UE may meet −13 dBm/MHz SEM and −25 dBm SE limit when operating in the LTE band 41+NR band 41 EN-DC mode.

However, in the related art, only the maximum output power requirement applied only to the 26 dBm high-power terminal was defined. Therefore, maximum output power requirements (e.g., A-MPR/MPR performance requirements) supporting a 29 dBm high-power terminal in LTE band 41+NR band 41 EN-DC operation needs to be defined. Here, the A-MPR/MPR performance requirements may refer to an A-MPR value and/or an MPR value.

There have been attempts to define the maximum output power requirements for maximum output power requirements supporting a 29 dBm high-power terminal. For example, attempts have been made to allow the 29 dBm high-power terminal to have wider coverage by minimizing the maximum output power requirements (e.g., A-MPR value and/or MPR value) applied to the conventional 26 dBm high-power terminal in anticipation of improving the performance of RF components mounted on the terminal.

However, RF components having improved performance are more expensive than the existing RF components, and when the maximum output power requirements (e.g., A-MPR value and/or MPR value) applied to the conventional 26 dBm high-power terminal are minimized, a terminal antenna design needs to be improved. Because of this problem, terminal companies (e.g., terminal manufacturers) started to discuss how the maximum output power requirements (e.g., A-MPR value and/or MPR value) supporting the 29 dBm high-output terminal is to be applied differently from the maximum output power requirements for the existing terminal according to a resource block (RB) size of LTE and NR, instead of hardware point of view.

Operators (e.g., communication network operators) suggested applying 20 dB antenna isolation. In a second example of the disclosure of the present specification, based on a 13 dB antenna isolation value relaxed more than the 20 dB antenna isolation proposed by the operators and a 10 dB antenna isolation value generally assumed in radio access network working group 4 (RAN4), measurements were made on the maximum output power requirements (e.g., A-MPR values and/or MPR values) that support 29 dBm high-power terminals.

Although many measurement scenarios need to be considered, since RAN4 defines the performance requirements considering the worst case, each carrier frequency is placed at both ends of the band, and the maximum output power requirements (e.g., A-MPR value and/or MPR values) were measured, while increasing the size, starting from 1 RB. Specifically, in intra-band contiguous and/or non-contiguous EN-DC situations, the maximum output power requirements (e.g. A-MPR value and/or MPR value) that meet −13 dBm/MHz SEM and −25 dBm/MHz SE were measured. In addition, in an intra-band non-contiguous EN-DC situation, the maximum output power requirements (e.g., A-MPR value and/or MPR value) that meet −30 dBm/MHz SE were measured. Based on results of performing the measurement above, the maximum output power requirements (e.g., A-MPR/MPR performance requirements) to support a 29 dBm high-power terminal in the LTE band 41+NR band 41 EN-DC situation are proposed as follows.

In order to improve the conventional A-MPR, several companies proposed maximum output power requirements (e.g., A-MPR/MPR performance requirements) for the 29 dBm high power UE (HPUE) operating in the B41/N41 EN-DC mode, but efficient maximum output power requirements (e.g., A-MPR/MPR performance requirements) have not been derived. The second example of the disclosure of the present specification provides a new measurement result for maximum output power requirements (e.g., A-MPR/MPR performance requirements) for 29 dBm high power UE (HPUE) operating in the B41/n41 EN-DC mode and proposes maximum output power requirements (e.g., A-MPR/MPR performance requirements) for the 29 dBm high power UE (HPUE) operating in the B41/n41 EN-DC mode.

2-1. Assumptions for Measuring Maximum Output Power Requirements (e.g., A-MPR/MPR Performance Requirements)

Hereinafter, assumptions for measuring the maximum output power requirements (e.g., A-MPR/MPR performance requirements) for a 29 dBm high-power UE (HPUE) operating in a B41/n41 EN-DC mode will be described. The assumptions described below are used to measure and determine the maximum output power requirements (e.g., A-MPR/MPR performance requirements) for a 29 dBm high power UE (HPUE) operating in the B41/n41 EN-DC mode in the second example of the disclosure of the present specification.

The assumptions for measuring the maximum output power requirements (e.g., A-MPR/MPR performance requirements) for a 29 dBm high power UE (HPUE) operating in the B41/n41 EN-DC mode are as follows:

10 dB antenna isolation and 13 dB antenna isolation.
 Post PA loss of 4 dB. For example, it is assumed that loss of a signal passing through the power amplifier is 4 dB.
 Power class 2 Tx chains (LTE and NR). For example, it is assumed that the power class 2 Tx chain is used for both the LTE Tx chain and the NR Tx chain.
 Equal power on LTE and NR. For example, it is assumed that a 29 dBm high-power UE (HPUE) operating in the B41/n41 EN-DC mode transmits signals with the same power in LTE band and NR band.
 Various allocation combinations with range of aggregate BWs, with focus on "worst case" combinations (assumed to be near-equal allocation BWs). For example, focusing on "worst case" combinations (i.e. combinations according to nearly-equally allocated BWs), measurement was performed based on the assumption of various resource allocation combinations with a range of aggregate bandwidths (BWs).

It was assumed to determine back-off required to meet −13, −25, and −30 dBm/MHz SEM, and adjacent channel leakage power ratio (ACLR) limits.

Fetching data from multiple sources and defining new A-MPR (and/or MPR) curves accommodating different implementations were assumed as a goal for performing measurement. Since the new A-MPR curve may be associated with modified MPR bits, it was assumed to be optional In addition to the above assumptions, in a first example of the disclosure of the present specification, additional assumptions were considered when measuring the A-MPR value and/or MPR values. Assumptions additionally considered in the first example of the disclosure of the present specification are as follows:

UL (Uplink: uplink) non-contiguous resource allocation. For example, it was assumed that the UL resource allocation is non-contiguous.
 LTE SC-FDMA/QPSK and NR DFT-s-OFDM/QPSK. For example, it is assumed that the UE uses SC-FDMA and QPSK for LTE and uses CP-OFDM and QPSK for NR.
 15 KHz SCS on LTE and 30 kHz SCS on NR. For example, it was assumed that the UE uses 15 KHz SCS for LTE and 30 kHz SCS for NR.
 26 dBm on each Tx chain. For example, it is assumed that the UE uses power of 26 dBm for each Tx chain of LTE and NR.
 LTE 20 MHz and NR 60 MHz. For example, it was assumed that the UE uses 20 MHz Channel Bandwidth (CBW) for LTE and 60 MHz CBW for NR.

For reference, although DFT-s-OFDM is used for NR waveform A-MPR measurement, it may provide slightly different measurement results compared to cyclic-prefix OFDM (CP-OFDM). Therefore, in the second example of the disclosure of the present specification, the A-MPR value was measured again based on the NR CP-OFDM.

Hereinafter, A-MPR values and/or A-MPR curves measured based on the above assumptions are proposed. The A-MPR values and/or A-MPR curves proposed below are examples of maximum output power requirements (e.g., A-MPR/MPR performance requirements), and the A-MPR values and/or A-MPR curves described below may equally be applied to the MPR value and/or the MPR curve.

2-2. Example of A-MPR Measurement Result for 29 dBm High Power UE

Hereinafter, an example of a result of measuring A-MPR based on the above assumptions will be described. Specifically, in the case of intra-band contiguous EN-DC and in the case of intra-band non-contiguous EN-DC, results of A-MPR measurement for 29 dBm high power UE operating in the LTE band 41+NR band 41 EN-DC mode is described.

1) Example of A-MPR Measurement Result in Intra-Band Contiguous B41/n41 EN-DC

The following drawings are created to explain a specific example of the present specification. Since the names of specific devices described in the drawings or the names of specific signals/messages/fields are presented by way of example, the technical features of the present specification are not limited to the specific names used in the following drawings.

FIG. 21 is a diagram illustrating an example of A-MPR measurement results in intra-band contiguous B41/n41 EN-DC.

FIG. 21 shows an A-MPR measurement result for a 29 dBm high-power UE in an intra-band contiguous B41/n41 EN-DC. In the second example of the disclosure of the present specification, for intra-band contiguous EN-DC, the A-MPR value was re-measured based on the NR CP-OFDM. In addition, in the second example of the disclosure of the present specification, the A-MPR value was measured in consideration of a case in which unequal power does not exist in LTE and NR.

For reference, SCS in FIG. 7 may refer to subcarrier spacing. Transmitted RBs may refer to the number of RBs transmitted in the LTE band or the NR band. Total UL RB BW may refer to the sum of bandwidths (BW) of RBs transmitted in the LTE band and the NR band. "NS_04 Additional SE−25 dBm/MHz" may refer to a condition of an additional spurious emissions value (e.g., −25 dBm/MHz) when the UE receives NS_04 signaling from the base station. "NS_04 General SEM−13 dBm/MHz" may refer to a condition of the SEM value when the UE receives the NS_04 signaling from the base station (e.g., −13 dBm/MHz).

As shown in FIG. 21, in the second example of the disclosure of the present specification, a measurement result of the A-MPR value that meets the NS_04 additional SE (−25 dBm/MHz limit) and a measurement result of A-MPR value that meets the NS_04 general SEM (−13 dBm/MHz limit) are derived.

A-MPR measurements for general spurious emissions (−30 dBm/MHz) has been provided, but a question that the A-MPR value for general spurious emissions (−30 dBm/MHz) was asked to be lower than NS_04 SEM (−13 dBm/MHz). This is because an IMS product, not an IM3 product, was considered when measuring the A-MPR for general spurious emissions (−30 dBm/MHz). In order to avoid confusion with the A-MPR measurements for general spurious emissions (−30 dBm/MHz), the A-MPR measurement results for general spurious emissions (−30 dBm/MHz) are not included in the intra-band contiguous case of FIG. 21.

Based on the measurement result shown in FIG. 21, it can be seen that there is a difference of 1 dB between the A-MPR value (example of FIG. 21) measured based on NR CP-OFDM and the A-MPR value measured based on NR DFT-s-OFDM (example of FIG. 7). In addition, referring to the measurement result shown in FIG. 21, it can be seen that there is a difference of 1 dB between the A-MPR measurement result for 10 dB antenna isolation and the A-MPR measurement result for 13 dB antenna isolation. Since the worst case should be considered in defining the A-MPR value, the measurement result of A-MPR based on 10 dB antenna isolation may be used to define the improved A-MPR according to the second example of the disclosure of this specification.

2) Example of A-MPR Measurement Result in Intra-Band Non-Contiguous B41/n41 EN-DC The following drawings were created to explain a specific example of the present specification. Since the names of specific devices described in the drawings or the names of specific signals/messages/fields are presented by way of example, the technical features of the present specification are not limited to the specific names used in the following drawings.

FIG. 22 is a diagram illustrating an example of A-MPR measurement results in intra-band non-contiguous B41/n41 EN-DC.

FIG. 22 shows an A-MPR measurement result for a 29 dBm high-power UE in an intra-band non-contiguous B41/n41 EN-DC. In the second example of the disclosure of the present specification, for intra-band non-contiguous EN-DC, the A-MPR value was remeasured based on the NR CP-OFDM. In addition, in the second example of the disclosure of the present specification, the A-MPR value was measured in consideration of a case in which unequal power does not exist in LTE and NR.

For reference, SCS in FIG. 22 may refer to subcarrier spacing. Transmitted RBs may refer to the number of RBs transmitted in the LTE band or the NR band. Total UL RB BW may refer to the sum of bandwidths (BW) of RBs transmitted in the LTE band and the NR band. "NS_04 Additional SE−25 dBm/MHz" may refer to a condition (e.g., −25 dBm/MHz) of an additional spurious emissions value when the UE receives NS_04 signaling from the base station. "spurious emission −30 dBm/MHz" may refer to a condition (e.g., −30 dBm/MHz) of spurious emission.

As illustrated in FIG. 22, in the second example of the disclosure of the present specification, a measurement result of the A-MPR value that meets NS_04 additional SE (−25 dBm/MHz limit) and a measurement result of the A-MPR value that meets the spurious emission (−30 dBm/MHz limit) were derived.

As shown in FIG. 22 in the second example of the disclosure of the present specification, when measuring a power back-off value (e.g., A-MPR value) for NS_04 additional SE (−25 dBm/MHz limit), a carrier frequency less than 2490.5 MHz was selected and used for the measurement. In this case, it may be assumed that there is no filter rejection corresponding to the worst case. Similar to the measurement results in the case of the intra-band contiguous case, it can be seen that there is a difference of 1 dB between the measured A-MPR value (the example of FIG. 22) measured based on NR CP-OFDM and the A-MPR value (the example of FIG. 11) measured based on NR DFT-s-OFDM when based on the measurement result illustrated in FIG. 22.

In addition, referring to the measurement result shown in FIG. 22, it can be seen that there is a difference of 1 dB between the A-MPR measurement result for 10 dB antenna isolation and the A-MPR measurement result for 13 dB antenna isolation. Since the worst case should be considered in defining the A-MPR value, the measurement result of A-MPR based on 10 dB antenna isolation may be used to define the improved A-MPR according to the second example of the disclosure of this specification.

Referring to FIGS. 21 and 22 described above, the following Observations 1 to 5 may be derived.

Observation 1: For both intra-band contiguous and intra-band non-contiguous cases, if DFT-s-OFDM is used instead of CP-OFDM in terms of NR, a margin of 1 dB may exist.

Observation 2: For both intra-band contiguous and intra-band non-contiguous cases, if 13 dB antenna isolation is implemented instead of 10 dB antenna isolation, a power back-off margin of 1 dB (A-MPR value may be different by 1 dB) may exist.

Observation 3: Based on the measurement results to meet NS_04 additional SEM (−13 dBm/MHz limit), the potential A-MPR considering the implementation margin and 10 dB antenna isolation may be defined as follows:

A-MPR of 10 dB can be used for 0≤B<2.52
A-MPR of 9 dB can be used for 2.52≤B<2.7
A-MPR of 8 dB can be used for 2.7≤B<5.4
A-MPR of 7 dB can be used for 5.4≤B<8.1
A-MPR of 6 dB can be used for 8.1≤B<13.5
A-MPR of 5 dB can be used for 13.5≤B Here, B may refer to an aggregate allocation size (MHz). For reference, in the disclosure of the present specification, the "B" value may be defined and used in the same way as the "B" value described in the "<MPR for Dual Connectivity (DC)>" item above.

Observation 4: Based on the measurement results to meet NS_04 additional SE (−25 dBm/MHz limit), the potential A-MPR considering the implementation margin and 10 dB antenna isolation may be defined as follows:

A-MPR of 16 dB can be used for 0≤B<2.52
A-MPR of 15 dB can be used for 2.52≤B<5.4
A-MPR of 14 dB can be used for 5.4≤B<8.1
A-MPR of 13 dB can be used for 8.1≤B<10.8
A-MPR of 12 dB can be used for 10.8≤B<13.5
A-MPR of 11 dB can be used for 13.5≤B Here, B may refer to an aggregate allocation size (MHz).

Observation 5: Based on the measurement results to meet general SE (−30 dBm/MHz limit), the potential A-MPR considering the implementation margin and 10 dB antenna isolation may be defined as follows:

A-MPR of 17 dB can be used for 0≤B<2.7
A-MPR of 16 dB can be used for 2.7≤B<5.4
A-MPR of 14 dB can be used for 5.4≤B<10.8
A-MPR of 13 dB can be used for 10.8≤B<16.2
A-MPR of 12 dB can be used for 16.2≤B Here, B may refer to an aggregate allocation size (MHz).

2-3. A-MPR Proposed in the Second Example of the Disclosure of the Present Specification Hereinafter, a potential A-MPR improvement for a 29 dBm high-power UE (HPUE) operating in the B41/n41 EN-DC mode will be described.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 23:
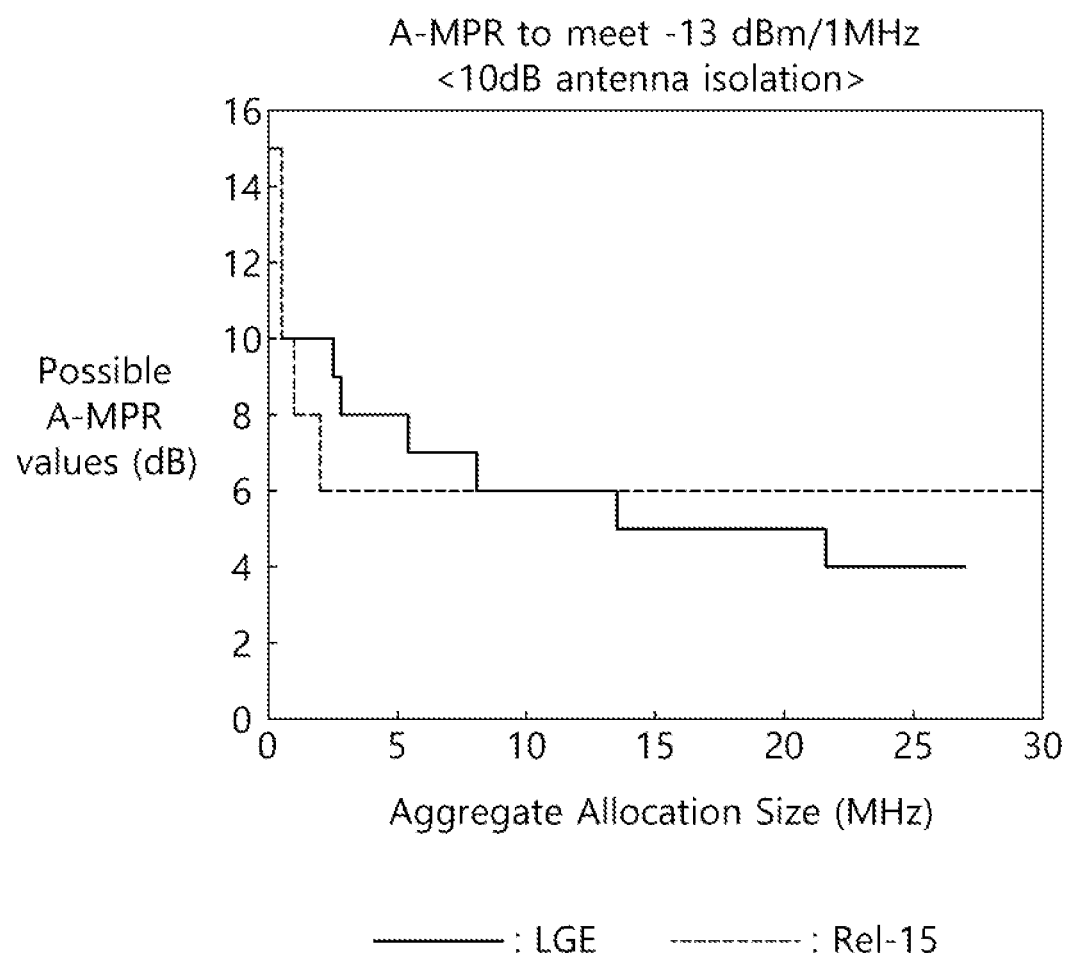
FIG. 23 shows an example of an A-MPR curve to meet an additional SEM of −13 dBm/MHz proposed in a second example of the disclosure of the present specification.
Figure 24:
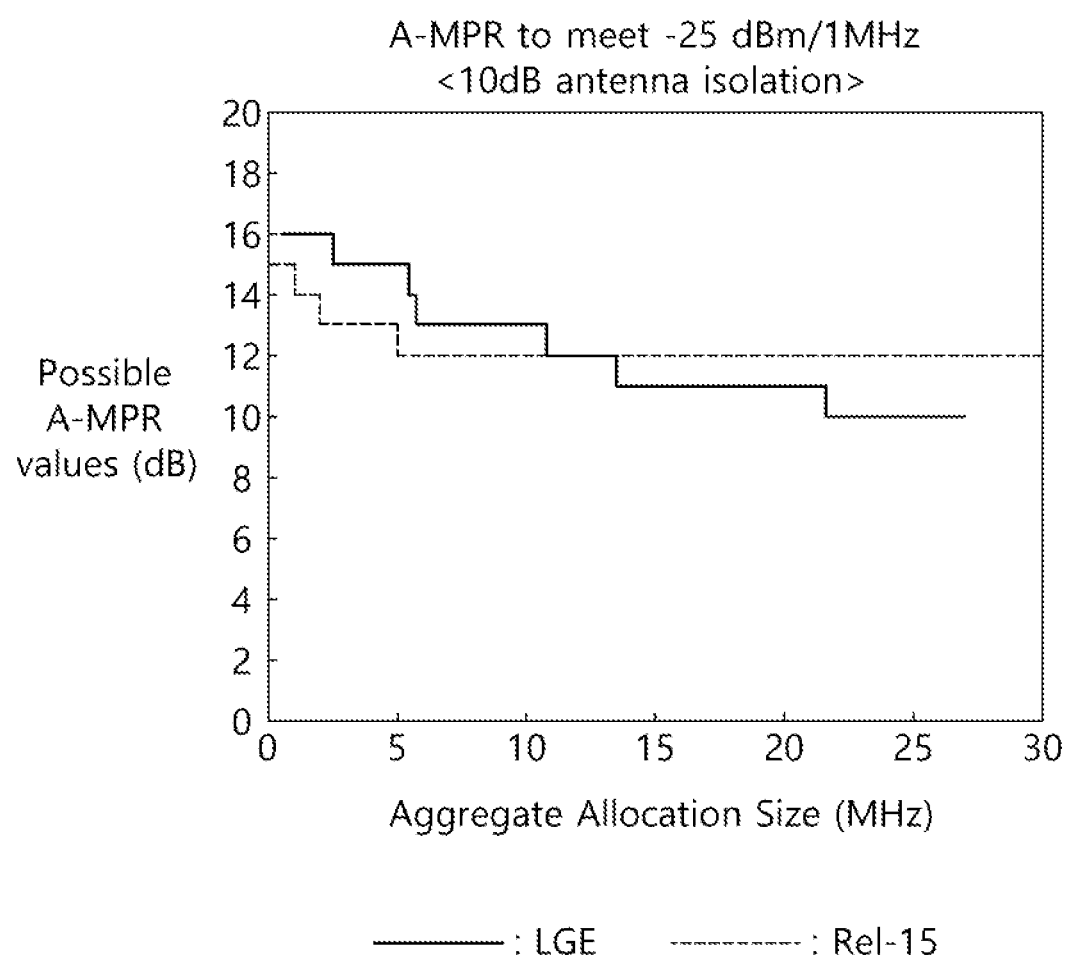
FIG. 24 shows an example of an A-MPR curve to meet an additional SEM of −25 dBm/MHz proposed in the second example of the disclosure of the present specification.

FIG. 23 shows an example of an A-MPR curve to meet the additional SEM of −13 dBm/MHz proposed in the second example of the disclosure of the present specification. FIG. 24 shows an example of an A-MPR curve to meet the additional SEM of −25 dBm/MHz proposed in the second example of the disclosure of the present specification. 25 shows an example of an A-MPR curve to meet the general SE of −30 dBm/MHz proposed in the second example of the disclosure of the present specification.

Figure 25:
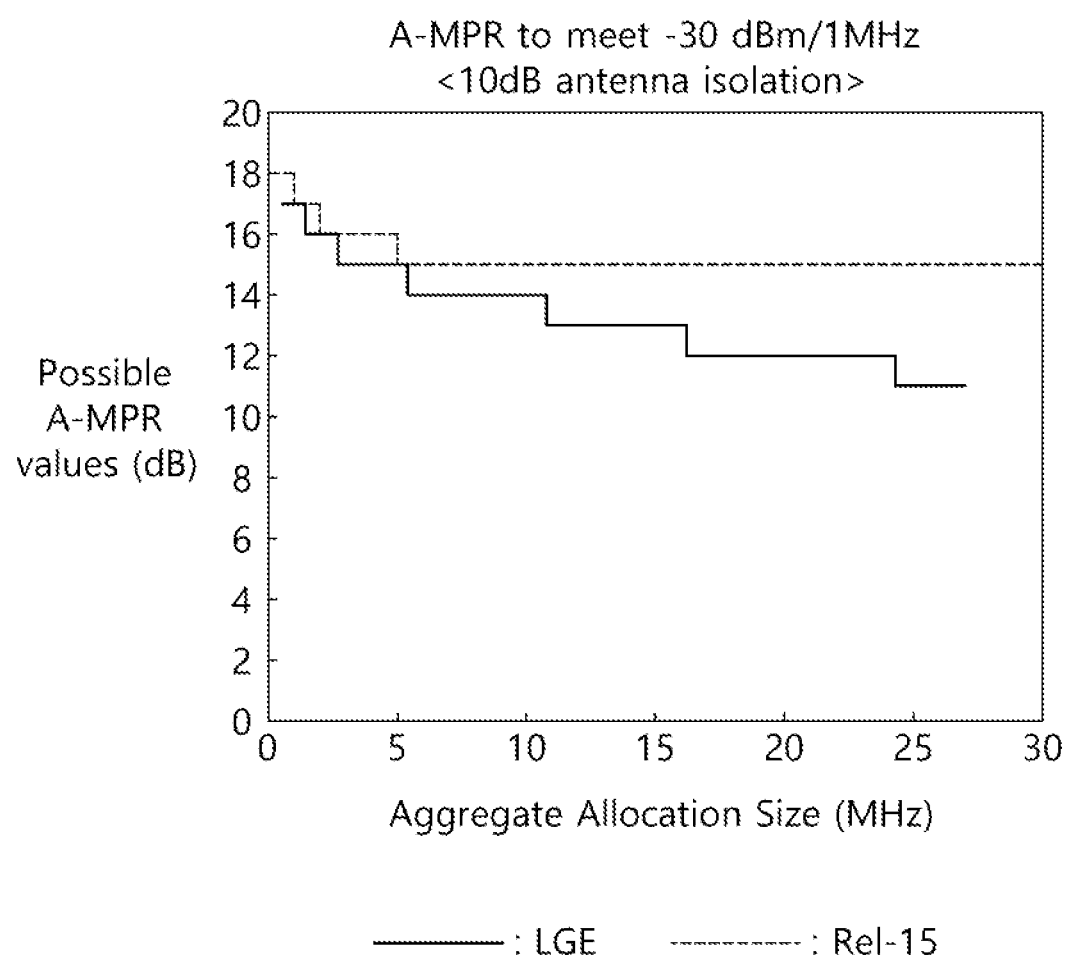
FIG. 25 shows an example of an A-MPR curve to meet a general SE of −30 dBm/MHz proposed in the second example of the disclosure of the present specification.

Based on the measurement results of FIGS. 21 and 22, an improved A-MPR for a 29 dBm high-power UE (HPUE) operating in the B41/n41 EN-DC mode is proposed. FIGS. 23 to 25 include A-MPR curves based on the proposed A-MPR values.

The curve indicated by "Rel-15" in FIGS. 23 to 25 shows a curve based on the A-MPR/MPR value for a conventional 26 dBm high-power UE (HPUE) operating in the B41/n41 EN-DC mode. A curve marked with "LTE" indicates an A-MPR curve based on the A-MPR value proposed in the second example of the disclosure of the present specification.

Referring to FIGS. 23 to 25, the following Observation 6 may be derived.

Observation 6: By analyzing the A-MPR curves shown in FIGS. 23 to 25 and the A-MPR curves of other companies that have been previously proposed, in the second example of the present disclosure, the A-MPR value corresponding to the best compromise is finally proposed as follows.

1) Examples of A-MPR Values to Meet SEM of −13 dBm/MHz

Hereinafter, an A-MPR value (A-MPR value for a 29 dBm high-power UE (HPUE) operating in the B41/n41 EN-DC mode) that an additional SEM meets −13 dBm/MHz in the NS_04 situation will be described.

The A-MPR value may be defined as $A\text{-}MPR_{IM3}$. $A\text{-}MPR_{IM3}$ may refer to that it is an A-MPR related to IM3. Specifically, $A\text{-}MPR_{IM3}$ may refer to A-MPR applied when reversed IMD3 occurs. The $A\text{-}MPR_{IM3}$ value may be $M_A$. In a third example of the disclosure of the present specification, $M_A$ may be defined as follows:

$M_A=$
12 dB; 0≤B<0.5
10 dB; 0.5≤B<2.7
8 dB; 2.7≤B<5.4
7 dB; 5.4≤B<8.1
6 dB; 8.1≤B

Here, B may refer to a bandwidth in MHz. For example, B may refer to an aggregate allocation size allocated to a 29 dBm high-power UE (HPUE) operating in the B41/n41 EN-DC mode. For example, B may refer to "aggregated bandwidth" of LTE band 41 and NR band 41. That is, B may refer to the total allocated bandwidth.

For example, a 29 dBm high-power UE (HPUE) operating in the B41/n41 EN-DC mode may receive NS_04 signaling from a base station, and an aggregate allocation size of 0 or more and less than 0.5 MHz may be allocated to the high-power UE. In this case, the UE may transmit a signal by applying an A-MPR value of up to 12 dB to the transmission power in order to meet the SEM of −13 dBm/MHz.

2) Example of A-MPR Values to Meet SE of −25 dBm/MHz

Hereinafter, an A-MPR value (A-MPR value for a 29 dBm high-power UE (HPUE) operating in the B41/n41 EN-DC mode) that SE meets −25 dBm/MHz in the NS_04 situation will be described.

The A-MPR value may be defined as $A\text{-}MPR_{IM3}$. $A\text{-}MPR_{IM3}$ may refer to that it is an A-MPR related to IM3. The $A\text{-}MPR_{IM3}$ value may be $M_A$. In a third example of the disclosure of the present specification, $M_A$ may be defined as follows:

$M_A=$
16 dB; 0≤B<2.52
15 dB; 2.52≤B<5.76
13 dB; 5.76≤B

Here, B may refer to a bandwidth in MHz. For example, B may refer to an aggregate allocation size allocated to a 29 dBm high-power UE (HPUE) operating in the B41/n41 EN-DC mode. For example, B may refer to "aggregated bandwidth" of LTE band 41 and NR band 41. That is, the "aggregate allocation size" of B may refer to a total allocated bandwidth.

For example, a 29 dBm high-power UE (HPUE) operating in the B41/n41 EN-DC mode may receive NS_04 signaling from a base station, and an aggregate allocation size of 0 or more and less than 2.52 MHz may be allocated to the high-power UE. In this case, the UE may transmit a signal by applying an A-MPR value of up to 16 dB to the transmission power in order to meet the SE of −25 dBm/MHz.

3) Example of A-MPR Values to Meet General SE of −30 dBm/MHz

Hereinafter, an A-MPR value (A-MPR value for a 29 dBm high-power UE (HPUE) operating in the B41/n41 EN-DC mode) that general SE meets −30 dBm/MHz in the NS_04 situation will be described.

The A-MPR value may be defined as A-MPR$_{IM3}$. A-MPR$_{IM3}$ may refer to that it is an A-MPR related to IM3. The A-MPR$_{IM3}$ value may be $M_A$. In a third example of the disclosure of the present specification, $M_A$ may be defined as follows:

$M_A=$
18 dB; 0≤B<1.0
17 dB; 1.0≤B<2.0
16 dB; 2.0≤B

Here, B may refer to a bandwidth in MHz. For example, B may refer to an aggregate allocation size allocated to a 29 dBm high-power UE (HPUE) operating in the B41/n41 EN-DC mode.

For example, B may refer to "aggregated bandwidth" of LTE band 41 and NR band 41. That is, "aggregate allocation size" of B may refer to a total allocated bandwidth.

For example, a 29 dBm high-power UE (HPUE) operating in the B41/n41 EN-DC mode may receive NS_04 signaling from a base station, and an aggregate allocation size of 0 or more and less than 1.0 MHz may be allocated to the high-power UE. In this case, the UE may transmit a signal by applying an A-MPR value of up to 18 dB to the transmit power in order to meet the general SE of −30 dBm/MHz.

3. Third Example of the Disclosure of the Present Specification

A third example of the disclosure of the present specification proposes maximum output power requirement (or requirements) applied to a 29 dBm high-power terminal in LTE band 41+NR band 41 EN-DC mode. Here, the LTE band 41+NR band 41 EN-DC mode may refer to a communication mode in which the UE operates based on EN-DC using LTE band 41 and NR band 41 (e.g., n41). For example, the maximum output power requirements may be new additional maximum output power requirements. As an example, the maximum output power requirements may be an MPR value and/or an A-MPR value.

In the related art, only the A-MPR performance requirements for the 26 dBm high-power terminal supporting the LTE band 41+NR band 41 EN-DC operation are defined. The UE may transmit a signal using two different power amplifiers instead of one power amplifier in LTE band 41+NR band 41 EN-DC. When a terminal transmits signals using two different power amplifiers, reverse 3rd intermodulation distortion (IMD) (IMD3) may occur in a spectrum emission mask and spurious emissions region due to the signals transmitted in the two different power amplifiers.

Due to this reverse IMD3, a 29 dBm high-power terminal performing LTE band 41+NR band 41 EN-DC operation may not meet 1) −13 dBm/MHz spectrum emission mask (SEM) and 2) −25 dBm SE limit.

In order to solve this problem, NS_04 signaling is introduced, through which the UE may meet −13 dBm/MHz SEM and −25 dBm SE limit when operating in LTE band 41+NR band 41 EN-DC mode.

However, in the related art, only the maximum output power requirements applied only to the 26 dBm high-power terminal were defined. Therefore, maximum output power requirements (e.g., A-MPR/MPR performance requirements) to support a 29 dBm high-power terminal in LTE band 41+NR band 41 EN-DC operation need to be defined. Here, the A-MPR/MPR performance requirements may refer to an A-MPR value and/or an MPR value.

There have been attempts to define the maximum output power requirements for maximum output power requirements supporting a 29 dBm high-power terminal. For example, attempts have been made to allow the 29 dBm high-power terminal to have wider coverage by minimizing the maximum output power requirements (e.g., A-MPR value and/or MPR value) applied to the conventional 26 dBm high-power terminal in anticipation of improving the performance of RF components mounted on the terminal.

However, RF components having improved performance are more expensive than the existing RF components, and when the maximum output power requirements (e.g., A-MPR value and/or MPR value) applied to the conventional 26 dBm high-power terminal are minimized, a terminal antenna design needs to be improved. Because of this problem, terminal companies (e.g., terminal manufacturers) started to discuss how the maximum output power requirements (e.g., A-MPR value and/or MPR value) supporting the 29 dBm high-output terminal is to be applied differently from the maximum output power requirements for the existing terminal according to a resource block (RB) size of LTE and NR, instead of hardware point of view.

Operators (e.g., communication network operators) suggested applying 20 dB antenna isolation. In a third example of the disclosure of the present specification, based on a 13 dB antenna isolation value relaxed more than the 20 dB antenna isolation proposed by the operators and a 10 dB antenna isolation value generally assumed in radio access network working group 4 (RAN4), measurements were made on the maximum output power requirements (e.g., A-MPR values and/or MPR values) that support 29 dBm high-power terminals.

Although many measurement scenarios need to be considered, since RAN4 defines the performance requirements considering the worst case, each carrier frequency is placed at both ends of the band, and the maximum output power requirements (e.g., A-MPR value and/or MPR values) were measured, while increasing the size, starting from 1 RB. Specifically, in intra-band contiguous and/or non-contiguous EN-DC situations, the maximum output power requirements (e.g. A-MPR value and/or MPR value) that meet −13 dBm/MHz SEM and −25 dBm/MHz SE were measured. In addition, in an intra-band non-contiguous EN-DC situation, the maximum output power requirements (e.g., A-MPR value and/or MPR value) that meet −30 dBm/MHz SE were measured. Based on results of performing the measurement above, the maximum output power requirements (e.g., A-MPR/MPR performance requirements) to support a 29 dBm high-power terminal in the LTE band 41+NR band 41 EN-DC situation are proposed as follows.

Several companies proposed maximum output power requirements (e.g., A-MPR/MPR performance requirements) for the 29 dBm high power UE (HPUE) operating in the B41/N41 EN-DC mode, but efficient maximum output power requirements (e.g., A-MPR/MPR performance requirements) have not been derived. The third example of the disclosure of the present specification provides a new measurement result for maximum output power requirements (e.g., A-MPR/MPR performance requirements) for 29 dBm high power UE (HPUE) operating in the B41/n41 EN-DC mode and proposes maximum output power requirements (e.g., A-MPR/MPR performance requirements) for the 29 dBm high power UE (HPUE) operating in the B41/n41 EN-DC mode.

3-1. Assumptions for Measuring Maximum Output Power Requirements (e.g., A-MPR/MPR Performance Requirements)

Hereinafter, assumptions for measuring the maximum output power requirements (e.g., A-MPR/MPR performance requirements) for a 29 dBm high-power UE (HPUE) operating in a B41/n41 EN-DC mode will be described. The assumptions described below are used to measure and determine the maximum output power requirements (e.g., A-MPR/MPR performance requirements) for a 29 dBm high power UE (HPUE) operating in the B41/n41 EN-DC mode in the third example of the disclosure of the present specification.

The assumptions for measuring the maximum output power requirements (e.g., A-MPR/MPR performance requirements) for a 29 dBm high power UE (HPUE) operating in the B41/n41 EN-DC mode are as follows:

10 dB antenna isolation and 13 dB antenna isolation.
 Post PA loss of 4 dB. For example, it is assumed that loss of a signal passing through the power amplifier is 4 dB.
 Power class 2 Tx chains (LTE and NR). For example, it is assumed that the power class 2 Tx chain is used for both the LTE Tx chain and the NR Tx chain.
 Equal power on LTE and NR. For example, it is assumed that a 29 dBm high-power UE (HPUE) operating in the B41/n41 EN-DC mode transmits signals with the same power in LTE band and NR band.
 Various allocation combinations with range of aggregate BWs, with focus on "worst case" combinations (assumed to be near-equal allocation BWs). For example, focusing on "worst case" combinations (i.e. combinations according to nearly-equally allocated BWs), measurement was performed based on the assumption of various resource allocation combinations with a range of aggregate bandwidths (BWs).

It was assumed to determine back-off required to meet −13, −25, and −30 dBm/MHz SEM, and adjacent channel leakage power ratio (ACLR) limits.

Fetching data from multiple sources and defining new A-MPR (and/or MPR) curves accommodating different implementations were assumed as a goal for performing measurement. Since the new A-MPR curve may be associated with modified MPR bits, it was assumed to be optional In addition to the above assumptions, in a first example of the disclosure of the present specification, additional assumptions were considered when measuring the A-MPR value and/or MPR values. Assumptions additionally considered in the first example of the disclosure of the present specification are as follows:

UL (Uplink: uplink) non-contiguous resource allocation. For example, it was assumed that the UL resource allocation is non-contiguous.
 LTE SC-FDMA/QPSK and NR CP-OFDM/QPSK. For example, it is assumed that the UE uses SC-FDMA and QPSK for LTE and uses CP-OFDM and QPSK for NR.
 15 KHz SCS on LTE and 30 kHz SCS on NR. For example, it was assumed that the UE uses 15 KHz SCS for LTE and 30 kHz SCS for NR.
 26 dBm on each Tx chain. For example, it is assumed that the UE uses power of 26 dBm for each Tx chain of LTE and NR.
 LTE 20 MHz and NR 60 MHz. For example, it was assumed that the UE uses 20 MHz Channel Bandwidth (CBW) for LTE and 60 MHz CBW for NR.

Hereinafter, A-MPR values and/or A-MPR curves measured based on the above assumptions are proposed. The A-MPR values and/or A-MPR curves proposed below are examples of maximum output power requirements (e.g., A-MPR/MPR performance requirements), and the A-MPR values and/or A-MPR curves described below may equally be applied to the MPR value and/or the MPR curve.

3-2. Examples of Discussed A-MPR Curves

Although various companies have been discussed re-defining the maximum output power requirements (e.g., A-MPR/MPR performance requirements) for a 29 dBm high-power UE (HPUE) operating in the B41/n41 EN-DC mode, an efficient new A-MPR curve has not been defined. Examples of FIGS. 26 to 28 below include examples of A-MPR curves proposed by various companies and examples of A-MPR curves proposed in the third example of the disclosure of the present specification.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 26:
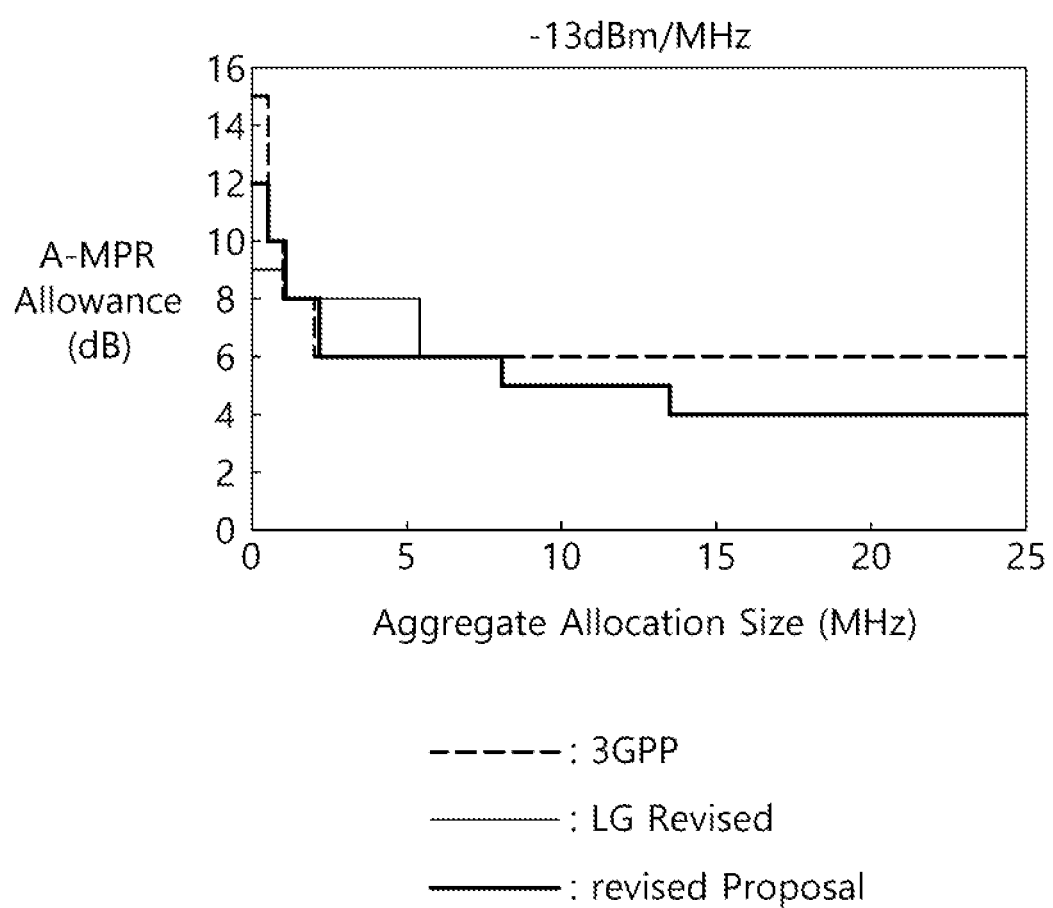
FIG. 26 shows an example of an A-MPR curve to meet an SEM of −13 dBm/MHz.

FIG. 26 shows an example of an A-MPR curve to meet the SEM of −13 dBm/MHz.

Referring to FIG. 26, an A-MPR curve for an additional SEM of the 29 dBm high-power UE (HPUE) operating in the B41/n41 EN-DC mode to meet −13 dBm/MHz (e.g., a curve based on A-MPR values to meet SEM of −13 dBm/MHz) in an NS_04 situation is illustrated. Here, the NS_04 situation may refer to a situation in which the terminal receives A-MPR and a network signal (NS) (e.g., NS_04) from the base station.

The example of FIG. 26 shows the A-MPR value according to the aggregate allocation size. In the example of FIG. 26, the A-MPR curve labeled "3GPP" represents the previously discussed A-MPR curve. "LG revised" indicates an example of the A-MPR curve modified according to the results measured in the third example of the disclosure of the present specification. "revised Proposal" indicates an A-MPR curve based on the A-MPR values finally proposed in the third example of the present disclosure based on the results measured in the third example of the present disclosure.

Comparing the A-MPR curve shown as "LG Revised" in the example of FIG. 26 with the conventional A-MPR curve (the curve shown as "3GPP"), an allowed power back-off in the range of the aggregate allocation size between 2.7 MHz and 5.4 MHz should be increased by 2 dB. This is because, when the NS_04 additional SEM signaling is present, the conventional A-MPR curve (e.g., the A-MPR curve indicated by "3GPP" in FIG. 26) is not sufficient to meet the SEM of −13 dBm/MHz.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 27:
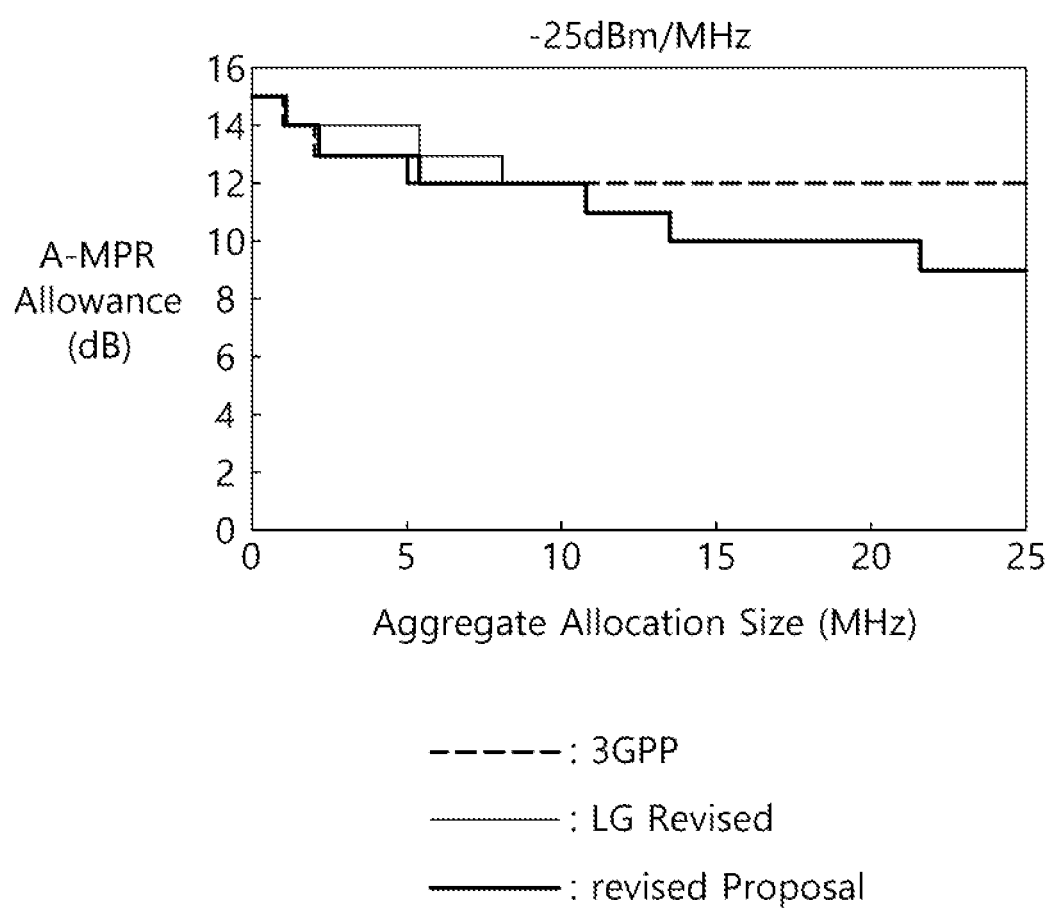
FIG. 27 shows an example of an A-MPR curve to meet an SE of −25 dBm/MHz.

FIG. 27 shows an example of an A-MPR curve to meet an SE of −25 dBm/MHz.

Referring to FIG. 27, an A-MPR curve for SE of the 29 dBm high-power UE (HPUE) operating in the B41/n41 EN-DC mode to meet −25 dBm/MHz (e.g., a curve based on A-MPR values to meet SEM of −25 dBm/MHz) in an NS_04 situation is illustrated. Here, the NS_04 situation may refer to a situation in which the terminal receives A-MPR and a network signal (NS) (e.g., NS_04) from the base station.

The example of FIG. 27 shows the A-MPR value according to the aggregate allocation size. In the example of FIG. 27, the A-MPR curve labeled "3GPP" represents the previously discussed A-MPR curve. "LG revised" indicates an example of the A-MPR curve modified according to the results measured in the third example of the disclosure of the present specification. "revised Proposal" indicates an A-MPR curve based on the A-MPR values finally proposed in the third example of the present disclosure based on the results measured in the third example of the present disclosure.

Comparing the A-MPR curve shown as "LG Revised" in the example of FIG. 27 with the conventional A-MPR curve (the curve shown as "3GPP"), an allowed power back-off in two ranges (e.g., 5.4 MHz to 8.1 MHz) of the aggregate allocation size should be increased by 1 dB. This is because, when the NS_04 SE is indicated, the conventional A-MPR curve (e.g., the A-MPR curve indicated by "3GPP" in FIG. 26) is not sufficient to meet the SEM of −25 dBm/MHz.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 28:
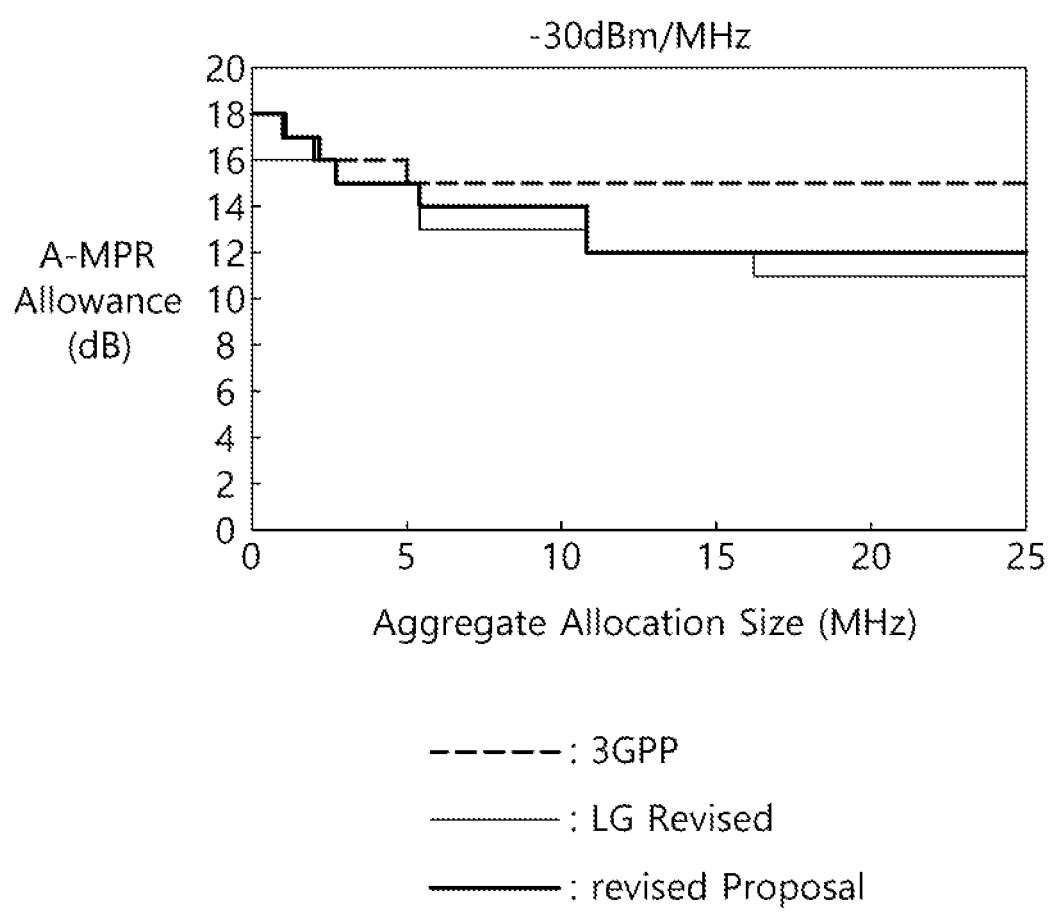
FIG. 28 shows an example of an A-MPR curve to meet an SE of −30 dBm/MHz.

FIG. 28 shows an example of an A-MPR curve to meet SE of −30 dBm/MHz.

Referring to FIG. 28, an A-MPR curve for general SE of the 29 dBm high-power UE (HPUE) operating in the B41/n41 EN-DC mode to meet −13 dBm/MHz (e.g., a curve based on A-MPR values to meet SE of −30 dBm/MHz) in an NS_04 situation is illustrated. Here, the NS_04 situation may refer to a situation in which the terminal receives A-MPR and a network signal (NS) (e.g., NS_04) from the base station.

The example of FIG. 28 shows the A-MPR value according to the aggregate allocation size. In the example of FIG. 28, the A-MPR curve labeled "3GPP" represents the previously discussed A-MPR curve. "LG revised" indicates an example of the A-MPR curve modified according to the results measured in the third example of the disclosure of the present specification. "revised Proposal" indicates an A-MPR curve based on the A-MPR values finally proposed in the third example of the present disclosure based on the results measured in the third example of the present disclosure.

As a result of measuring the A-MPR curve for the general SE to meet −30 dBm/MHz (e.g., a curve based on the A-MPR values to meet the SE of −30 dBm/MHz), the conventional A-MPR curve (e.g., the A-MPR curve shown as "revised Proposal" in the example of FIG. 28) is sufficient to meet the requirements related to SE of −30 dBm/MHz.

Therefore, in the following, the A-MPR curve to meet the SEM of −13 dBm/MHz and the SE of −25 dBm/MHz for the 29 dBm high-power UE (HPUE) operating in the B41/n41 EN-DC mode is analyzed and focused to be newly defined.

3-3. Examples of A-MPR Curves Proposed in the Third Example of the Disclosure of the Present Specification Hereinafter, an A-MPR curve for a 29 dBm high-power UE (HPUE) operating in the B41/n41 EN-DC mode is proposed.

In order to propose an A-MPR curve to meet the SEM and SE limits, new A-MPR values were measured using a real terminal (e.g., a real phone) supporting the B41/n41 EN-DC mode. These A-MPR measurement results reflect practical implementation margins such as antenna isolation, non-linearity of PA, and various form factors of a terminal (e.g., phone).

A-MPR values newly measured to meet NS_04 SEM (−13 dBm/MHz), NS_04 additional SE (−25 dBm/MHz limit), and general SE (−30 dBm/MHz) are proposed below.

When NS_04 signaling is indicated for a 29 dBm high power UE (HPUE) operating in the B41/n41 EN-DC mode, it is evident that the conventional A-MPR curves cannot meet the requirements for SEM of −13 dBm/MHz and SE of −25 dBm/MHz.

Therefore, the third example of the disclosure of the present specification proposes a new A-MPR curve based on the new measurement result.

Additionally, in the third example of the disclosure of the present specification, the newly defined A-MPR curve may be applied only to a 29 dBm high-power UE (HPUE) supporting dual PAs. This is because some assumptions used to measure the A-MPR value are not clearly defined, and some assumptions are made only for 29 dBm high-power UEs (HPUEs).

Hereinafter, A-MPR values proposed in the third example of the disclosure of the present specification will be described.

1) Examples of A-MPR Values to Meet SEM of −13 dBm/MHz

Hereinafter, an A-MPR value (A-MPR value for a 29 dBm high-power UE (HPUE) operating in the B41/n41 EN-DC mode) that an additional SEM meets −13 dBm/MHz in the NS_04 situation will be described.

This A-MPR value may be defined as A-MPR$_{IM3}$. A-MPR$_{IM3}$ may refer to that it is an A-MPR related to IM3. The A-MPR$_{IM3}$ value may be M$_A$. In a third example of the disclosure of the present specification, M$_A$ may be defined as follows:

M$_A$ =
12 dB; 0≤B<0.54
10 dB; 0.54≤B<1.08
8 dB; 1.08≤B<5.4
6 dB; 5.4≤B<8.1
5 dB; 8.1≤<13.5
4 dB; 13.5≤B

Here, B may refer to a bandwidth in MHz. For example, B may refer to an aggregate allocation size allocated to a 29 dBm high-power UE (HPUE) operating in the B41/n41 EN-DC mode. For example, B may refer to "aggregated bandwidth" of LTE band 41 and NR band 41. That is, B may refer to a total allocated bandwidth.

For example, a 29 dBm high-power UE (HPUE) operating in the B41/n41 EN-DC mode receives NS_04 signaling from a base station, and an aggregate allocation size of 0 or more and less than 0.54 MHz may be allocated to the high-power UE. In this case, the UE may transmit a signal by applying an A-MPR value of 12 dB to the transmission power in order to meet the SEM of −13 dBm/MHz.

2) Example of A-MPR Values to Meet SE of −25 dBm/MHz

Hereinafter, an A-MPR value (A-MPR value for a 29 dBm high-power UE (HPUE) operating in the B41/n41 EN-DC mode) that SE meets −25 dBm/MHz in the NS_04 situation will be described.

This A-MPR value may be defined as A-MPR$_{IM3}$. A-MPR$_{IM3}$ may refer to that it is an A-MPR related to IM3. The A-MPR$_{IM3}$ value may be M$_A$. In a third example of the disclosure of the present specification, M$_A$ may be defined as follows:

M$_A$=
15 dB; 0≤B<1.08
14 dB; 1.08≤B<5.4
13 dB; 5.4≤B<8.1
12 dB; 8.1≤B<10.8
11 dB; 10.8≤B<13.5
10 dB; 13.5≤B<21.6
9 dB; 21.6≤B

Here, B may refer to a bandwidth in MHz. For example, B may refer to an aggregate allocation size allocated to a 29 dBm high-power UE (HPUE) operating in the B41/n41 EN-DC mode. For example, B may refer to "aggregated bandwidth" of LTE band 41 and NR band 41. That is, B may refer to a total allocated bandwidth.

For example, a 29 dBm high-power UE (HPUE) operating in the B41/n41 EN-DC mode receives NS_04 signaling from a base station, and an aggregate allocation size of 0 or more and less than 1.08 MHz may be allocated to the high-power UE. In this case, the UE may transmit a signal by applying an A-MPR value of 15 dB to the transmission power in order to meet the SE of −25 dBm/MHz.

3) Example of A-MPR Values to Meet General SE of −30 dBm/MHz

Hereinafter, an A-MPR value (A-MPR value for a 29 dBm high-power UE (HPUE) operating in the B41/n41 EN-DC mode) that general SE meets −30 dBm/MHz in the NS_04 situation will be described.

This A-MPR value may be defined as A-MPRIM3. A-MPRIM3 may refer to that it is an A-MPR related to IM3. The A-MPRIM3 value may be MA. In a third example of the disclosure of the present specification, MA may be defined as follows:

M$_A$=
18 dB; 0≤B<1.08
17 dB; 1.08≤B<2.16
16 dB; 2.16≤B<2.7
15 dB; 2.7≤B<5.4
14 dB; 5.4≤B<10.8
13 dB; 10.8≤B

Here, B may refer to a bandwidth in MHz. For example, B may refer to an aggregate allocation size allocated to a 29 dBm high-power UE (HPUE) operating in the B41/n41 EN-DC mode. For example, B may refer to "aggregated bandwidth" of LTE band 41 and NR band 41. That is, B may refer to a total allocated bandwidth.

For example, a 29 dBm high-power UE (HPUE) operating in the B41/n41 EN-DC mode receives NS_04 signaling from a base station, and an aggregate allocation size of 0 or more and less than 1.08 MHz may be allocated to the high-power UE. In this case, the UE may transmit a signal by applying an A-MPR value of 185 dB to the transmission power in order to meet the SE of −30 dBm/MHz.

As described above, when NS_04 signaling is indicated for a 29 dBm high-power UE (HPUE) operating in the B41/n41 EN-DC mode, the conventional A-MPR curves cannot meet the requirements for SEM of −13 dBm/MHz and the requirements for SE of −25 dBm/MHz.

However, the A-MPR values (A-MPR values proposed in the third example of the disclosure of the present specification) described in 1) to 3) above may meet the requirement for SEM of −13 dBm/MHz and the requirements for SE of −25 dBm/MHz.

Figure 30:
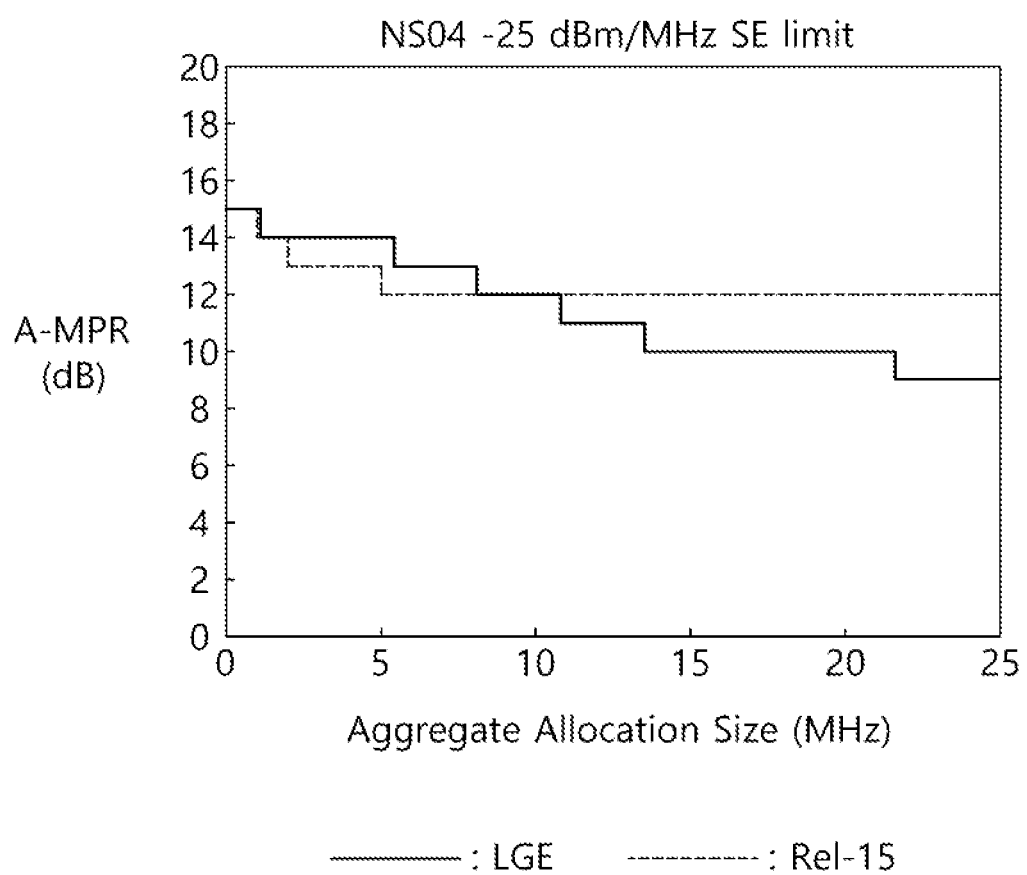
FIG. 30 shows an example of an A-MPR curve to meet an SE of −25 dBm/MHz in the third example of the disclosure of the present specification.
Figure 31:
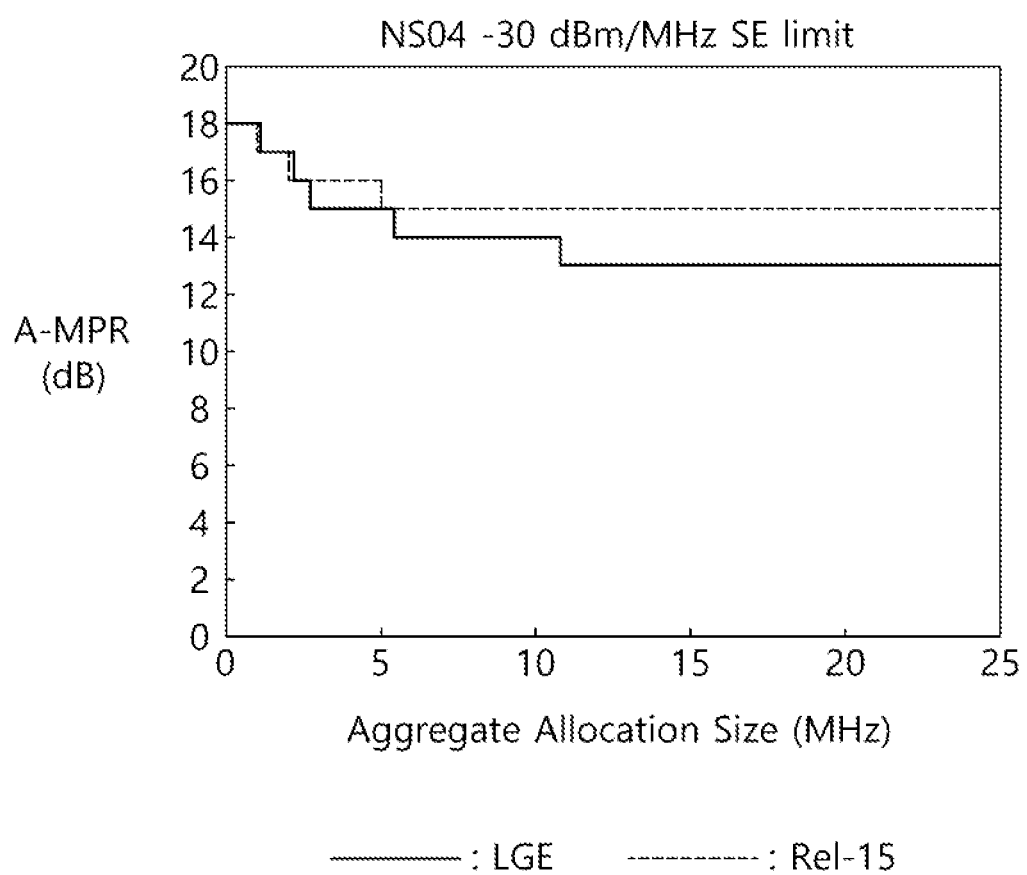
FIG. 31 shows an example of an A-MPR curve to meet an SE of −30 dBm/MHz proposed in the third example of the disclosure of the present specification.

Hereinafter, an A-MPR curve based on the new A-MPR values (e.g., A-MPR values described in 1) to 3) above) proposed in the third example of the disclosure will be described with reference to FIGS. 29 to 31. That is, FIGS. 29 to 31 show an example of the A-MPR curve that may be applied to a 29 dBm high-power UE (HPUE) operating in the B41/n41 EN-DC mode when NS_04 signaling is indicated to a 29 dBm high-power UE (HPUE) operating in the B41/n41 EN-DC mode.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 29:
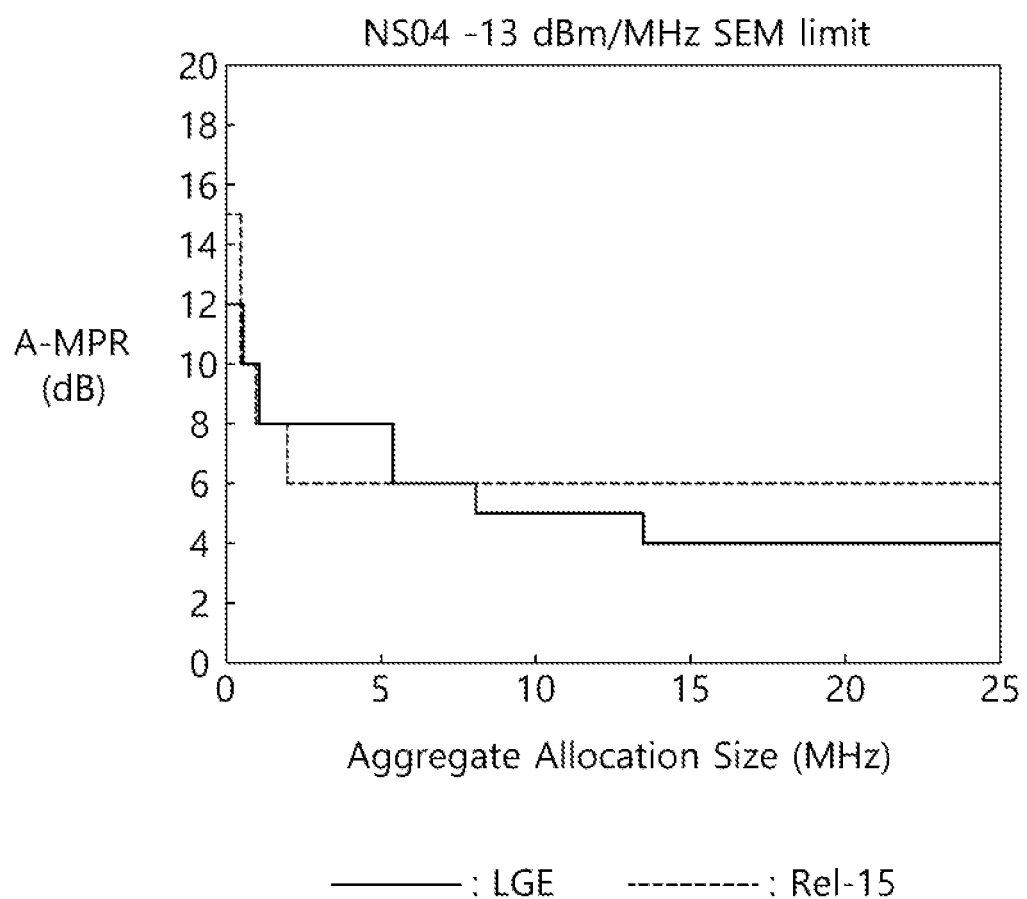
FIG. 29 shows an example of an A-MPR curve to meet the SEM of −13 dBm/MHz proposed in a third example of the disclosure of the present specification.

FIG. 29 shows an example of an A-MPR curve to meet the SEM of −13 dBm/MHz proposed in the third example of the disclosure of the present specification.

Referring to FIG. 29, an A-MPR curve for an additional SEM of the 29 dBm high-power UE (HPUE) operating in the B41/n41 EN-DC mode to meet −13 dBm/MHz (e.g., a curve based on A-MPR values to meet SEM of −13 dBm/MHz) in an NS_04 situation is illustrated. Here, the NS_04 situation may refer to a situation in which the terminal receives A-MPR and a network signal (NS) (e.g., NS_04) from the base station.

The example of FIG. 29 shows the A-MPR value according to the aggregate allocation size. In the example of FIG. 29, the A-MPR curve labeled "Rel-15" represents the previously discussed A-MPR curve. "LGE" indicates an example of the A-MPR curve modified according to the results measured in the third example of the disclosure of the present specification.

The A-MPR curve shown in FIG. 29 may be a curve based on the A-MPR value described in "1) Example of A-MPR values to meet the SEM of −13 dBm/MHz".

Referring to FIG. 29, the A-MPR value for the additional SEM to meet −13 dBm/MHz in the NS_04 situation (A-MPR value for 29 dBm high-power UE (HPUE) operating in the B41/n41 EN-DC mode) may be defined as MPR$_{IM3}$. A-MPR$_{IM3}$ may refer to that it is an A-MPR related to IM3. The A-MPR$_{IM3}$ value may be M$_A$. In a third example of the disclosure of the present specification, M$_A$ may be defined as follows:

M$_A$=
12±α dB; 0≤B<0.54
10±α dB; 0.54≤B<1.08
8±α dB; 1.08≤B<5.4
6±α dB; 5.4≤B<8.1
5±α dB; 8.1≤B<13.5
4±α dB; 13.5≤B

Here, B may refer to a bandwidth in MHz. For example, B may refer to an aggregate allocation size allocated to a 29 dBm high-power UE (HPUE) operating in the B41/n41 EN-DC mode. For example, B may refer To "aggregated bandwidth" of LTE band 41 and NR band 41. That is, B may refer to a total allocated bandwidth. For reference, α in MA may be 0 dB, 1 dB, 2 dB, 3 dB, or the like.

For example, when α is 0 dB, a 29 dBm high-power UE (HPUE) operating in the B41/n41 EN-DC mode may receive NS_04 signaling from a base station, and the aggregate allocation size of 0 or more and less than 0.54 MHz may be allocated to the high power UE. In this case, the UE may transmit a signal by applying an A-MPR value of 12 dB to the transmission power in order to meet the SEM of −13 dBm/MHz.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 30 shows an example of an A-MPR curve to meet SE of −25 dBm/MHz in a third example of the disclosure of the present specification.

Referring to FIG. 30, an A-MPR curve for an additional SE of the 29 dBm high-power UE (HPUE) operating in the B41/n41 EN-DC mode to meet −25 dBm/MHz (e.g., a curve based on A-MPR values to meet SE of −25 dBm/MHz) in an NS_04 situation is illustrated. Here, the NS_04 situation may refer to a situation in which the terminal receives A-MPR and a network signal (NS) (e.g., NS_04) from the base station.

The example of FIG. 30 shows the A-MPR value according to the aggregate allocation size. In the example of FIG. 30, the A-MPR curve labeled "Rel-15" represents the previously discussed A-MPR curve. "LGE" indicates an example of the A-MPR curve modified according to the results measured in the third example of the disclosure of the present specification.

The A-MPR curve shown in FIG. 30 may be a curve based on the A-MPR value described in "2) Example of A-MPR values to meet the SE of −25 dBm/MHz".

Referring to FIG. 30, the A-MPR value for the SE to meet −25 dBm/MHz in the NS_04 situation (A-MPR value for 29 dBm high-power UE (HPUE) operating in the B41/n41 EN-DC mode) may be defined as $MPR_{IM3}$. A-MPR$_{IM3}$ may refer to that it is an A-MPR related to IM3. The A-MPR$_{IM3}$ value may be $M_A$. In a third example:

$M_A=$
15±αdB; 0≤B<1.08
14±αdB; 1.08≤B<5.4
13±αdB; 5.4≤B<8.1
12±αdB; 8.1≤B<10.8
11±αdB; 10.8≤B<13.5
10±αdB; 13.5≤B<21.6
9±αdB; 21.6≤B

Here, B may refer to a bandwidth in MHz. For example, B may refer to an aggregate allocation size allocated to a 29 dBm high-power UE (HPUE) operating in the B41/n41 EN-DC mode. For example, B may refer To "aggregated bandwidth" of LTE band 41 and NR band 41. That is, B may refer to a total allocated bandwidth. For reference, α in MA may be 0 dB, 1 dB, 2 dB, 3 dB, or the like.

For example, when α is 0 dB, a 29 dBm high-power UE (HPUE) operating in the B41/n41 EN-DC mode may receive NS_04 signaling from a base station, and the aggregate allocation size of 0 or more and less than 1.08 MHz may be allocated to the high power UE. In this case, the UE may transmit a signal by applying an A-MPR value of 15 dB to the transmission power in order to meet the SE of −25 dBm/MHz.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 31 shows an example of an A-MPR curve to meet the SE of −30 dBm/MHz proposed in the third example of the disclosure of the present specification.

Referring to FIG. 31, an A-MPR curve for a general SE of the 29 dBm high-power UE (HPUE) operating in the B41/n41 EN-DC mode to meet −30 dBm/MHz (e.g., a curve based on A-MPR values to meet general SE of −30 dBm/MHz) in an NS_04 situation is illustrated. Here, the NS_04 situation may refer to a situation in which the terminal receives A-MPR and a network signal (NS) (e.g., NS_04) from the base station.

The example of FIG. 31 shows the A-MPR value according to the aggregate allocation size. In the example of FIG. 31, the A-MPR curve labeled "Rel-15" represents the previously discussed A-MPR curve. "LGE" indicates an example of the A-MPR curve modified according to the results measured in the third example of the disclosure of the present specification.

The A-MPR curve shown in FIG. 31 may be a curve based on the A-MPR value described in "3) Example of A-MPR values to meet the general SE of −30 dBm/MHz".

Referring to FIG. 31, the A-MPR value for the additional SE to meet −30 dBm/MHz in the NS_04 situation (A-MPR value for 29 dBm high-power UE (HPUE) operating in the B41/n41 EN-DC mode) may be defined as $MPR_{IM3}$. A-MPR$_{IM3}$ may refer to that it is an A-MPR related to IM3. The A-MPR$_{IM3}$ value may be $M_A$. In a third example:

$M_A=$
18±α dB; 0≤B<1.08
17±α dB; 1.08≤B<2.16
16±α dB; 2.16≤B<2.7
15±α dB; 2.7≤B<5.4
14±α dB; 5.4≤B<10.8
13±α dB; 10.8≤B

Here, B may refer to a bandwidth in MHz. For example, B may refer to an aggregate allocation size allocated to a 29 dBm high-power UE (HPUE) operating in the B41/n41 EN-DC mode. For example, B may refer To "aggregated bandwidth" of LTE band 41 and NR band 41. That is, B may refer to a total allocated bandwidth. For reference, α in MA may be 0 dB, 1 dB, 2 dB, 3 dB, or the like.

For example, when α is 0 dB, a 29 dBm high-power UE (HPUE) operating in the B41/n41 EN-DC mode may receive NS_04 signaling from a base station, and the aggregate allocation size of 0 or more and less than 1.08 MHz may be allocated to the high power UE. In this case, the UE may transmit a signal by applying an A-MPR value of 18 dB to the transmission power in order to meet the general SE of −30 dBm/MHz.

For reference, the newly defined A-MPR curve described with reference to FIGS. 29 to 31 may be applied only to a 29 dBm high-power UE (HPUE) supporting dual PAs. In addition, this newly defined A-MPR curve may not be applied to general cases other than a 29 dBm high-power UE (HPUE) supporting dual PAs.

Hereinafter, examples of operations performed by a UE (e.g., a 29 dBm high-power UE (HPUE)) and a base station will be described according to those described in the first to third examples of the disclosure of the present specification.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 32:
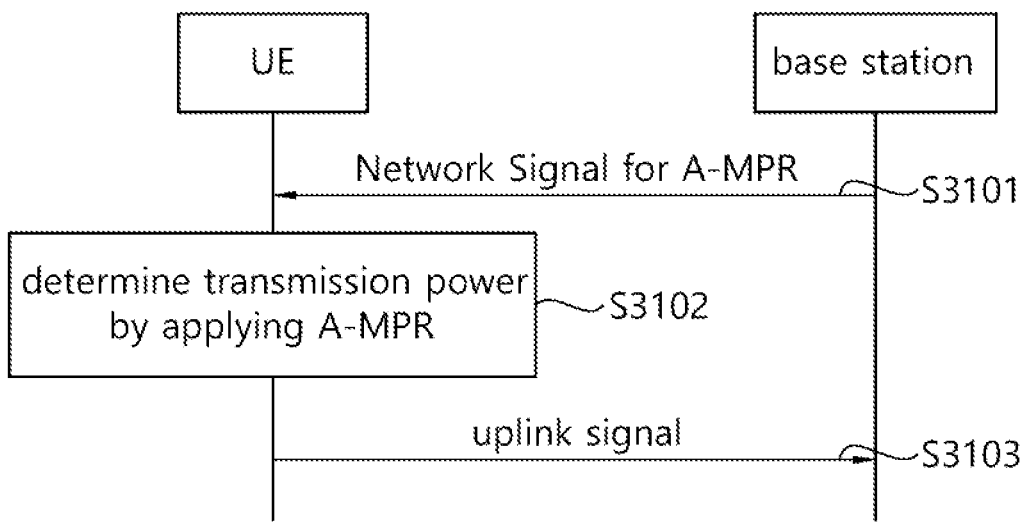
FIG. 32 shows an example of operation of a UE and a base station according to the disclosure of the present specification.

FIG. 32 shows an example of operations of a UE and a base station according to the disclosure of the present specification.

Referring to FIG. 32, a base station and a UE are shown. The UE may be, for example, a 29 dBm high power UE (HPUE). The base station may include a base station based on E-UTRA (or LTE) and/or a base station based on NR.

The UE may be in a state in which B41/n41 EN-DC is configured through communication with the base station, for the case of intra-band contiguous and/or for the case of intra-band non-contiguous.

In step S3101, the base station may transmit a network signal for A-MPR to the UE. The network signal for A-MPR may refer to a network signal related to A-MPR. The base station may request to apply the A-MPR when the UE determines an uplink transmission power by transmitting the network signal for A-MPR to the UE. The network signal for A-MPR may be, for example, "NS_04".

In step S3102, the UE may determine transmission power by applying the A-MPR value proposed in the first to third examples of the disclosure of the present specification based on the received network signal for A-MPR from the base station and based on the B41/n41 EN-DC set for the UE.

Taking the case of the third example of the disclosure of the present specification as an example, the A-MPR value that the UE applies when determining the transmission power may be as follows:

1) A-MPR values to meet SEM of −13 dBm/MHz
$M_A=$
12 dB; 0≤B<0.54
10 dB; 0.54≤B<1.08
8 dB; 1.08≤B<5.4
6 dB; 5.4≤B<8.1
5 dB; 8.1≤B<13.5
4 dB; 13.5≤B
2) A-MPR values to meet the SE of −25 dBm/MHz
$M_A=$
15 dB; 0≤B<1.08
14 dB; 1.08≤B<5.4
13 dB; 5.4≤B<8.1
12 dB; 8.1≤B<10.8
11 dB; 10.8≤B<13.5
10 dB; 13.5≤B<21.6
9 dB; 21.6≤B
3) A-MPR values to meet general SE of −30 dBm/MHz
$M_A=$
18 dB; 0≤B<1.08
17 dB; 1.08≤B<2.16
16 dB; 2.16≤B<2.7
15 dB; 2.7≤B<5.4
14 dB; 5.4≤B<10.8
13 dB; 10.8≤B In step S3103, the UE may transmit an uplink signal to the base station based on the transmission power determined in step S3102.

As described in the disclosure of this specification, the UE (e.g., 29 dBm high power UE (HPUE)) operating in the B41/n41 EN-DC mode may apply the maximum output power requirements (or requirements).

For reference, the operation of the terminal (e.g., UE) described in this specification may be implemented by the device of FIGS. 33 to 36 to be described below. For example, the terminal may be the first device 100a or the second device 100b of FIG. 33. For example, the operation of the terminal described in this specification may be processed by one or more processors 1020a or 1020b. The operation of the UE described herein may be stored in one or more memories 1010a or 1010b in the form of instructions/programs (e.g. Instructions, executable code) executable by one or more processors 1020a or 1020b. One or more processors 1020a or 1020b may control one or more memories 1010a or 1010b and one or more transceivers 1031a or 1031b, and execute instructions/programs stored in one or more memories 1010a or 1010b to perform the operation of the terminal (e.g., UE) described in the disclosure of the present specification.

In addition, instructions for performing an operation of a terminal (e.g., UE) described in the disclosure of the present specification may be stored in a non-volatile computer-readable storage medium in which it is recorded. The storage medium may be included in one or more memories 1010a or 1010b. Also, the instructions recorded in the storage medium may be executed by one or more processors 1020a or 1020b to perform the operation of the terminal described in the disclosure of the present specification.

For reference, the operation of the base station (e.g., NG-RAN, gNB, eNB, ng-eNB, etc.) described in this specification may be implemented by the device of FIGS. 33 to 36 to be described below. For example, the network node may be a first device 100a or a second device 100b of FIG. 33. For example, operations of the base station described herein may be processed by one or more processors 1020a or 1020b. The operations of the base station described herein may be stored in one or more memories 1010a or 1010b in the form of instructions/programs (e.g., instruction, executable code) executable by one or more processors 1020a or 1020b. One or more processors 1020a or 1020b may control one or more memories 1010a or 1010b and one or more transceivers 1031a or 1031b and execute instructions/programs stored in one or more memories 1010a or to perform the operation of the base station described above.

III. General Device to which the Disclosure of the Present Specification May be Applied The disclosures of the present specification described so far may be implemented through various means. For example, the disclosures of the present specification may be implemented by hardware, firmware, software, or a combination thereof. Specifically, it will be described with reference to the drawings.

Figure 33:
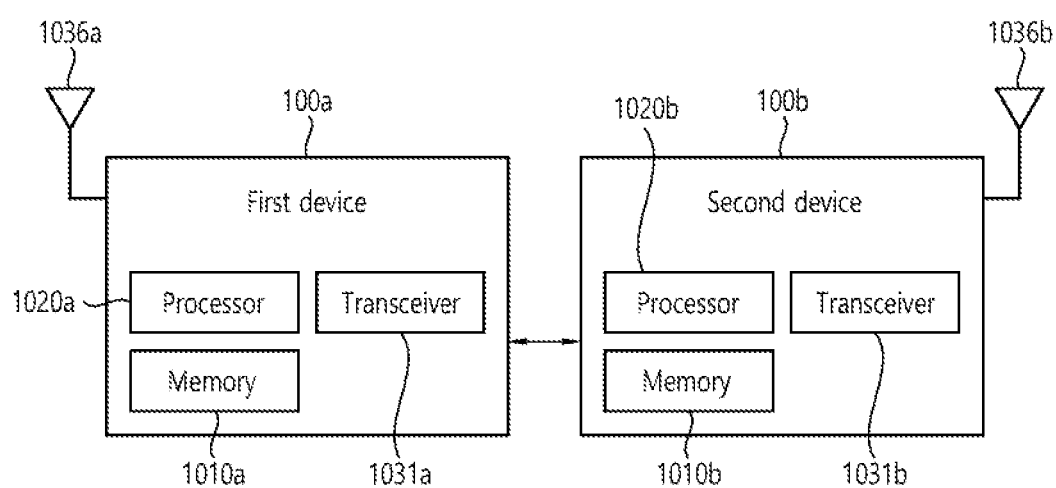
FIG. 33 shows a device according to an embodiment.

FIG. 33 shows a device according to an embodiment.

Referring to FIG. 33, a wireless communication system may include a first device 100a and a second device 100b.

The first device 100a may be a base station, a network node, a transmission terminal, a reception terminal, a wireless device, a wireless communication device, a vehicle, a vehicle mounted with an automatic driving function, a connected car, a drone (Unmanned Aerial Vehicle, UAV), an AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a pin tech device (or financial device), a security device, a climate/environment device, an device related to 5G service, or another device related to the Fourth Industrial Revolution field The second device 100b may be a base station, a network node, a transmission terminal, a reception terminal, a wireless device, a wireless communication device, a vehicle, a vehicle mounted with an automatic driving function, a Connected Car, a drone (Unmanned Aerial Vehicle, UAV), an AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a pin tech device (or financial device), a security device, a climate/environment device, an device related to 5G service, or another device related to the Fourth Industrial Revolution field.

The first device 100a may include at least one processor such as a processor 1020a, at least one memory such as memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 34:
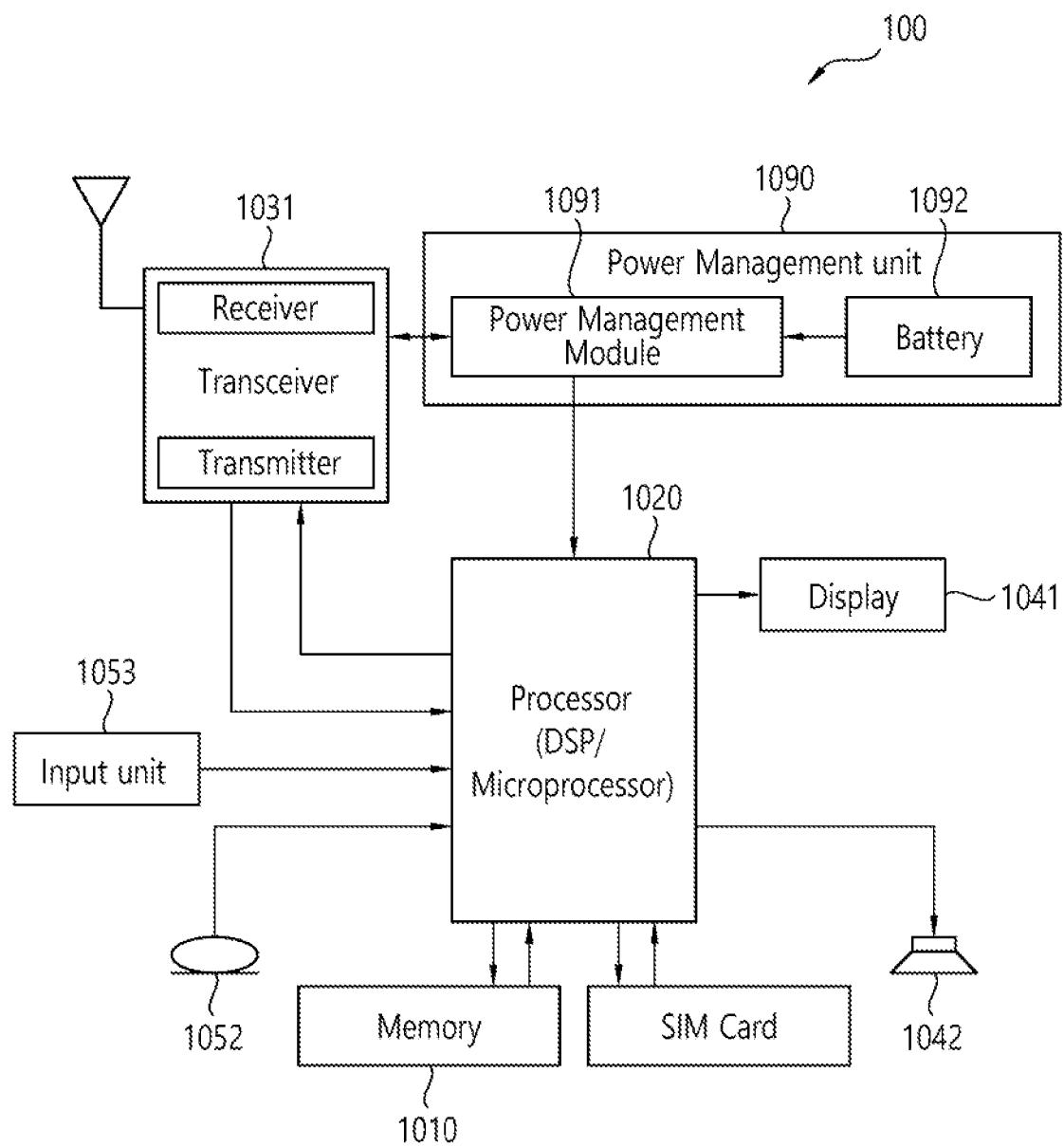
FIG. 34 is a block diagram illustrating a configuration of a terminal according to an embodiment.

FIG. 34 is a block diagram illustrating a configuration of a terminal according to an embodiment.

In particular, the device shown in FIG. 34 is a diagram illustrating the device of FIG. 33 in more detail.

A device includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by Medi-aTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is operably coupled with the processor 1020 and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is operably connected to the processor 1020 and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 35:
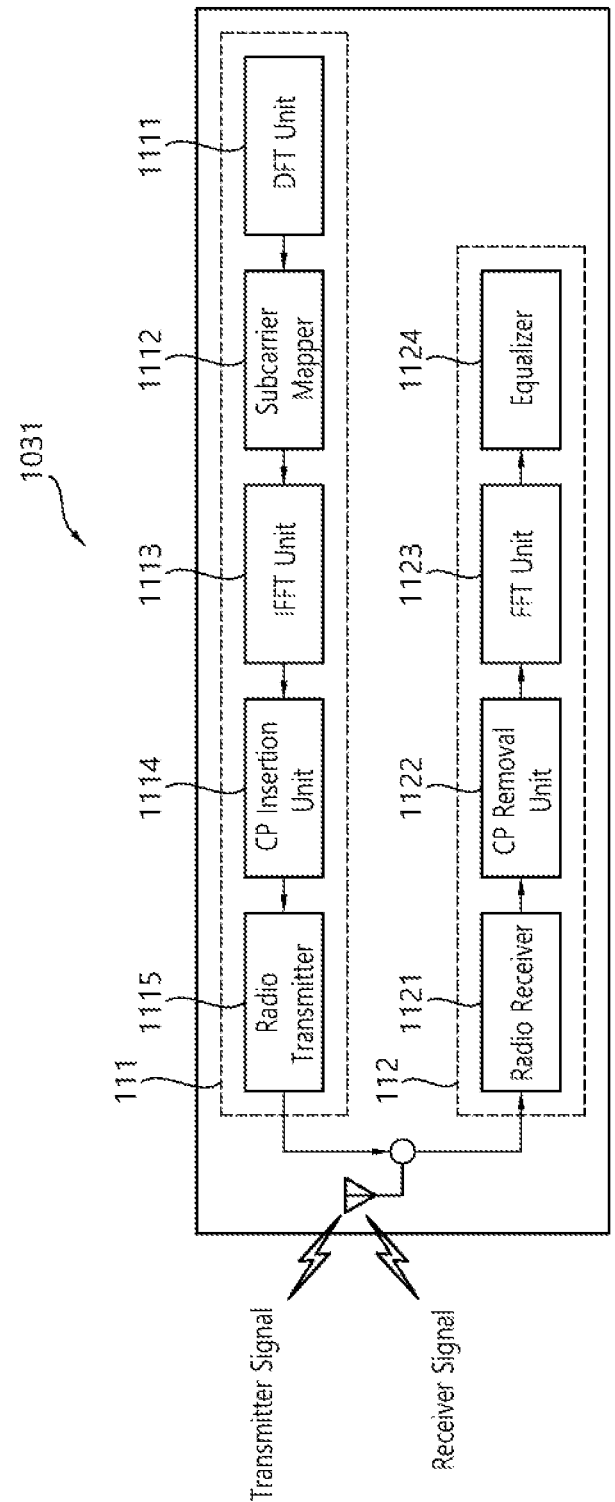
FIG. 35 is a detailed block diagram illustrating a transceiver of a first device shown in FIG. 33 or a transceiver of a device shown in FIG. 36.

FIG. 35 is a detailed block diagram illustrating the transceiver of the first device shown in FIG. 33 or the transceiver of the device shown in FIG. 34 in detail.

Referring to FIG. 35, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI) and Inter-Carrier Interference (ICI) are prevented through CP insertion, so that orthogonality may be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

IV. Examples to which the Disclosure of the Present Specification May be Applied Although not limited thereto, the various descriptions, functions, procedures, proposals, methods, and/or operational flowcharts of the present disclosure disclosed herein may be applied to various fields requiring wireless communication/connection (eg, 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 36:
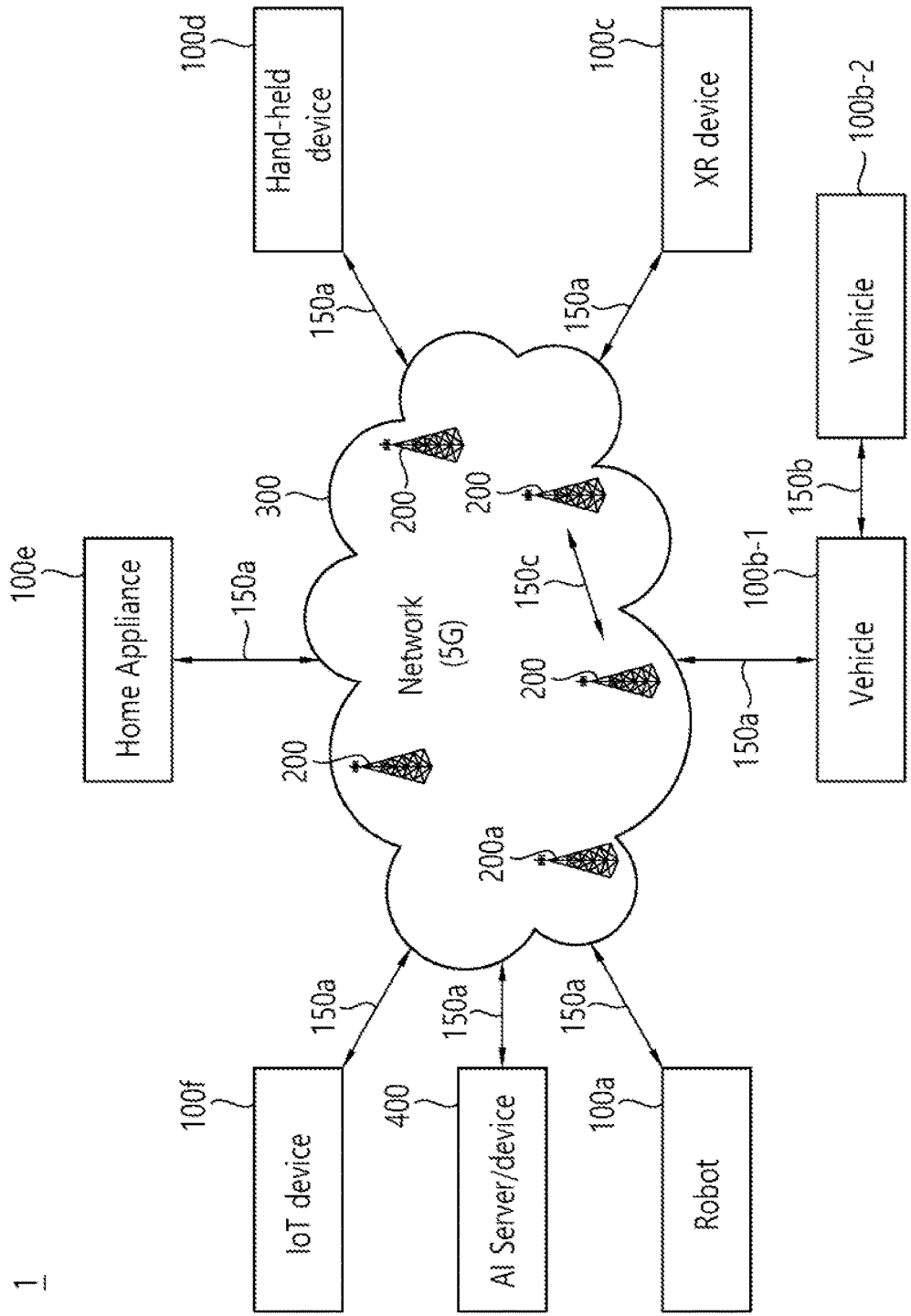
FIG. 36 illustrates a communication system 1 applied to the disclosure of the present specification.

FIG. 36 illustrates a communication system 1 applied to the disclosure of the present specification.

Referring to FIG. 36, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100*a*, a vehicle 100*b*-1, 100*b*-2, an eXtended Reality (XR) device 100*c*, a hand-held device 100*d*, and a home appliance 100*e*, an Internet-of-Things (IoT) device 100*f*, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200*a* may operate as a base station/network node to other wireless devices.

The wireless devices 100*a* to 100*f* may be connected to the network 300 via the base station 200. An Artificial Intelligence (AI) technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the base stations 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between wireless device 100*a* to 100*f* and base station 200, between base station 200/base station 200. Herein, the wireless communication/connections may be established through various RATs (e.g., 5G NR) such as uplink/downlink communication 150*a*, sidelink communication (or Device-to-Device (D2D) communication) 150*b*, inter-base station communication 150*c* (e.g., relay, Integrated Access and Backhaul (IAB)), etc. The wireless devices 100*a* to 100*f* and the base station 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A wireless communication device configured to perform communication, the device comprising:
at least one transceiver;
at least one processor; and
at least one computer memory operably connected to the at least one processor and storing instructions that, based on being executed by the at least one processor, perform operations comprising:
receiving, via the at least one transceiver, network signal related to additional maximum power reduction (A-MPR);
based on that the network signal related to the A-MPR is received and based on that the wireless communication device is configured with Evolved Universal Terrestrial Radio Access (E-UTRA)-New Radio (NR) Dual Connectivity(EN-DC), determining transmission power by applying pre-configured A-MPR value; and
transmitting, via the at least one transceiver, uplink signal based on the determined transmission power,
wherein the wireless communication device is configured with EN-DC based on E-UTRA operating band 41 and NR operating band n41.

2. The wireless communication device of claim 1, for spectrum emission mask (SEM) of −13 dBm/1 MHz, wherein the pre-configured A-MPR value include the following $M_A$ values:
$M_A=$
12 dB; 0≤B<0.54
10 dB; 0.54≤B<1.08,
wherein the B is Aggregated bandwidth of allocated resource for the transmission of the uplink signal,
wherein the B is represented by a unit of MHz.

3. The wireless communication device of claim 2, wherein,
for the SEM of −13 dBm/1 MHz, wherein the pre-configured A-MPR value include the following $M_A$ values:
$M_A=$
8 dB; 1.08≤B<5.4
6 dB; 5.4≤B<8.1
5 dB; 8.1≤B<13.5
4 dB; 13.5≤B.

4. The wireless communication device of claim 1, for spectrum emission mask (SEM) of −25 dBm/1 MHz, wherein the pre-configured A-MPR value include the following MA values:

$M_A=$
15 dB; 0≤B<1.08
14 dB; 1.08≤B<5.4
13 dB; 5.4≤B<8.1
wherein the B is Aggregated bandwidth of allocated resource for the transmission of the uplink signal,
wherein the B is represented by a unit of MHz.

5. The wireless communication device of claim 4, wherein,
for the SEM of −25 dBm/1 MHz, wherein the pre-configured A-MPR value include the following $M_A$ values:
$M_A=$
12 dB; 8.1≤B<10.8
11 dB; 10.8≤B<13.5
10 dB; 13.5≤B<21.6
9 dB; 21.6≤B.

6. The wireless communication device of claim 1, wherein,
for the SEM of −30 dBm/1 MHz, wherein the pre-configured A-MPR value include the following MA values:
$M_A=$
18 dB; 0≤B<1.08
17 dB; 1.08≤B<2.16
16 dB; 2.16≤B<2.7
15 dB; 2.7<B<5.4
14 dB; 5.4≤B<10.8
13 dB; 10.8≤B,
wherein the B is Aggregated bandwidth of allocated resource for the transmission of the uplink signal,
wherein the B is represented by a unit of MHz.

7. The wireless communication device of claim 1, wherein the wireless communication device is an autonomous driving device communication with at least one of a mobile terminal, a network, and an autonomous vehicles other than a relay UE.

8. A communication method performed by a base station, the communication method comprising:
transmitting a network signal related to additional maximum power reduction (A-MPR) to a wireless communication device; and
receiving an uplink signal from the wireless communication device,
the wireless communication device is configured with Evolved Universal Terrestrial Radio Access (E-UTRA)-New Radio (NR) Dual Connectivity(EN-DC),
wherein the network signal related to the A-MPR is used by the wireless communication device to determine transmission power of the uplink signal based on a pre-configured A-MPR value, and
wherein the wireless communication device is configured with EN-DC based on E-UTRA operating band 41 and NR operating band n41.

9. A communication method performed by a wireless communication device, the communication method comprising:
receiving network signal related to additional maximum power reduction (A-MPR);
based on that the network signal related to the A-MPR is received and based on that the wireless communication device is configured with Evolved Universal Terrestrial Radio Access (E-UTRA)-New Radio (NR) Dual Connectivity(EN-DC), determining transmission power by applying pre-configured A-MPR value; and transmitting, via the at least one transceiver, uplink signal based on the determined transmission power,
wherein the wireless communication device is configured with EN-DC based on E-UTRA operating band 41 and NR operating band n41.

* * * * *